(12) United States Patent
Okuyama et al.

(10) Patent No.: US 7,969,541 B2
(45) Date of Patent: Jun. 28, 2011

(54) RETARDATION FILM, METHOD OF MANUFACTURING THE SAME, AND DISPLAY

(75) Inventors: Kentaro Okuyama, Miyagi (JP); Hitoshi Katakura, Miyagi (JP); Kei Obata, Miyagi (JP); Jun Shimizu, Miyagi (JP); Shinya Suzuki, Miyagi (JP); Mitsunari Hoshi, Miyagi (JP); Junichi Inoue, Miyagi (JP); Akito Kuriyama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/564,505

(22) Filed: Sep. 22, 2009

(65) Prior Publication Data

US 2010/0073604 A1      Mar. 25, 2010

(30) Foreign Application Priority Data

Sep. 22, 2008   (JP) ................. 2008-242203
Nov. 28, 2008   (JP) ................. 2008-305350
Mar. 19, 2009   (JP) ................. 2009-068706

(51) Int. Cl.
*G02F 1/1335*   (2006.01)
*G02F 1/1339*   (2006.01)

(52) U.S. Cl. ........................ 349/117; 349/190

(58) Field of Classification Search .................. 349/117, 349/190
See application file for complete search history.

(56) References Cited

U.S. PATENT DOCUMENTS

| | | | |
|---|---|---|---|
| 5,327,285 A | 7/1994 | Faris | |
| 5,539,074 A | 7/1996 | Herr et al. | |
| 5,602,661 A | 2/1997 | Schadt et al. | |
| 5,686,975 A | 11/1997 | Lipton | |
| RE36,625 E | 3/2000 | Herr et al. | |
| 6,046,849 A | 4/2000 | Moseley et al. | |
| 6,055,013 A | 4/2000 | Woodgate et al. | |
| 6,055,103 A | 4/2000 | Woodgate et al. | |
| 6,160,597 A | 12/2000 | Schadt et al. | |
| 6,369,869 B2 | 4/2002 | Schadt et al. | |
| 6,377,295 B1 | 4/2002 | Woodgate et al. | |
| 6,437,915 B2 | 8/2002 | Moseley et al. | |
| 6,498,679 B2 | 12/2002 | Lee et al. | |
| 6,624,863 B1 | 9/2003 | Jacobs et al. | |
| 6,717,644 B2 | 4/2004 | Schadt et al. | |
| 7,083,834 B2 | 8/2006 | Kuntz et al. | |

(Continued)

FOREIGN PATENT DOCUMENTS

JP      11-084131      3/1999

(Continued)

OTHER PUBLICATIONS

Japanese Office Action for corresponding JP2009-068706 issued on Mar. 16, 2010.

(Continued)

*Primary Examiner* — Nathanael R Briggs
(74) *Attorney, Agent, or Firm* — K&L Gates LLP

(57) ABSTRACT

A retardation film which is manufacturable by a simple process, and being capable of preventing a decline in light use efficiency is provided. A retardation film includes: a substrate having a plurality of grooves extending in a specific direction on a surface thereof; and a retardation layer arranged in contact with the surface of the substrate, and including a liquid crystal material, the liquid crystal material being aligned along the extending direction of the plurality of grooves and being polymerized.

28 Claims, 40 Drawing Sheets

U.S. PATENT DOCUMENTS

| | | | |
|---|---|---|---|
| 7,411,645 B2 | 8/2008 | Kashima | |
| 2003/0137626 A1 | 7/2003 | Khazova et al. | |
| 2003/0189684 A1* | 10/2003 | Kuntz et al. | 349/123 |
| 2004/0189909 A1 | 9/2004 | Kashima | |
| 2008/0044125 A1 | 2/2008 | Kakiuchi et al. | |
| 2008/0180619 A1 | 7/2008 | Kashima | |
| 2009/0188901 A1* | 7/2009 | Dantus | 219/121.76 |

FOREIGN PATENT DOCUMENTS

| | | |
|---|---|---|
| JP | 2001-188127 | 7/2001 |
| JP | 3360787 | 12/2002 |
| JP | 2003-207641 | 7/2003 |
| JP | 2003-211400 | 7/2003 |
| JP | 2003-251643 | 9/2003 |
| JP | 2003-307625 | 10/2003 |
| JP | 2003-337223 | 11/2003 |
| JP | 2004-145327 | 5/2004 |
| JP | 2004-170693 | 6/2004 |
| JP | 2004-287406 | 10/2004 |
| JP | 2005-070745 | 3/2005 |
| JP | 2006-030461 | 2/2006 |
| JP | 2006-133385 | 5/2006 |
| JP | 2006-309181 | 11/2006 |
| JP | 3881706 | 2/2007 |
| JP | 2008-100421 | 5/2008 |
| JP | 2004-126283 | 6/2008 |
| JP | 2008-126283 | 6/2008 |
| JP | 2008-170557 | 7/2008 |
| WO | 2004/035255 A1 | 4/2004 |
| WO | 2006-112480 | 10/2006 |

OTHER PUBLICATIONS

Japanese Office Action issued on Jul. 27, 2010 corresponding to Japanese Patent Appln. No. 2010-149955.

Japanese Office Action issued on Jul. 27, 2010 corresponding to Japanese Patent Appln. No. 2010-150002.

Japanese Office Action issued on Oct. 26, 2010, for corresponding Application No. JP 2010-149955.

* cited by examiner

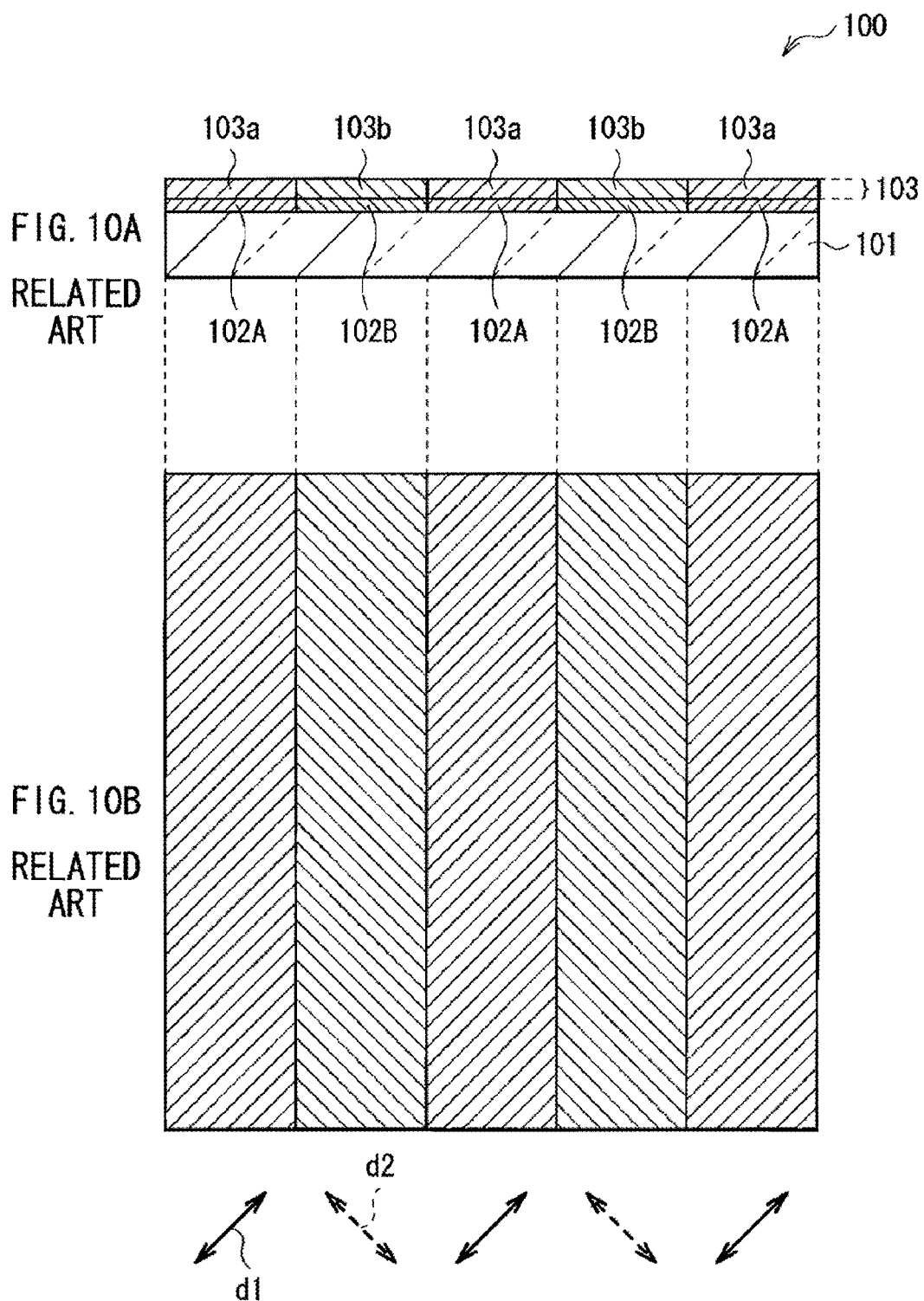

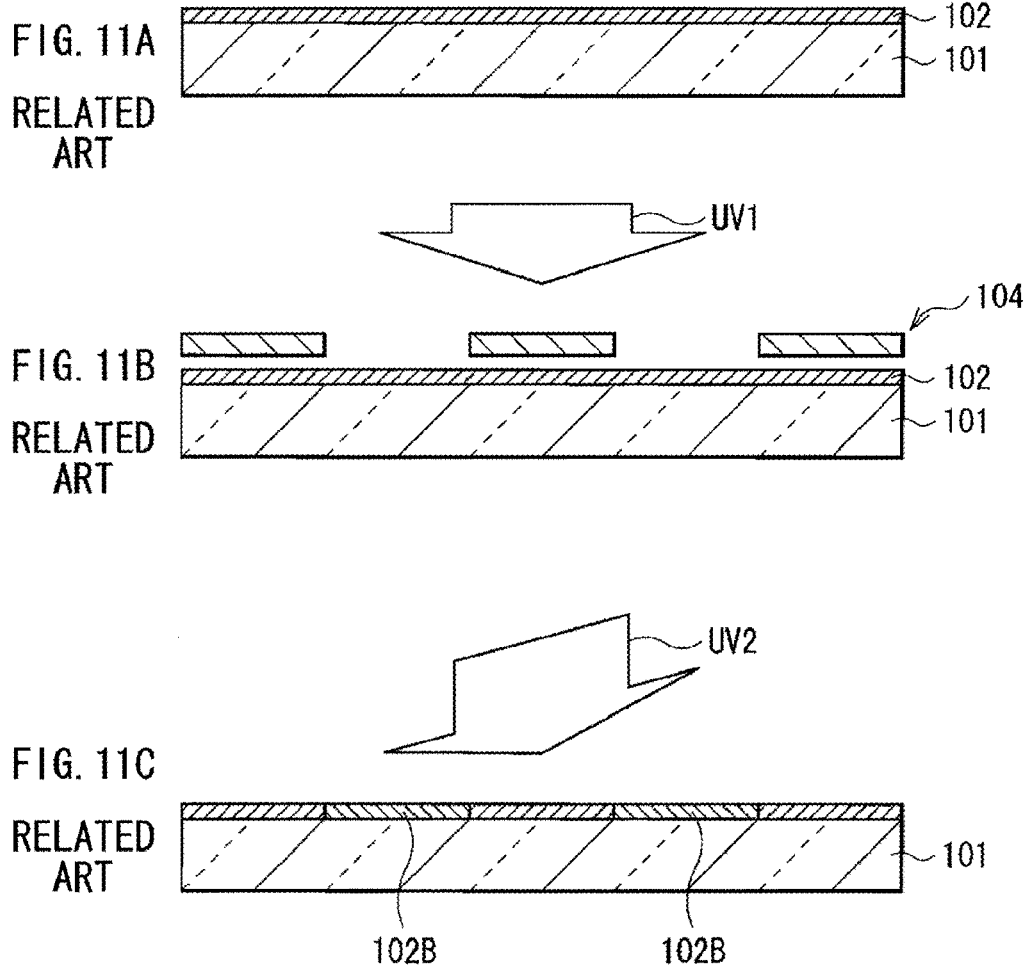

FIG. 12A
RELATED ART
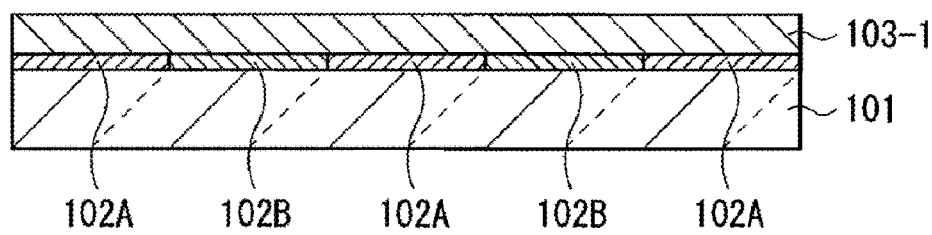
102A 102B 102A 102B 102A ... 103-1, 101
FIG. 12B
RELATED ART
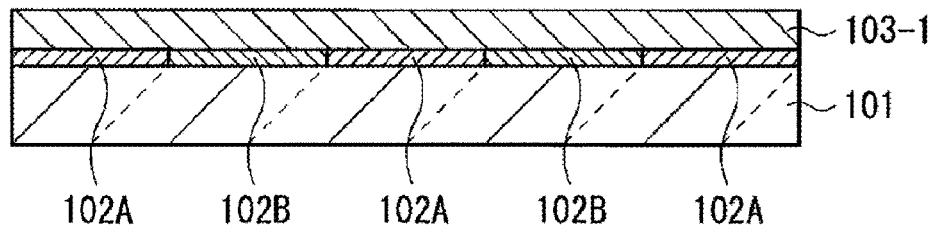
102A 102B 102A 102B 102A ... 103-1, 101

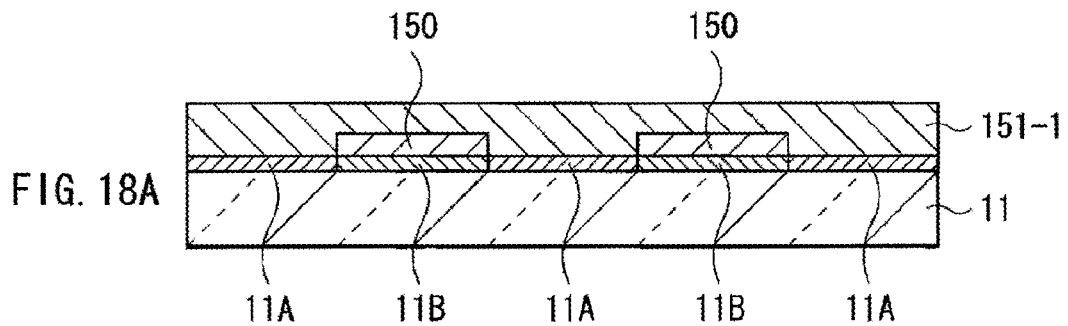
FIG. 18A
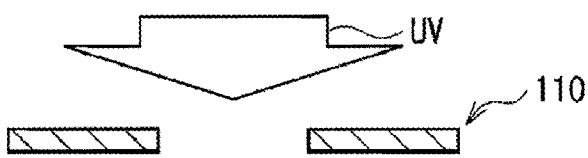
FIG. 18B
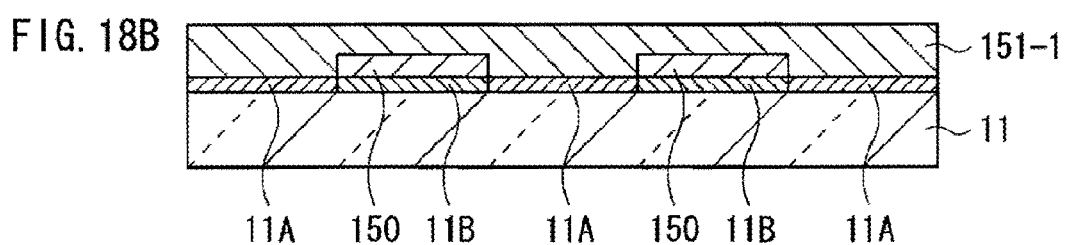
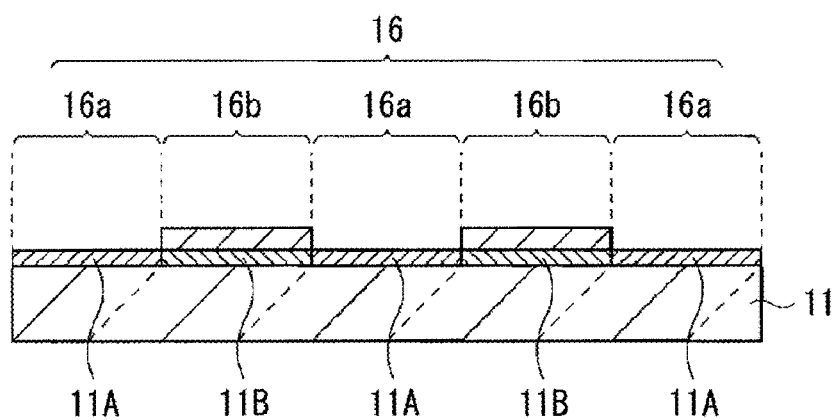
FIG. 19

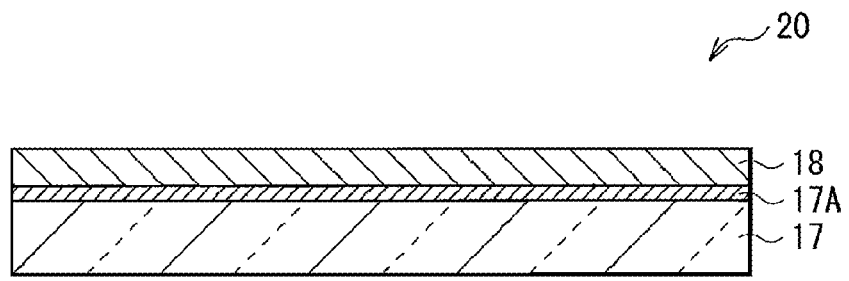
FIG. 20A
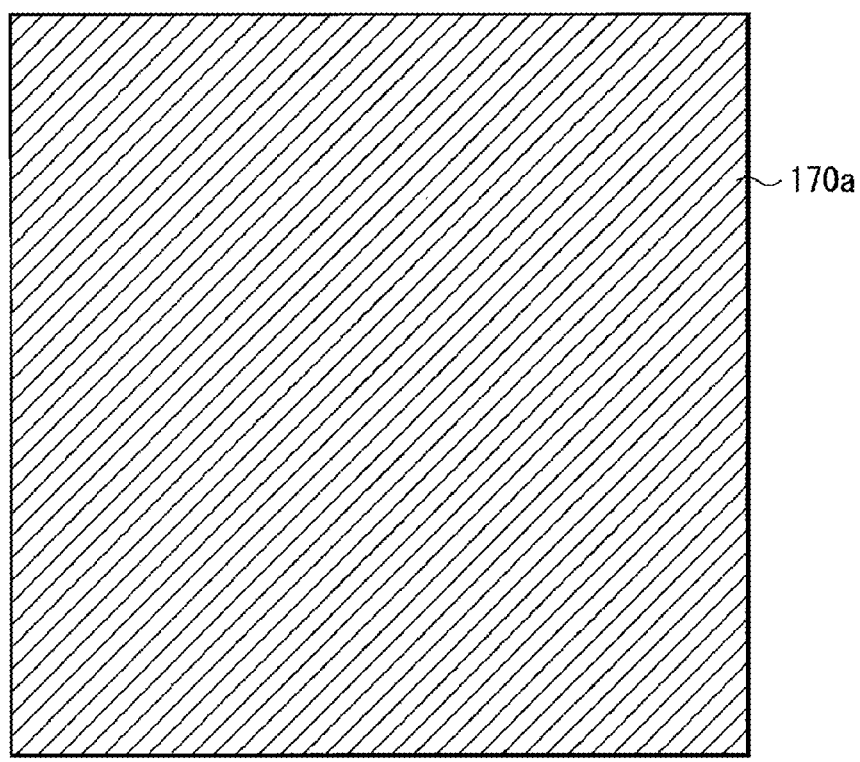
FIG. 20B

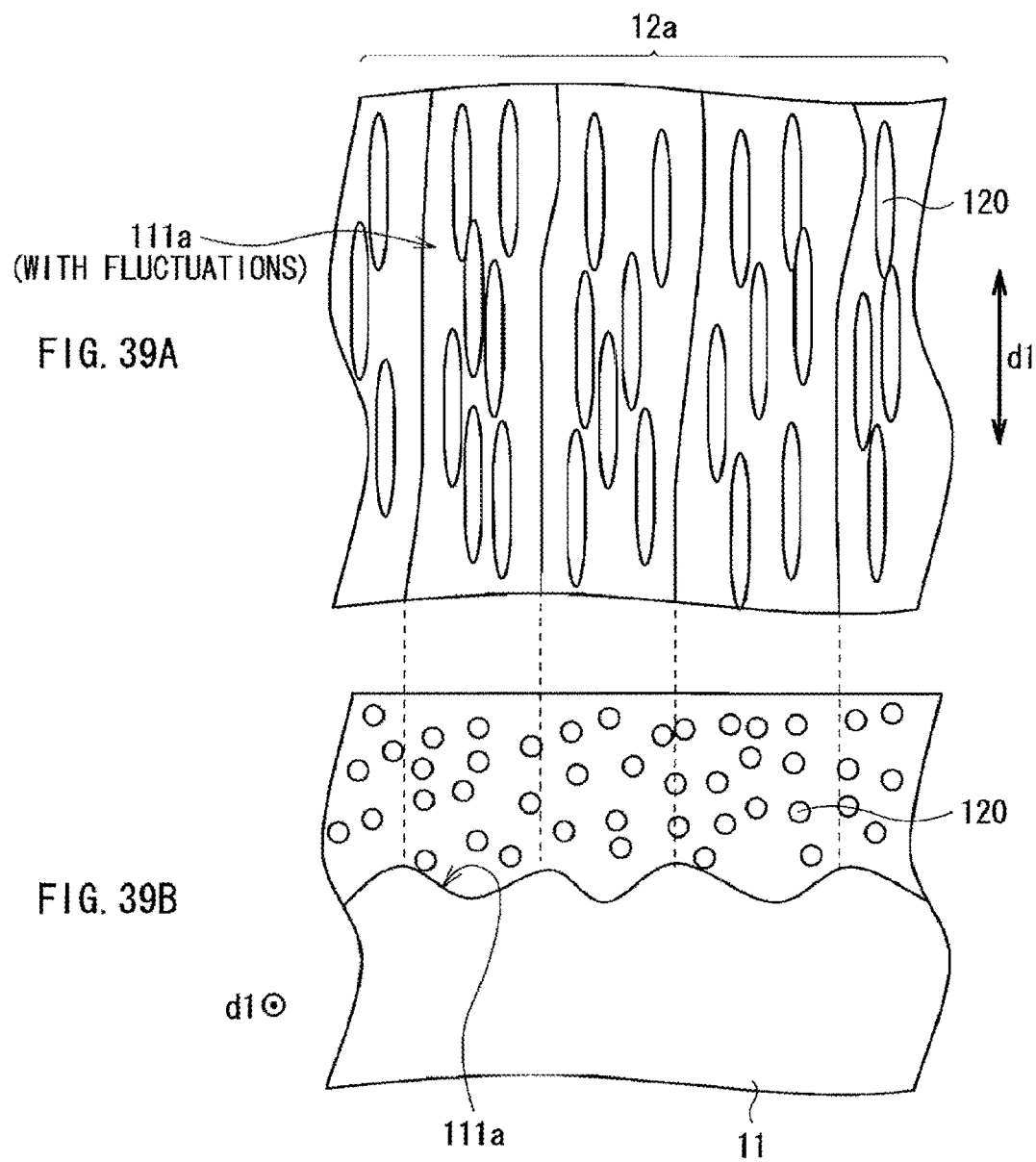

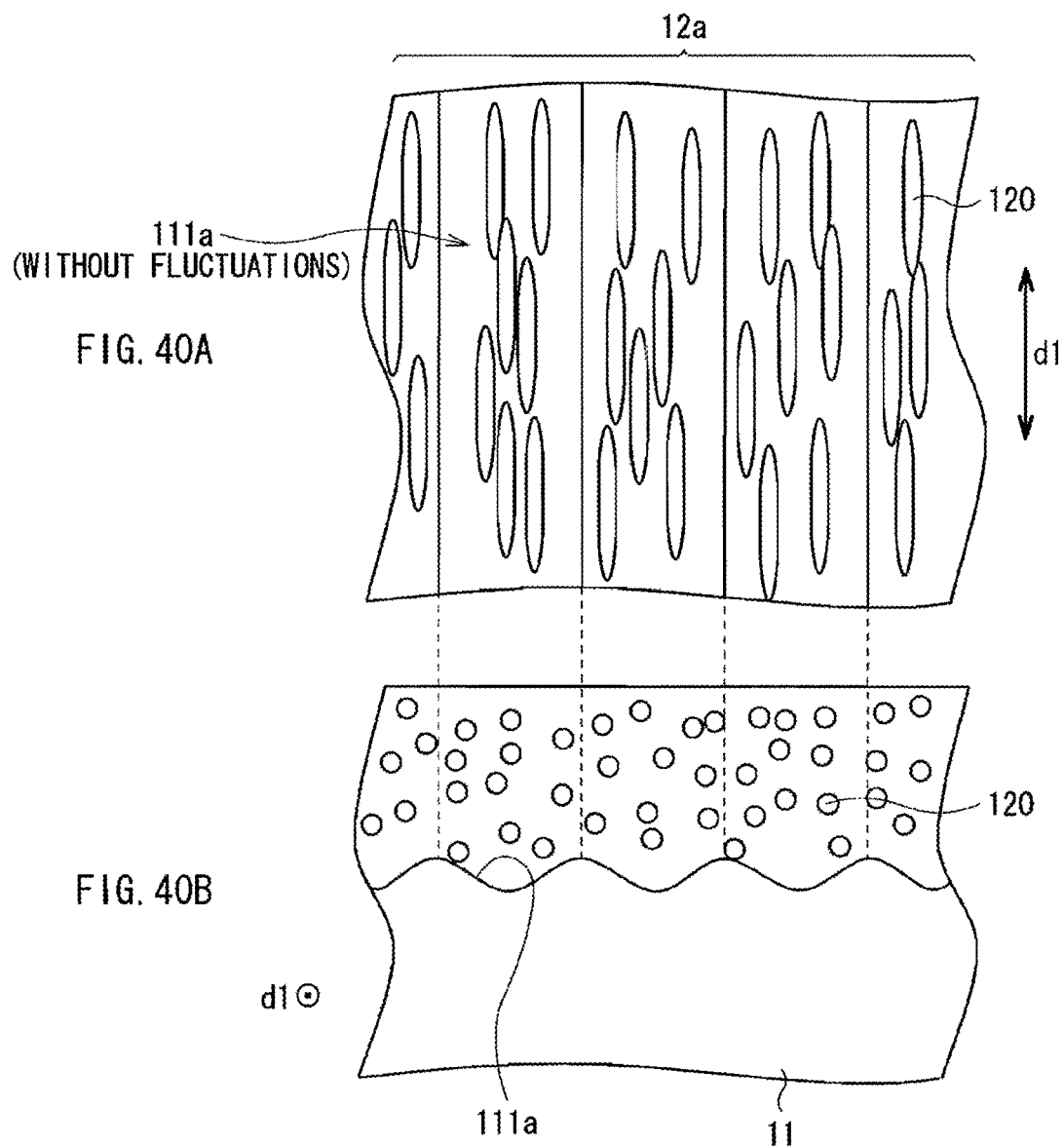

210A

DFT IMAGE

210A

DFT IMAGE

RETARDATION FILM, METHOD OF MANUFACTURING THE SAME, AND DISPLAY

CROSS REFERENCES TO RELATED APPLICATIONS

The present application claims priority to Japanese Priority Patent Application JP 2008-242203 filed in the Japan Patent Office on Sep. 22, 2008, Japanese Priority Patent Application JP 2008-305350 filed in the Japan Patent Office on Nov. 28, 2008, and Japanese Priority Patent Application JP 2009-068706 filed in the Japan Patent Office on Mar. 19, 2009, the entire content of which is hereby incorporated by references.

BACKGROUND

The present application relates to a retardation film using a liquid crystal material, a method of manufacturing the same, and a display using such a retardation film.

In recent years, the development of displays allowing three-dimensional display has been advanced. As a three-dimensional display system, for example, a system in which an image for the right eye of a user and an image for the left eye of the user are displayed on a screen of a display, and the user wearing a pair of polarized glasses views the images has been proposed as described in, for example, U.S. Pat. No. 5,686,975. This system is achieved by arranging a patterned retardation film in front of a display allowing two-dimensional display, for example, a cathode-ray tube display, a liquid crystal display or a plasma display. To control the polarization states of light entering the right eye and light entering the left eye, in such a retardation film, it is necessary to form a pattern of retardation or an optical axis at a pixel level of a display.

For example, in U.S. Pat. No. 5,686,975 and U.S. Pat. No. 5,327,285, techniques of forming the above-described retardation film by partially patterning a liquid crystal material or a retardation material with a photoresist or the like have been proposed. However, in such techniques, the number of process steps is large, thereby it is difficult to manufacture the retardation film at low cost. Therefore, in Japanese Patent No. 3881706, a technique of forming a retardation film by performing patterning with a photo-alignment film has been proposed. More specifically, the photo-alignment film is formed on a substrate, and then the photo-alignment film is patterned by a polarized ultraviolet ray. After that, the patterned photo-alignment film is coated with a liquid crystal material having polymerizability (hereinafter referred to as liquid crystalline monomer) so as to align liquid crystal molecules in a desired direction. After that, the liquid crystalline monomer is polymerized by irradiation with an ultraviolet ray, thereby the retardation film is formed. Moreover, in a liquid crystal display, a technique of performing patterning by performing a rubbing process on a polyimide alignment film is frequently used.

SUMMARY

However, in a technique using a photo-alignment film described in Japanese Patent No. 3881706 or a technique of performing a rubbing process on a polyimide alignment film, there is an issue that light absorption or coloring occurs in the alignment film to cause a decline in transmittance, and thereby cause a decline in light use efficiency. Moreover, in the technique using the photo-alignment film, it is necessary for the photo-alignment film to be partially irradiated with a polarized ultraviolet ray during patterning, so there is an issue that the number of process steps is increased.

It is desirable to provide a retardation film being manufacturable by a simple process, and capable of preventing a decline in light use efficiency, a method of manufacturing the same, and a display.

According to an embodiment, there is provided a retardation film including: a substrate having a plurality of grooves extending in a specific direction on a surface thereof; and a retardation layer arranged in contact with the surface of the substrate, and including a liquid crystal material, the liquid crystal material being aligned along the extending direction of the plurality of grooves and being polymerized. The substrate in the embodiment of the invention is a plate-like or film-like base, and the substrate may have a configuration in which any other resin layer or the like is laminated on such a base.

In the retardation film according to the embodiment, a polymerizable liquid crystal material is aligned along the extending direction of the plurality of grooves arranged on the surface of the substrate, thereby an optical axis of the retardation film is formed based on the extending direction of the grooves, and phase difference characteristics are exerted. In this case, since the retardation layer is arranged in contact with the surface of the substrate, that is, since a photo-alignment film or an alignment film for rubbing is not arranged around an interface between the retardation layer and the substrate, light loss around the interface is reduced.

According to an embodiment, there is provided a display including: a light source; a display cell performing display based on light from the light source; a first polarizer and a second polarizer arranged on a light source side and a display side of the display cell, respectively; and the above-described retardation film according to the embodiment of the invention arranged on a light emission side of one or both of the first polarizer and the second polarizer.

According to an embodiment, there is provided a method of manufacturing a retardation film including the steps of: forming a plurality of grooves extending in a specific direction on a surface of a substrate; coating the surface on which the plurality of grooves are formed of the substrate with a liquid crystal material having polymerizability so that the liquid crystal material is arranged in contact with the surface of the substrate; and polymerizing the liquid crystal material.

In the method of manufacturing a retardation film according to the embodiment, the surface on which the plurality of grooves are formed of the substrate is coated with the liquid crystal material having polymerizability, thereby liquid crystal molecules are aligned according to the extending direction of the grooves by the shapes of the grooves. After that, the above-described liquid crystal material is polymerized to fix the alignment state of the liquid crystal molecules.

In addition, in the retardation film and the method of manufacturing a retardation film according to the embodiment, the plurality of grooves may include a plurality of first grooves extending in a first direction and a plurality of second grooves extending in a second direction orthogonal to the first direction. At this time, first groove regions including the plurality of first grooves and second groove regions including the plurality of second grooves may each have a stripe shape, and may be alternately arranged.

In the retardation film and the method of manufacturing a retardation film according to an embodiment, the polymerizable liquid crystal material is aligned by the grooves on the substrate by arranging the retardation layer in contact with the surface of the substrate having the plurality of grooves, that is, without arranging a photo-alignment film or an alignment film for rubbing. Thereby, compared to the case where the above-described alignment film is used, light loss around an interface between the substrate and the retardation layer is allowed to be reduced. Therefore, the retardation film is manufacturable by a simple process, and a decline in light use efficiency is preventable. Moreover, in the display according to the embodiment of the invention, the above-described retardation film is arranged on the light source side or the display side of the display cell, so in the case where the retardation film is used as, for example, a retardation film for stereoscopic viewing using polarized glasses or a viewing angle compensation film, bright display is achievable.

Additional features and advantages are described herein, and will be apparent from the following Detailed Description and the figures.

BRIEF DESCRIPTION OF THE FIGURES

FIGS. 10A and 10B are illustrations of a brief configuration of a retardation film according to a comparative example.

FIGS. 11A, 11B and 11C are illustrations describing a method of manufacturing the retardation film illustrated in FIGS. 10A and 10B.

FIGS. 12A and 12B are illustrations of steps in the method of manufacturing the retardation film following steps of FIGS. 11A to 11C.

FIGS. 18A and 18B are illustrations describing a method of manufacturing the retardation film illustrated in FIG. 17.

FIG. 19 is a sectional view illustrating a brief configuration of a retardation film according to Modification 4.

FIGS. 20A and 20B are sectional views illustrating a brief configuration of a retardation film according to Modification 5.

FIGS. 38A and 38B are illustrations of an uneven surface in a pattern region formed by electron beam lithography or the like.

FIGS. 39A and 39B are illustrations of alignment of liquid crystal molecules formed on the uneven surface in FIGS. 37A and 37B.

FIGS. 40A and 40B are illustrations of alignment of liquid crystal molecules formed on the uneven surface in FIGS. 38A and 38B.

DETAILED DESCRIPTION

The present application will be described below in greater detail with reference to the drawings as follows:

1. Embodiment (an example in which the optical axes of retardation regions form +45° and −45° with a stripe direction)
2. Modification 1 (an example in which the optical axes of retardation regions form 0° and +90° with a stripe direction)
3. Modification 2 (an example in which retardation of a retardation region is changed depending on a liquid crystal material)
4. Modification 3 (an example in which retardation of a retardation region is changed depending on a liquid crystal material and its thickness)
5. Modification 4 (an example in which a retardation layer is formed only in a partial region of a substrate surface)
6. Modification 5 (an example in which the optical axis of a retardation region is formed only in one direction in a substrate surface)
7. Modification 6 (an example in which grooves of a mold for transfer are formed by laminating metal thin plates having grinding marks at their ends)
8. Modification 7 (an example in which grooves of a mold for transfer are formed by processing with a grinding wheel rotating at a tilt)
9. Modification 8 (an example in which grooves of a mold for transfer are formed by processing using a cutting tool)
10. Modification 9 (an example in which grooves of a mold for transfer are formed by pressure transfer of grooves)
11. Modification 10 (an example in which grooves of a mold for transfer are formed by an ultrashort pulse laser)
12. Application Example 1 (3D display)
13. Application Example 2 (display for two-dimensional display)
14. Application Example 3 (semi-transmissive display for two-dimensional display)
15. Example 1 (an example in which grooves were formed with a resist layer formed by electron beam lithography)
16. Example 2 (an example in which grooves were formed with a flat plate mold formed by an ultrashort pulse laser)
17. Example 3 (an example in which grooves were formed with a substrate made of a material different from a material used in Example 2)
18. Example 4 (an example in which grooves were formed with a mold roll formed by an ultrashort pulse laser)
19. Example 5 (an example in which grooves were formed with a substrate made of a material different from a material used in Example 2)

Configuration of Retardation Film 10

Figure 1:
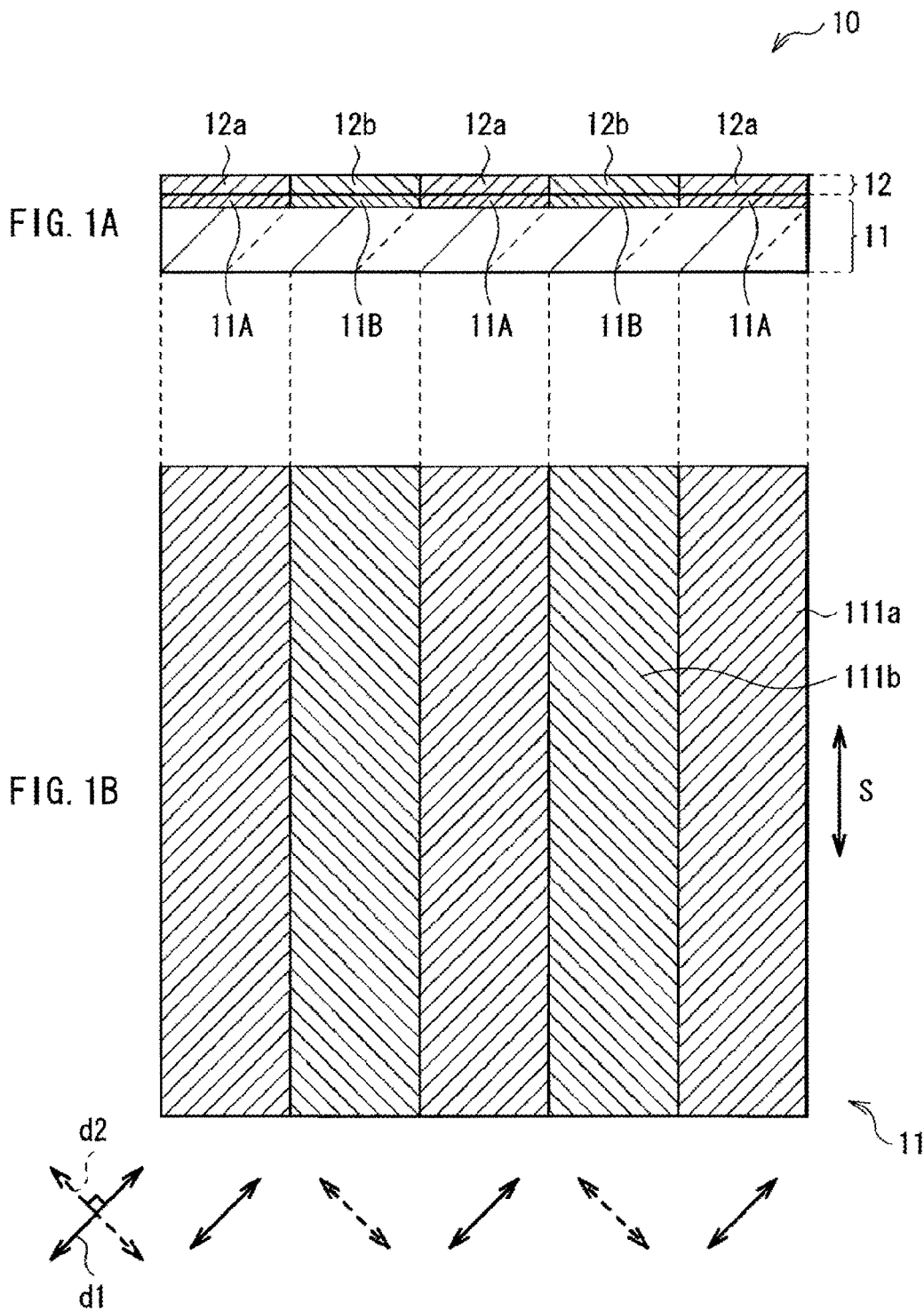
FIGS. 1A and 1B are illustrations of a brief configuration of a retardation film according to an embodiment.

FIG. 1A illustrates an example of a sectional configuration of a retardation film 10 according to an embodiment. FIG. 1B is an illustration of a substrate 11 in FIG. 1A viewed from a surface thereof. In the retardation film 10, patterns of groove regions 11A and 11B are formed on a surface of a substrate 11, and a retardation layer 12 is formed in contact with the substrate 11.

The substrate 11 is made of, for example, a thermoplastic material such as plastic, more specifically polymethylmethacrylate, polycarbonate, polystyrene or the like. Moreover, in the case where the retardation film 10 is used for a polarized-glasses type three-dimensional display which will be described later, a phase difference in the substrate 11 is preferably as small as possible, so the substrate 11 is preferably made of an amorphous cycloolefin polymer, an alicyclic acrylic resin or a norbornene-based resin. The thickness of the substrate 11 is, for example, 30 μm to 500 μm. In the embodiment, unlike the case where liquid crystal molecules are aligned by using an alignment film as in the case of related art, a heating process at high temperature is not necessary, so an inexpensive plastic material which is processed more easily than a glass material or the like is usable.

Figure 2:
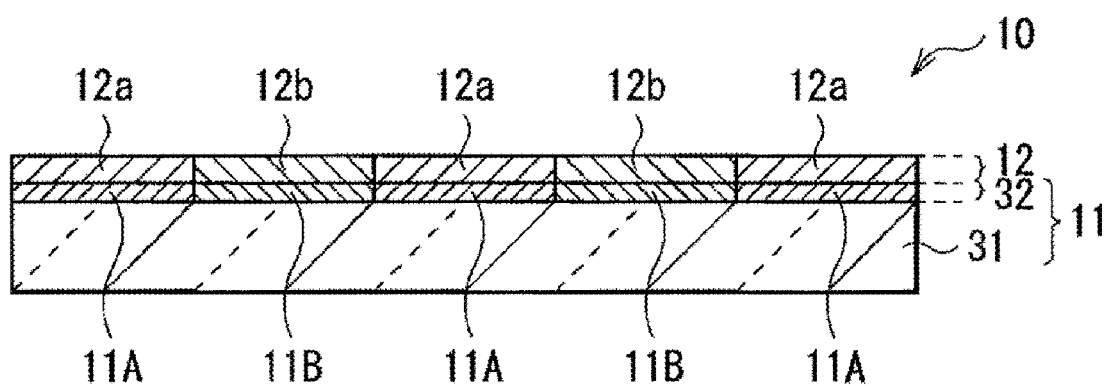
FIG. 2 is a sectional view of a modification of the retardation film in FIGS. 1A and 1B.

The substrate 11 may have, for example, a single-layer configuration or a multilayer configuration. In the case where the substrate 11 has a multilayer configuration, for example, as illustrated in FIG. 2, the substrate 11 has a two-layer configuration in which a resin layer 32 is formed on a surface of a base 31. In this case, the resin layer 32 is different from a photo-alignment film in Japanese Patent No. 3881706 or a polyimide alignment film, and light absorption or coloring hardly occurs in the resin layer 32. As the resin layer 32, for example, an acrylic curable resin may be used. In addition, FIG. 2 exemplifies the case where the patterns of the above-described groove regions 11A and 11B are formed in the resin layer 32 formed in an outermost layer of the substrate 11.

For example, the groove regions 11A and 11B are alternately arranged in stripes on a surface of the substrate 11. The stripe widths of the groove regions 11A and 11B are equal to, for example, the width of a pixel pitch in a display (which will be described later). The groove regions 11A each include a plurality of grooves 111a arranged, and the plurality of grooves 111a extend along a common direction d1. The groove regions 11B each include a plurality of grooves 111b arranged, and the plurality of grooves 111b extend along a common direction d2. Moreover, the directions d1 and d2 are orthogonal to each other. However, in the embodiment, the directions d1 and d2 form angles of −45° and +45° with respect to a stripe direction S of the groove regions 11A and 11B, respectively.

In this description, "orthogonal" means not only "perfectly orthogonal" but also "substantially orthogonal" caused by some factors such as a manufacturing error and variations.

The retardation layer 12 is formed by alternately arranging retardation regions 12a and 12b in stripes. The retardation regions 12a and 12b are arranged opposed to the above-described groove regions 11A and 11B, respectively, and have different phase difference characteristics from each other. More specifically, predetermined retardation values of the retardation regions 12a and 12b are set, where in the retardation regions 12a, the extending direction d1 of the grooves 111a in the groove regions 11A is an optical axis, and in the retardation regions 12b, the extending direction d2 of the grooves 111b in the groove regions 11B is an optical axis. In the embodiment, the retardation regions 12a and 12b have different optical axis directions from each other, and have absolute retardation values equal to each other.

Figure 3:
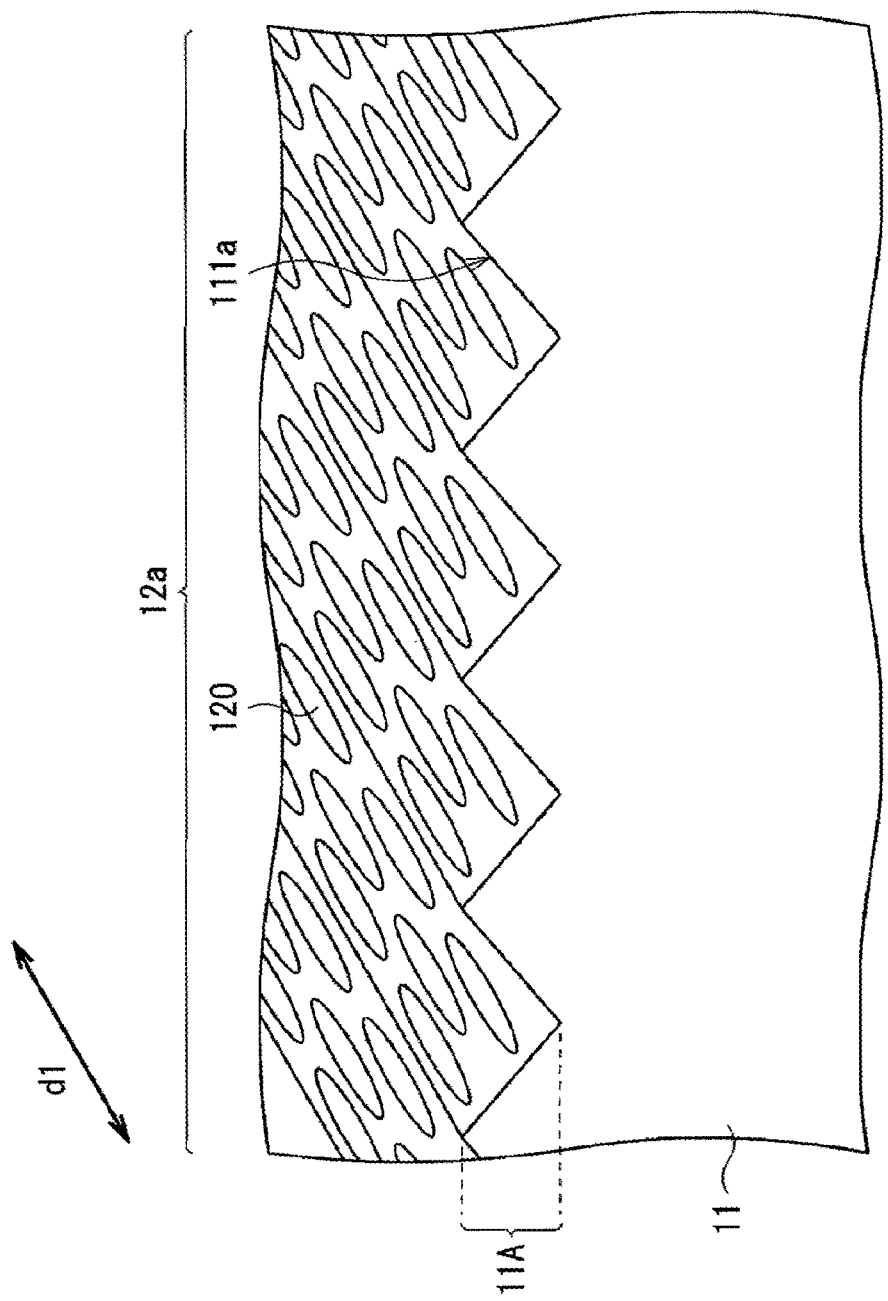
FIG. 3 is a schematic view for describing a specific configuration of the retardation film illustrated in FIGS. 1A and 1B.
Figure 4:
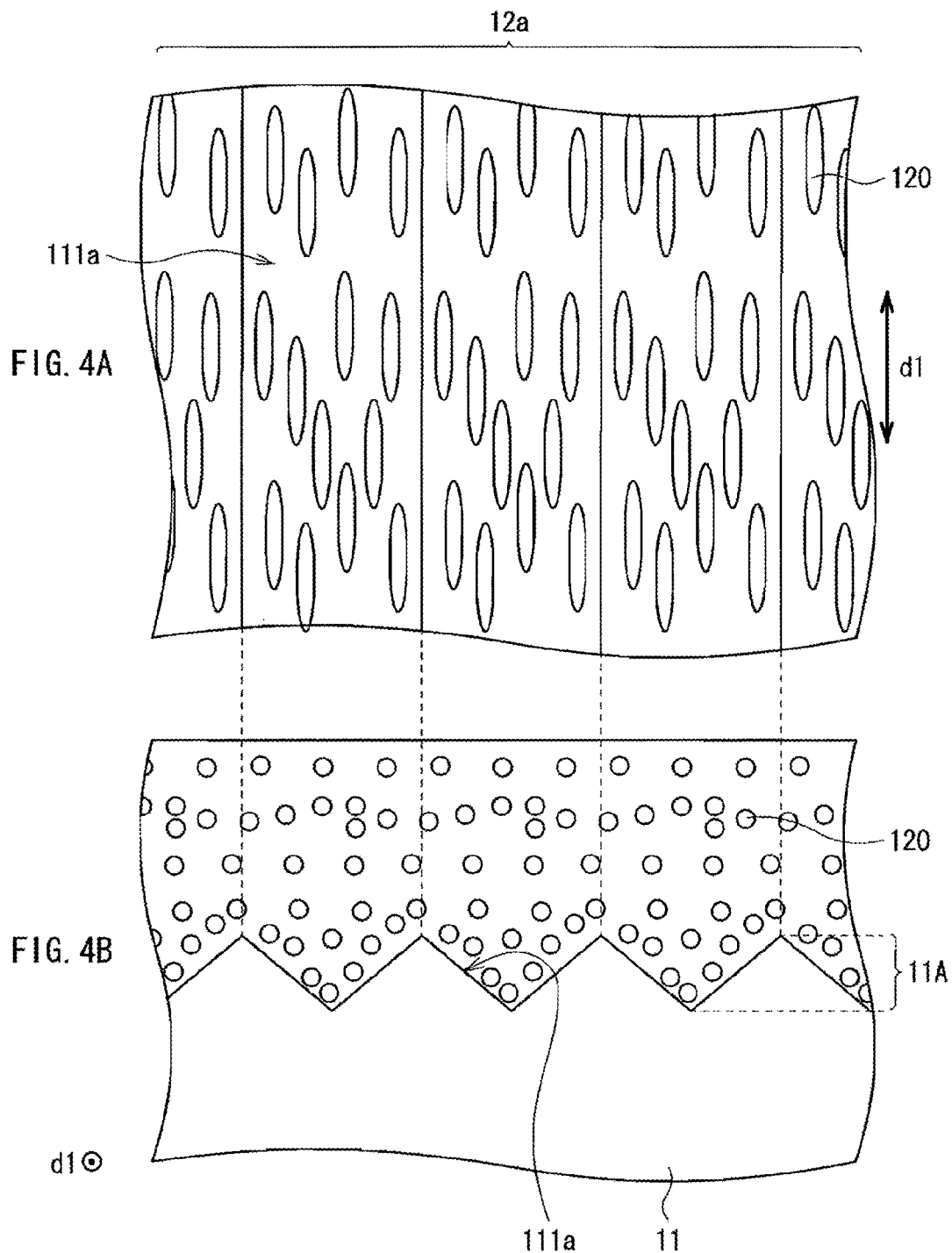
FIGS. 4A and 4B are schematic views for describing a specific configuration of the retardation film illustrated in FIGS. 1A and 1B.

In this case, referring to FIGS. 3 and 4A and 4B, configurations of the groove regions 11A and 11B and the retardation layer 12 will be described in detail below. FIG. 3 is a schematic perspective view of an example of a state around an interface between the groove region 11A and the retardation region 12a. FIGS. 4A and 4B are a top view and a sectional view around the interface in FIG. 3, respectively. The groove region 11A and the groove region 11B have the same configuration except for the extending directions of the grooves 111a and 111b, so the groove region 11A will be described as an example below.

In the groove region 11A, each groove 111a has, for example, a sectional shape of the letter V. In other words, the sectional shape of the whole groove region 11A is saw-toothed. The grooves 111a with such a shape are collectively formed by transfer using, for example, a mold which will be described later.

The retardation layer 12 includes, for example, a polymerized polymer liquid crystal material. That is, in the retardation layer 12, the alignment state of liquid crystal molecules 120 is fixed. As the polymer liquid crystal material, a material selected based on a phase transition temperature (liquid crystal phase-isotropic phase), refractive index wavelength dispersion characteristics of a liquid crystal material, viscosity, a process temperature, or the like is used. However, the material preferably includes an acryloyl group or a methacryloyl group as a polymerizable group in terms of transparency. Moreover, a material not having a methylene spacer between a polymerizable functional group and a liquid crystal skeleton is preferably used, because the material allows a reduction in a temperature for an alignment process during a process. The thickness of the retardation layer 12 is, for example, 0.1 µm to 10 µm. In addition, in the case where the retardation layer 12 includes the polymerized polymer liquid crystal material, it is not necessary for the retardation layer 12 to be made of only the polymerized polymer liquid crystal material, and the retardation layer 12 may include a non-polymerized liquid crystalline monomer in a part thereof, because the non-polymerized liquid crystalline monomer included in the retardation layer 12 is aligned in the same direction as the alignment direction of the liquid crystal molecules 120 which are present around the non-polymerized liquid crystalline monomer by an alignment process (a heating process) which will be described later, and the non-polymerized liquid crystalline monomer has the same alignment characteristics as those of the polymer liquid crystal material.

The long axes of the liquid crystal molecules 120 around an interface between the groove region 11A and the retardation region 12a are aligned along the extending direction d1 of the grooves 111a. Moreover, liquid crystal molecules 120 in an upper part of the retardation region 12a (not illustrated) are also aligned along the direction d1 so as to follow liquid crystal molecules 120 in a lower part of the retardation region 12a. That is, the alignment of the liquid crystal molecules 120 is controlled by the shapes of the grooves 111a extending in the direction d1 in the groove region 11A to set the optical axis of the retardation region 12a.

Moreover, in the above-described retardation layer 12, the retardation value of the retardation layer 12 is set by adjusting the materials or thicknesses of the retardation regions 12a and 12b. In the case where the substrate 11 has a phase difference, the retardation value of the retardation layer 12 is preferably set in consideration of the phase difference in the substrate 11. In the embodiment, the retardation regions 12a and 12b are made of the same material with the same thickness, thereby as described above, the absolute retardation values of the retardation regions 12a and 12b are equal to each other.

Method of Manufacturing Retardation Film 10

Next, a method of manufacturing the above-described retardation film 10 will be described below. First, the case where the substrate 11 is manufactured by a thermal transfer method will be described, and then the case where the substrate 11 is manufactured by a so-called 2P molding method (Photo Polymerization: a molding method using photo curing) will be described. After that, the method of manufacturing the retardation film 10 with the substrate 11 manufactured by the above-described methods will be described.

Figure 5:
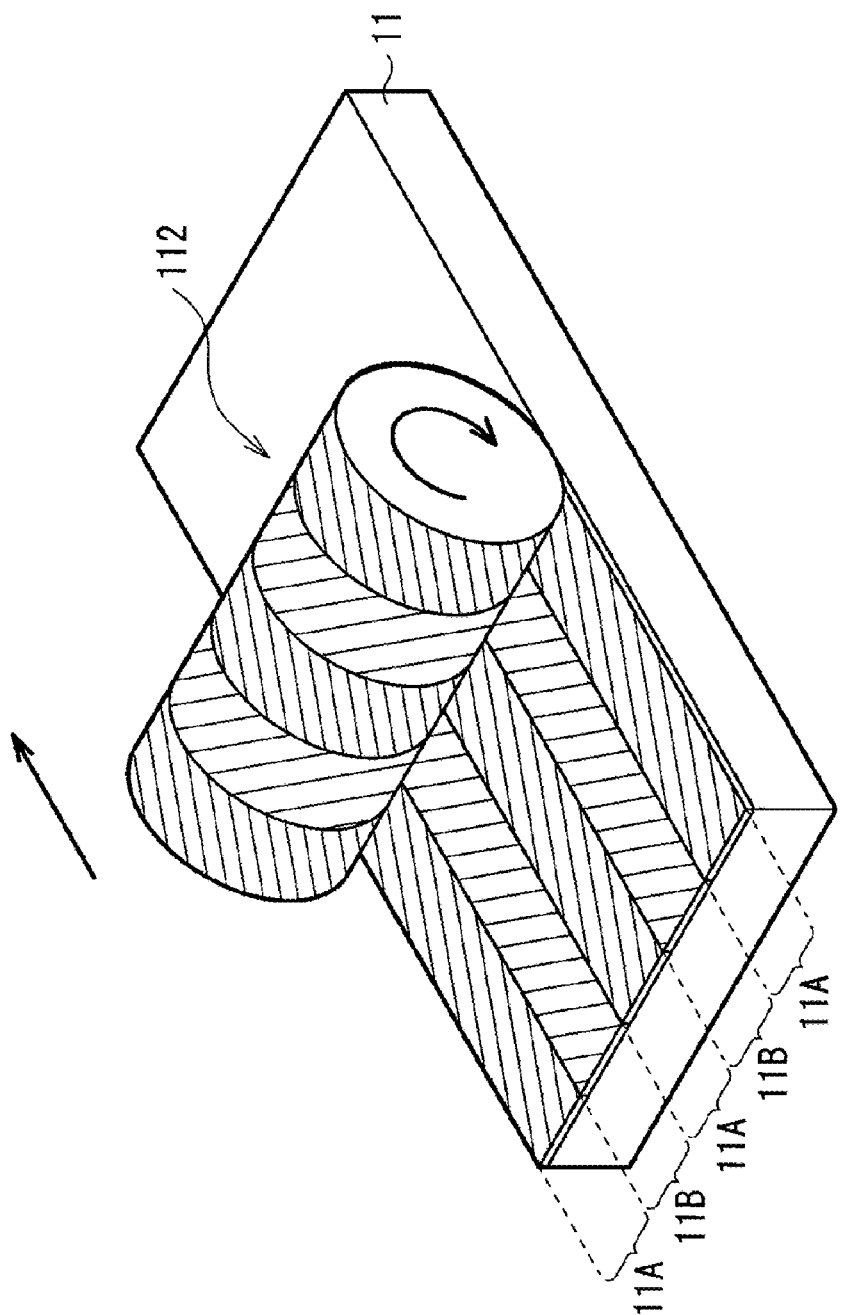
FIG. 5 is an illustration for describing a method of manufacturing a substrate illustrated in FIGS. 1A and 1B.
Figure 6:
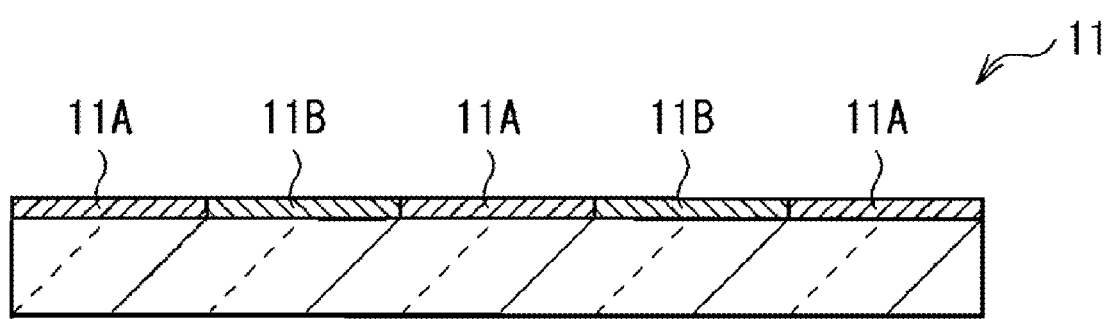
FIG. 6 is a sectional view of the substrate manufactured by the method in FIG. 5.

FIG. 5 illustrates a process of manufacturing the substrate 11 by the thermal transfer method. As illustrated in FIG. 5, the patterns of the groove regions 11A and 11B are formed on the surface of the substrate 11. The substrate 11 at this time may have a single-layer configuration or a multilayer configuration (for example, a two-layer configuration in which a resin layer is formed on a surface of a base). At this time, for example, the groove regions 11A and 11B are collectively formed by transfer using a mold roll 112 on which reverse patterns of the groove regions 11A and 11B are formed. More specifically, the substrate 11 made of the above-described material is heated to near a glass-transition temperature, and the mold roll 112 is pressed against the surface of the heated substrate 11. Then, the substrate 11 is cooled down, and the mold roll 112 is separated from the substrate 11, thereby the groove regions 11A and 11B are formed on the whole surface of the substrate 11. Thereby, as illustrated in FIG. 6, the groove regions 11A and 11B are alternately formed in stripes on the surface of the substrate 11.

As the material of the above-described mold roll 112, for example, a metal material such as NiP, copper (Cu) or stainless, quartz, silicon, silicon carbide, sapphire, diamond, or the like may be used. The mold roll 112 is formed by forming a reverse pattern on a surface of a base made of such a material by, for example, cutting with a cutting tool, any of various lithography methods or the like, and then wrapping the base around a roll. In addition, in the case where the reverse pattern is formed by cutting with the cutting tool, as the material of the mold roll 112, NiP is preferably used. Moreover, as the mold for transfer, the mold roll 112 with a roll shape as described in the embodiment may be used, or a plate-shaped mold may be used. However, the use of a mold with a roll shape allows an improvement in mass production.

Figure 7:
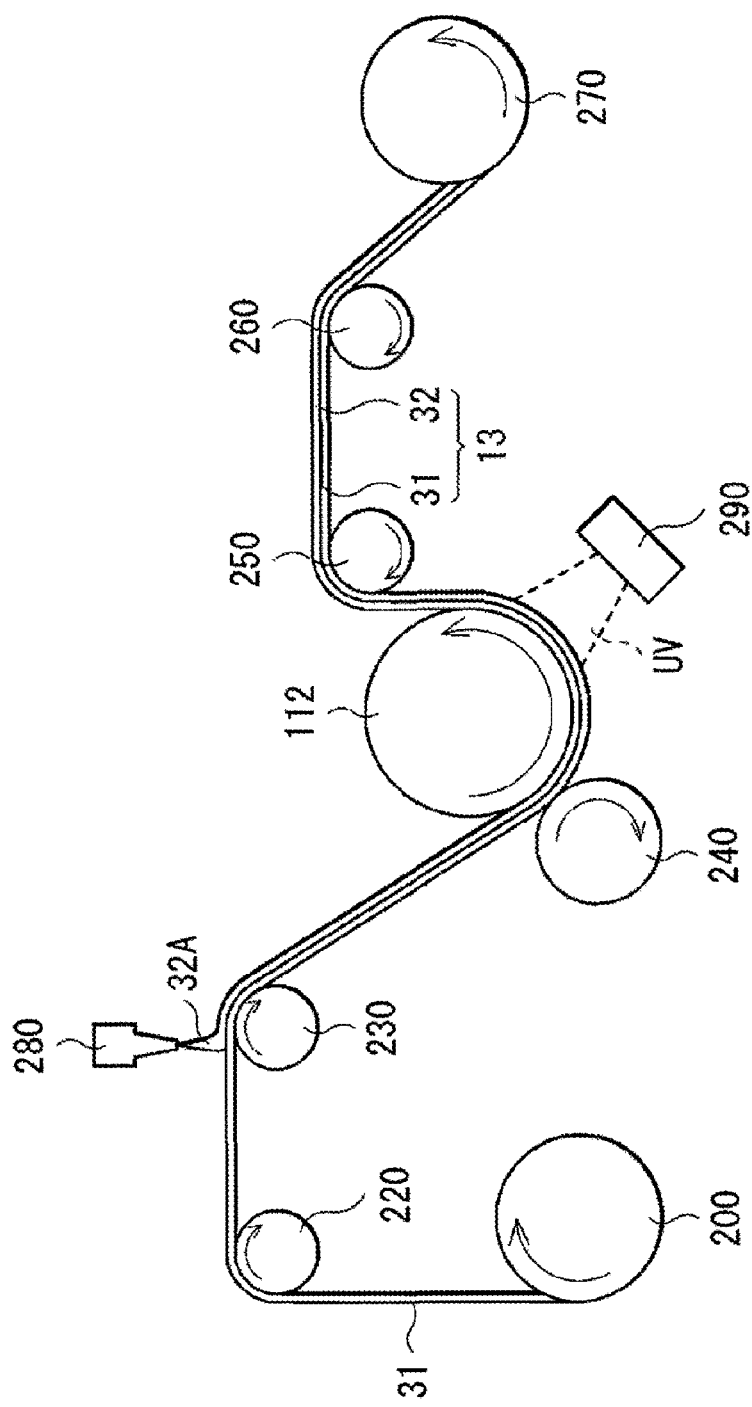
FIG. 7 is an illustration of a brief configuration of an apparatus for manufacturing a substrate illustrated in FIG. 2.

FIG. 7 illustrates an example of an apparatus for manufacturing the substrate 11 by the 2P molding method. In the 2P molding method, for example, the base is coated with a resin material which is curable by an ultraviolet ray or an electron beam to form a resin layer, and then a mold having a reverse pattern of a groove region is pressed against the formed resin layer. After that, an energy ray such as an ultraviolet ray or an electron beam is applied to the resin layer to cure the resin layer, thereby the pattern on the mold is transferred to a surface of the resin layer. The configuration of the manufacturing apparatus illustrated in FIG. 7 and a method of manufacturing the substrate 11 by the manufacturing apparatus will be described below.

The manufacturing apparatus illustrated in FIG. 7 includes a winding roll 200, guide rolls 220, 230, 250 and 260, a nip roll 240, a mold roll 112, a take-up roll 270, a discharging device 280 and an ultraviolet irradiation device 290. In this case, a film-like base 31 is concentrically wound around the winding roll 200, and the winding roll 200 supplies the base 31. The base 31 which is drawn out from the winding roll 200 goes to the guide roll 220, the guide roll 230, the nip roll 240, the mold roll 112, the guide roll 250 and the guide roll 260 in order, and then the base 31 is taken up by the take-up roll 270. The guide rolls 220 and 230 guide the base 31 supplied from the winding roll 200 to the nip roll 240. The nip roll 240 presses the base 31 supplied from the guide roll 230 against the mold roll 112. The mold roll 112 is arranged at a predetermined distance from the nip roll 240. The reverse patterns of the groove regions 11A and 11B are formed on a circumferential surface of the mold roll 112. The guide roll 250 removes the base 31 wound around the mold roll 112 from the mold roll 112. Moreover, the guide roll 260 guides the base 31 separated by the guide roll 250 to the take-up roll 270. The discharging device 280 is arranged at a predetermined distance from a part in contact with the guide roll 230 of the base 31 supplied from the winding roll 200. The discharging device 280 drops a composite 32A on the base 31. The composite 32A is formed by adding an additive such as a photopolymerization initiator to a liquid-state resin material which is curable by an ultraviolet ray or an electron beam as necessary. The ultraviolet irradiation device 290 applies an ultraviolet ray to a part having passed through the nip roll 240 and being in contact with the mold roll 112 of the base 31 supplied from the winding roll 200.

The substrate 11 is formed by the manufacturing apparatus with such a configuration. More specifically, first, the base 31 drawn out from the winding roll 200 is guided to the guide roll 230 via the guide roll 220, and then the composite 32A is dropped onto the base 31 by the discharging device 280. The composite 32A dropped from the discharging device 280 is pressed against the circumferential surface of the mold roll 112 with the base 31 in between by the nip roll 240. Thereby, the composite 32A comes into close contact with the circumferential surface of the mold roll 112 without spaces, and an uneven shape formed on the circumferential surface of the mold roll 112 is transferred to the composite 32A.

Figure 8:
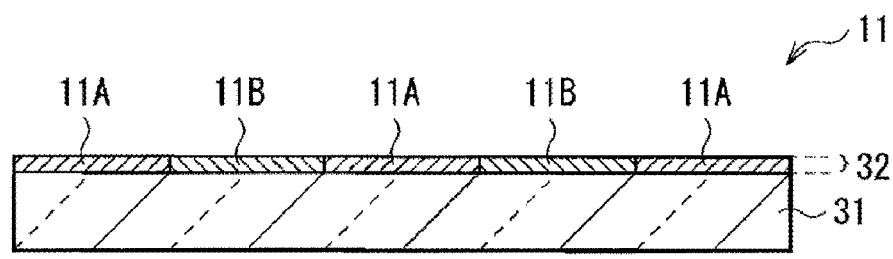
FIG. 8 is a sectional view of the substrate manufactured by a method in FIG. 7.

After that, an ultraviolet ray UV is applied to the composite 32A from the ultraviolet irradiation device 290. Thereby, the resin material included in the composite 32A is polymerized to form the resin layer 32 to which the uneven shape formed on the circumferential surface of the mold roll 112 is transferred. Finally, by the guide roll 250, the base 31 is separated from the mold roll 112, and then the base 31 is taken up by the take-up roll 270 via the guide roll 260. Thus, the substrate 11 having the resin layer 32 on the surface of the base 31 is formed (refer to FIG. 8).

In addition, in the case where the base 31 is made of a material which does not allow the ultraviolet ray UV to pass therethrough, the mold roll 112 may be made of a material allowing the ultraviolet ray UV to pass therethrough (for example, quartz), and the ultraviolet ray UV may be applied to the composite 32A from the inside of the mold roll 112.

Next, the method of manufacturing the retardation film 10 with the substrate 11 manufactured by the above-described method will be described below.

Figure 9A:
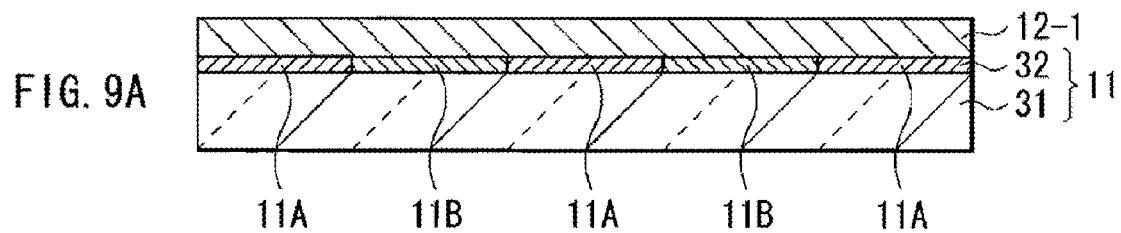
FIGS. 9A and 9B are illustrations describing a method of manufacturing a retardation film using the substrate manufactured by the method in FIG. 5 or FIG. 7.
Figure 9B:
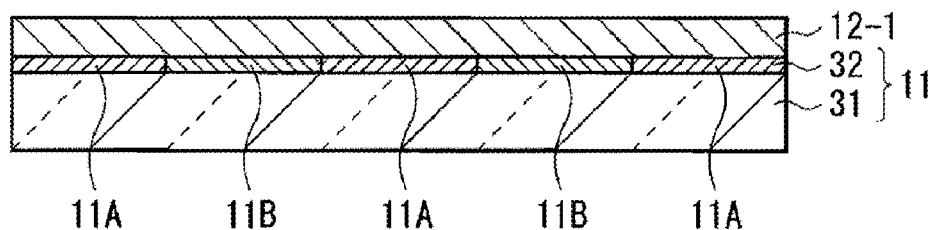

FIGS. 9A and 9B illustrate steps of manufacturing the retardation film 10 with the substrate 11. FIGS. 9A and 9B exemplify the case where the substrate 11 manufactured by the 2P molding method is used. As illustrated in FIG. 9A, a liquid crystal layer 12-1 including a liquid crystalline monomer is formed by coating with by, for example, a roll coater on the surface on which the patterns of the groove regions 11A and 11B are formed of the substrate 11. At this time, as the liquid crystal layer 12-1, a polymer compound not having a methylene spacer between a polymerizable functional group and a liquid crystal skeleton is used to exhibit a nematic phase around room temperature, so the heating temperature in an alignment process in a later step is reduced.

At this time, in the liquid crystal layer 12-1, if necessary, a solvent, a polymerization initiator, a polymerization inhibitor, a surface-active agent, a leveling agent or the like for dissolving the liquid crystalline monomer may be used. The solvent is not specifically limited, but as the solvent, a solvent having a high property of dissolving the liquid crystalline monomer, a low vapor pressure at room temperature and resistance to evaporation at room temperature is preferably used. Examples of a solvent having resistance to evaporation at room temperature include 1-methoxy-2-acetoxypropane (PGMEA), toluene, methyl ethyl ketone (MEK), methyl isobutyl ketone (MIBK) and the like, because when a solvent which is easily evaporated at room temperature is used, the evaporation rate of the solvent after forming the liquid crystal layer 12-1 by coating is too fast, thereby the liquid crystalline monomer formed after the evaporation of the solvent is easily misaligned. It tends to be difficult to correct the misalignment of the liquid crystalline monomer, even if an alignment process (which will be described later) in which the liquid crystal layer 12-1 is heated at a temperature equal to or higher than a phase transition temperature between a liquid crystal phase and an isotropic phase, and then the liquid crystal layer 12-1 is gradually cooled down.

Next, an alignment (heating) process on the liquid crystalline monomer of the liquid crystal layer 12-1 formed on the surface of the substrate 11 by coating is performed. The heating process is performed at a temperature equal to or higher than the phase transition temperature of the liquid crystalline monomer, or in the case where the solvent is used, at a temperature equal to or higher than a temperature at which the solvent is dried, for example, 50° C. to 130° C. However, it is important to control a rate of temperature increase, a holding temperature, time, a rate of temperature decrease or the like. For example, in the case where the liquid crystal layer 12-1 formed by dissolving a liquid crystalline monomer with a phase transition temperature of 52° C. in 1-methoxy-2-acetoxypropane (PGMEA) so that the solid content of the liquid crystalline monomer is 30 wt % is used, first, the liquid crystal layer 12-1 is heated at a temperature which is equal to or higher than the phase transition temperature (52° C.) of the liquid crystalline monomer and allows the solvent to be dried, for example, approximately 70° C., and the temperature is kept for approximately a few minutes.

In this case, a shear stress is produced in an interface between the liquid crystalline monomer and the substrate by coating with the liquid crystalline monomer in the previous step, thereby liquid crystal molecules may be aligned in an unintended direction due to alignment induced by a flow (flow alignment) or alignment induced by force (force alignment). The above-described heating process is performed to temporarily cancel the alignment state of the liquid crystalline monomer which is aligned in such an unintended direction. Thereby, in the liquid crystal layer 12-1, the solvent is dried, and only the liquid crystalline monomer remains, and the state of the liquid crystalline monomer is in an isotropic phase.

After that, the liquid crystal layer 12-1 is slowly cooled to a temperature slightly lower than the phase transition temperature (52° C.), for example, 47° C. at a rate of approximately 1 to 5° C./min. Thus, the temperature of the liquid crystal layer 12-1 is decreased to a temperature equal to or lower than the phase transition temperature, thereby the liquid crystalline monomer is aligned according to the patterns of the groove regions 11A and 11B formed on the surface of the substrate 11. That is, the liquid crystalline monomer is aligned along the extending directions d1 and d2 of the grooves 111a and 111b.

Next, as illustrated in FIG. 9B, for example, the ultraviolet ray UV is applied to the liquid crystal layer 12-1 subjected to the alignment process to polymerize the liquid crystalline monomer. In addition, at this time, the processing temperature is often typically around room temperature, but the processing temperature may be increased to a temperature equal to or lower than the phase transition temperature to adjust the retardation value. Moreover, not only the ultraviolet ray UV, but also heat, an electron beam or the like may be used. However, when the ultraviolet ray UV is used, the facilitation of the process is achievable. Thereby, the alignment state of the liquid crystal molecules 120 is fixed along the directions d1 and d2 to form the retardation regions 12a and 12b. Thereby, the retardation film 10 illustrated in FIG. 2 is completed.

In addition, the retardation film 10 illustrated in FIGS. 3, 4A and 4B may be manufactured by the manufacturing apparatus illustrated in FIG. 7. More specifically, first, the base 31 (the resin layer 32 may or may not be formed thereon) drawn out from the winding roll 200 is guided to the guide roll 230 via the guide roll 220, and then the composite 32A including the liquid crystalline monomer is dropped onto the base 31 from the discharging device 280. The composite 32A including the liquid crystalline monomer dropped from the discharging device 280 is pressed against the circumferential surface of the mold roll 112 with the base 31 in between by the nip roll 240. Thereby, the composite 32A comes into close contact with the circumferential surface of the mold roll 112 without spaces to transfer the uneven shape formed on the circumferential surface of the mold roll 112 to the composite 32A. After that, the ultraviolet irradiation device 290 applies the ultraviolet ray UV to the composite 32A. Thereby, the liquid crystalline monomer included in the composite 32A is polymerized, so the liquid crystalline monomer is converted into a polymer liquid crystal aligned in the extending direction of the uneven shape formed on the circumferential surface of the mold roll 112. Finally, the base 31 is separated from the mold roll 112 by the guide roll 250, and then the base 31 is taken up by the take-up roll 270 via the guide roll 260. Thus, the substrate 11 which has retardation regions including the polymerized polymer liquid crystal material (the liquid crystal molecules 120) on the surface thereof is formed as illustrated in FIGS. 3, 4A and 4B. In addition, the composite 32A including the liquid crystalline monomer may include any other resin material.

Next, functions and effects of the retardation film 10 and the method of manufacturing the retardation film 10 will be described below.

Functions of Retardation Film 10

In the retardation film 10, when light enters the retardation regions 12a and 12b from a back surface of the substrate 11 or a surface of the retardation layer 12, emission light of which the polarization state is changed based on the phase difference characteristics of the retardation regions 12a and 12b is obtained. At this time, the retardation regions 12a and 12b are made of, for example, the same material with the same thickness, and the liquid crystal molecules 120 in the retardation regions 12a and 12b are aligned in the extending directions d1 and d2 of the grooves 111a and 111b, respectively. Therefore, in the retardation regions 12a and 12b, the optical axes of the retardation regions 12a and 12b are aligned in the directions d1 and d2, respectively, and the retardation regions 12a and 12b have phase difference characteristics in which the absolute retardation values thereof are equal to each other.

Now, as a comparative example, a retardation film 100 on which patterns of phase difference characteristics are formed by using alignment films will be described referring to FIGS. 10A and 10B. In the retardation film 100, alignment films 102A and 102B are alternately arranged in stripes on a substrate 101, and a retardation layer 103 is arranged on the alignment films 102A and 102B. The alignment films 102A and 102B have alignment control directions d1 and d2 orthogonal to each other, respectively. In the retardation layer 103, retardation regions 103a and 103b having different phase difference characteristics are formed so as to correspond to the patterns of the alignment films 102A and 102B, respectively. Examples of the alignment films 102A and 102B include horizontal polyimide alignment films subjected to rubbing, vertical polyimide alignment films, obliquely evaporated SiO, photo-alignment films, LB films and the like. In the case where such alignment films 102A and 102B are used, light absorption or coloring occurs by the alignment films 102A and 102B to cause a decline in transmittance, thereby light loss occurs to cause a decline in light use efficiency.

On the other hand, in the embodiment, the retardation layer 12 is in contact with the surface of the substrate 11. That is, the alignment film which causes light absorption or coloring in the above-described manner is not arranged around an interface between the retardation layer 12 and the substrate 11, so light loss caused by the alignment film is eliminated.

In addition, in the case where the retardation film 10 having the above-described phase difference characteristics is used with, for example, a polarizer, the retardation film 10 is arranged so that angles between the optical axis of the polarizer and the above-described direction d1 and between the optical axis of the polarizer and the above-described direction d2 are 45°.

Moreover, the above-described retardation film 10 is suitable as, for example, a retardation film used for a three-dimensional display achieving stereoscopic viewing with polarized glasses.

Functions of Method of Manufacturing Retardation Film 10

Moreover, in the method of manufacturing the retardation film 10, when the liquid crystal layer 12-1 is formed by coating on the surface on which the groove regions 11A and 11B are formed of the substrate 11, the liquid crystalline monomer is aligned along the extending directions of the grooves 111a and 111b by functions in an interface with the surface of the substrate 11. After that, the above-described liquid crystal layer 12-1 is polymerized to fix the alignment state of the liquid crystal molecules.

Now, as a comparative example, a method of manufacturing the retardation film 100 illustrated in FIGS. 10A and 10B will be described referring to FIGS. 11A to 11C and FIGS. 12A and 12B. The case where the photo-alignment films selected from the above-described alignment films are used as the alignment films 102A and 102B will be described as an example.

First, as illustrated in FIG. 11A, a photo-alignment film 102 is formed by coating on the substrate 101 made of a glass material or the like, and the photo-alignment film 102 is dried. Then, as illustrated in FIG. 11B, a polarized ultraviolet ray UV1 is applied only to selective regions by using a photo mask 104 to form the alignment films 102B. After that, as illustrated in FIG. 11C, a polarized ultraviolet ray UV2 is applied to the whole surface to form the alignment films 102A. Thereby, the patterns of the alignment films 102A and 102B are formed on the substrate 101.

Next, as illustrated in FIG. 12A, a liquid crystal layer 103-1 including a liquid crystalline monomer is formed by coating on the patterned alignment films 102A and 102B. After that, a heating process is performed at a predetermined temperature so as to stabilize the alignment of the liquid crystalline monomer. Finally, as illustrated in FIG. 12B, the liquid crystalline monomer is polymerized by irradiation with the ultraviolet ray UV to form the retardation film 100.

However, in the manufacturing method using such alignment films 102A and 102B, to form the patterns of the alignment films 102A and 102B, partial irradiation with the polarized ultraviolet rays UV1 and UV2 is necessary. That is, patterning is performed by a sheet-fed system, so the number of process steps is increased. Moreover, in a technique using a polarized ultraviolet irradiation apparatus, it is difficult to upsize the retardation film 100, and the retardation film 100 is manufactured at high cost.

On the other hand, in the embodiment, the substrate 11 is made of a plastic material, and a mold is pressed against the surface of the substrate 11, thereby the patterns of the groove regions 11A and 11B are transferred. Therefore, the groove regions 11A and 11B are collectively and easily formable, so compared to the case where the above-described alignment films are used, the number of process steps is allowed to be reduced. Moreover, in the embodiment, in the case where thermal transfer is used, it is not necessary to use the ultraviolet irradiation apparatus, so upsizing of the retardation film 10 is easily achievable, and the retardation film 10 is manufactured at low cost.

Moreover, the liquid crystal layer 12-1 is formed by coating on the surface of the substrate 11, and then a heating process is performed at a temperature equal to or higher than the phase transition temperature of the liquid crystalline monomer, thereby the alignment of the liquid crystalline monomer is controllable more precisely. In addition, the heating process is performed at a relatively low temperature as described above, so even if plastic material is used for the substrate 11, deformation or warpage does not occur easily. When the plastic material is used for the substrate 11 in such a manner, workability is improved, and costs are low, so mass production is allowed.

In addition, in an alignment film used for a typical liquid crystal display or the like, for example, a polyimide alignment film subjected to rubbing, a very strong anchoring force is necessary, because in the field of displays, liquid crystal molecules are inclined by the application of a voltage to perform display, and when a voltage is not applied, it is necessary for the liquid crystal molecules to return to their original liquid crystal alignment state again. Then, to provide such a strong anchoring force, it is necessary to heat the polyimide alignment film at a firing temperature of 200° C. or over. Therefore, in the case where a thermoplastic resin such as a plastic material is used for the substrate, the substrate may be deformed or warped. Moreover, a malfunction due to the deformation or warpage of the substrate may occur also in the following rubbing process.

On the other hand, in the retardation film 10 in the embodiment, the liquid crystalline monomer is polymerized by an ultraviolet ray or the like in the end, so unlike the above-described display, a strong anchoring force is not necessary. That is, only an anchoring force to an extent to which the alignment state is maintained is necessary until curing by an ultraviolet ray. Therefore, as described above, it is only necessary to perform a heating process at a relatively low temperature according to the phase transition temperature of the liquid crystalline monomer or a temperate at which the solvent is dried, so even if the plastic material is used, any particular issue does not occur in the retardation film 10.

As described above, in the embodiment, the retardation layer 12 is arranged in contact with the surface on which the groove regions 11A and 11B are formed of the substrate 11, and without using the photo-alignment film, the alignment film for rubbing or the like, the liquid crystal molecules 120 are aligned by the groove regions 11A and 11B on the surface of the substrate 11. Thereby, light loss around an interface between the substrate 11 and the retardation layer 12 is allowed to be reduced. Therefore, the retardation film 10 is manufacturable by a simple process, and a decline in light use efficiency is preventable.

Moreover, in the embodiment, in the case where the substrate 11 has a single-layer configuration, the light use efficiency is allowed to be maximized. Further, in the embodiment, also in the case where the substrate 11 has a two-layer configuration in which the resin layer 32 is formed on the surface of the base 31, light absorption or coloring hardly occurs in the resin layer 32, so a decline in light use efficiency is allowed to be minimized.

Next, modifications of the embodiment will be described referring to drawings. In the following descriptions, like components are denoted by like numerals as of the retardation film 10 according to the above-described embodiment and will not be further described. Modifications 1 to 5 are modifications of the configuration of the retardation film 10, and Modifications 6 to 10 are modifications of the method of manufacturing the retardation film 10. In Modifications 1 to 5, the case where the substrate 11 with a single-layer configuration is used is exemplified, but the substrate 11 with a multilayer configuration (for example, a two-layer configuration in which a resin layer is formed on a surface of a base) may be used.

Modification 1

Figure 13:
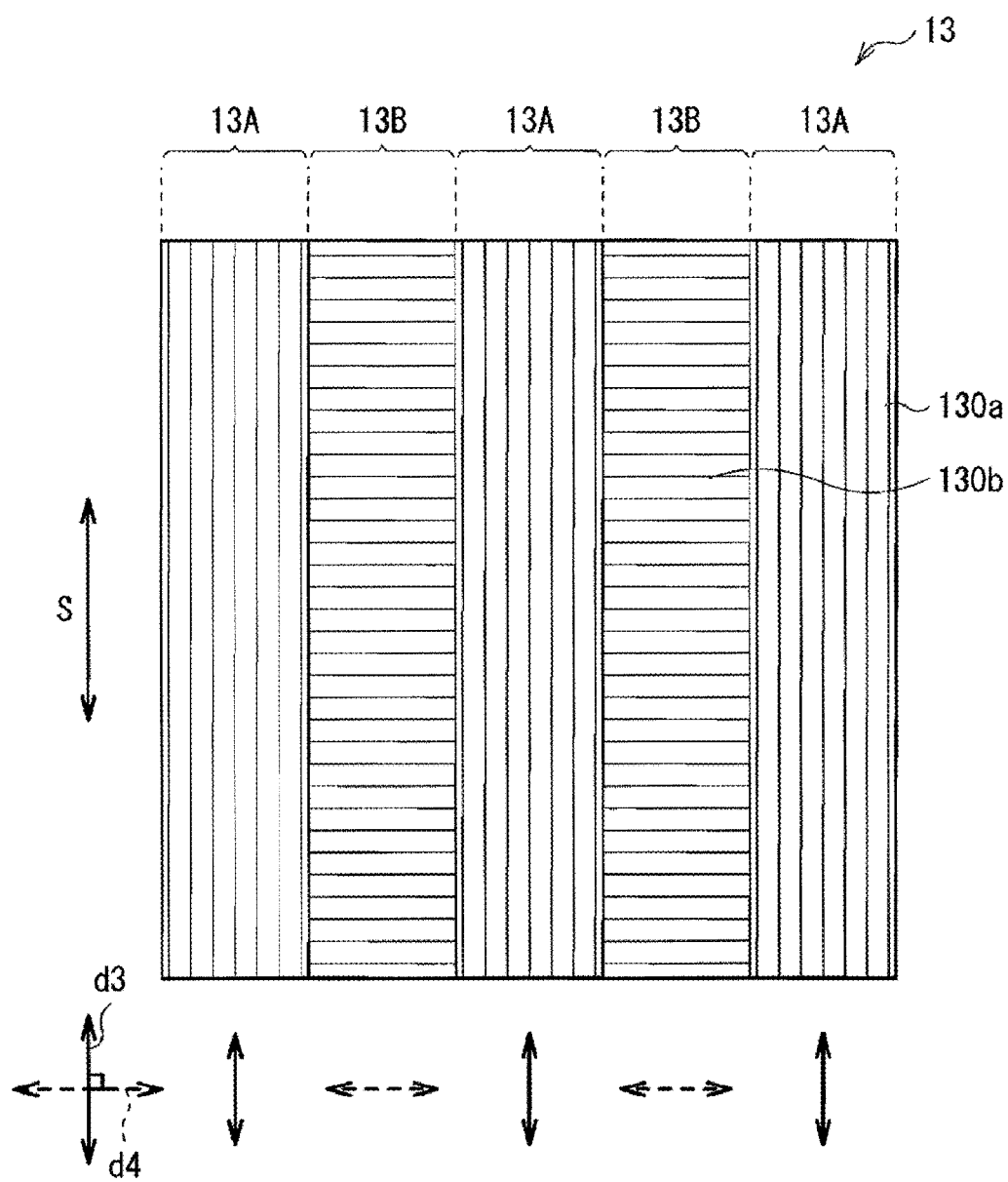
FIG. 13 is a top view of a substrate in a retardation film according to Modification 1.

FIG. 13 illustrates a substrate 13 of a retardation film according to Modification 1 viewed from a surface side. In the modification, the retardation film has the same configuration as that of the retardation film 10 according to the above-described embodiment, except for the configurations of groove regions 13A and 13B formed on a surface of the substrate 13.

The groove regions 13A and 13B are alternately arranged, for example, in stripes on the surface of the substrate 13. The groove regions 13A each include a plurality of grooves 130a extending along a common direction d3, and the groove regions 13B each include a plurality of grooves 130b extending to a common direction d4. Moreover, the directions d3 and d4 are orthogonal to each other. However, in Modification 1, the directions d3 and d4 form angles of 0° and 90° with respect to a stripe direction S of the groove regions 13A and 13B, respectively. The grooves 130a and 130b each have, for example, a sectional shape of the letter V as in the case of the grooves 111a and 111b in the above-described embodiment.

A retardation layer which includes retardation regions (not illustrated) having different phase difference characteristics corresponding to such groove regions 13A and 13B, respectively, is formed. That is, the retardation regions which are in contact with the surface of the substrate 13 and have optical axes in the directions d3 and d4, respectively, are alternately formed in stripes. Moreover, in the modification, the retardation layer is made of the same liquid crystal material as that of the retardation layer 12 in the above-described embodiment, and the retardation regions are made of the same material with the same thickness. Thereby, the retardation regions have phase difference characteristics in which the absolute retardation values thereof are equal to each other, and the optical axes thereof are aligned in the directions d3 and d4, respectively.

Moreover, when the retardation film according to the modification is manufactured, in a step of forming the groove regions 13A and 13B, it is only necessary to press a mold roll on which reverse patterns of the groove regions 13A and 13B are formed against the surface of the substrate 13 to perform transfer, and other steps are the same as those in the retardation film 10 according to the above-described embodiment.

As in the case of the modification, the extending directions d3 and d4 of the grooves 130a and 130b in the groove regions 13A and 13B may be parallel to or orthogonal to the stripe direction S. Thus, the extending directions of the grooves in the groove regions may be orthogonal to each other, and angles which the extending directions form with the stripe direction S are not specifically limited. In the case where the retardation film in the modification is used in combination with a polarizer, the retardation film is arranged so that angles formed between the direction d3 and the transmission axis direction of the polarizer and between the direction d4 and the transmission axis direction of the polarizer are 45°.

Modification 2

Figure 14:
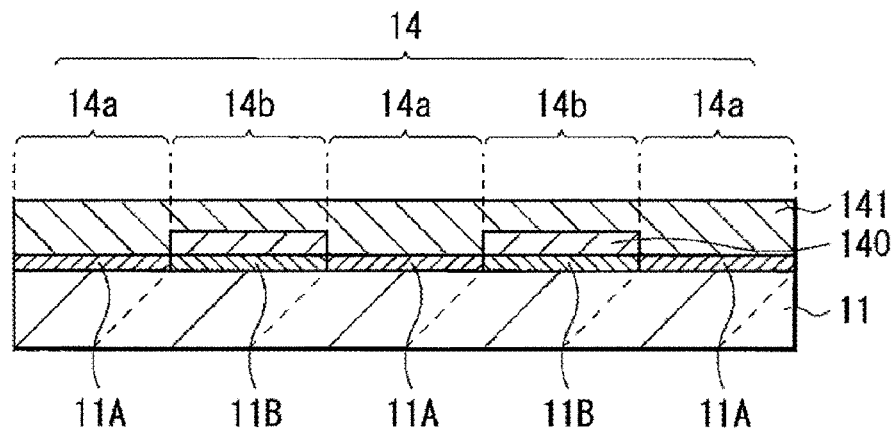
FIG. 14 is a sectional view illustrating a brief configuration of a retardation film according to Modification 2.

FIG. 14 illustrates a sectional configuration of a retardation film according to Modification 2. The retardation film according to the modification has the same configuration as that of the retardation film 10 according to the above-described embodiment except for the configuration of a retardation layer 14.

The retardation layer 14 includes, for example, a polymerized polymer liquid crystal material. That is, in the retardation layer 14, the alignment state of the liquid crystal molecules 120 is fixed. As the polymer liquid crystal material, the same material as that of the retardation layer 12 in the above-described embodiment may be used. However, in the modification, the retardation layer 14 is configured so that the absolute retardation values of retardation regions 14a and 14b are different from each other. More specifically, each retardation region 14a is made of a single-layer film including a second liquid crystal layer 141, and each retardation region 14b is made of a laminate film including a first liquid crystal layer 140 and the second liquid crystal layer 141. The first liquid crystal layer 140 and the second liquid crystal layer 141 include liquid crystal materials different from each other.

Figure 15A:
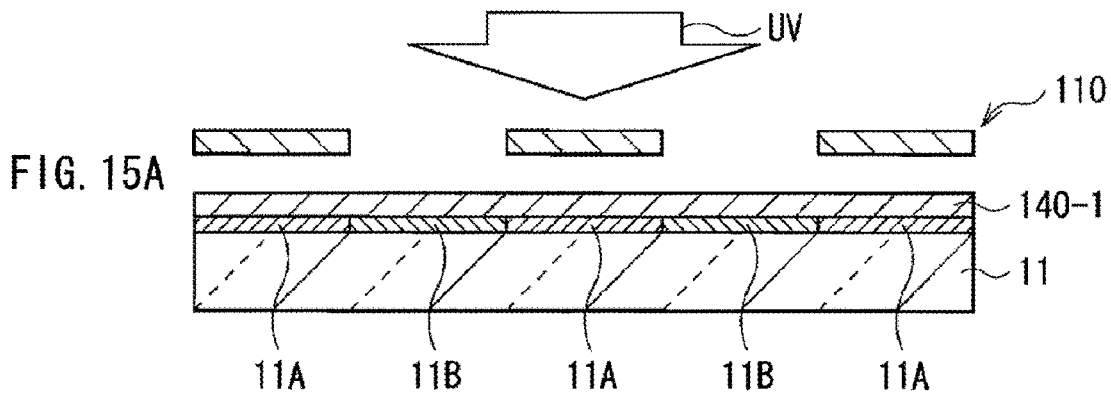
FIGS. 15A and 15B are illustrations describing a method of manufacturing the retardation film illustrated in FIG. 14.
Figure 15B:
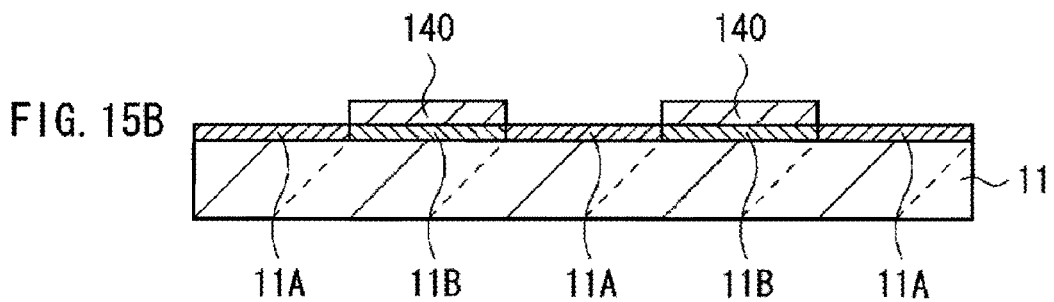

The above-described retardation film is manufactured by, for example, the following steps. First, as illustrated in FIG. 15A, a liquid crystal layer 140-1 including a liquid crystalline monomer is formed by coating on the whole surface on the groove regions 11A and 11B, and then the ultraviolet ray UV is applied only to regions opposed to the groove regions 11B by using a photo mask 110. Also in the modification, the liquid crystal layer 140-1 is formed by coating, and then before applying the ultraviolet ray UV, a process of heating the liquid crystal layer 140-1 to a temperature equal to or higher than the phase transition temperature of the liquid crystal layer 140-1 is performed as the above-described alignment process. Thereby, the liquid crystal layer 140-1 is polymerized only in regions (the retardation regions 14b) opposed to the groove regions 11B. After that, as illustrated in FIG. 15B, the surface of the substrate 11 is cleaned, thereby the first liquid crystal layers 140 are formed only in the regions (the retardation regions 14b) opposed to the groove regions 11B.

Figure 16A:
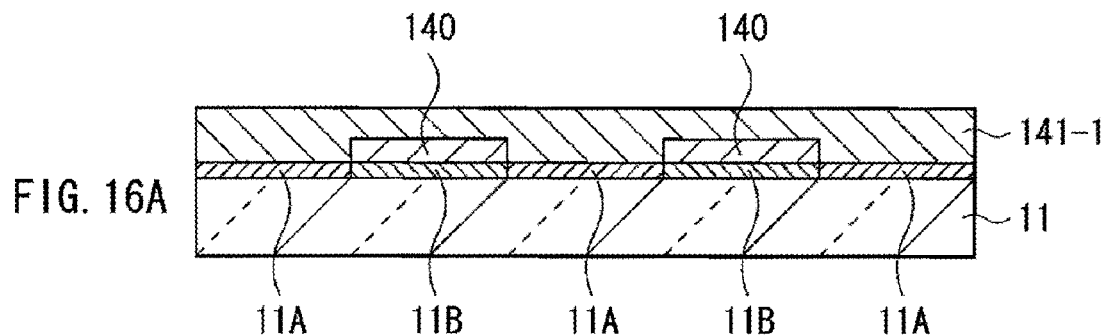
FIGS. 16A and 16B are illustrations of steps in the method of manufacturing the retardation film following steps of FIGS. 15A and 15B.
Figure 16B:
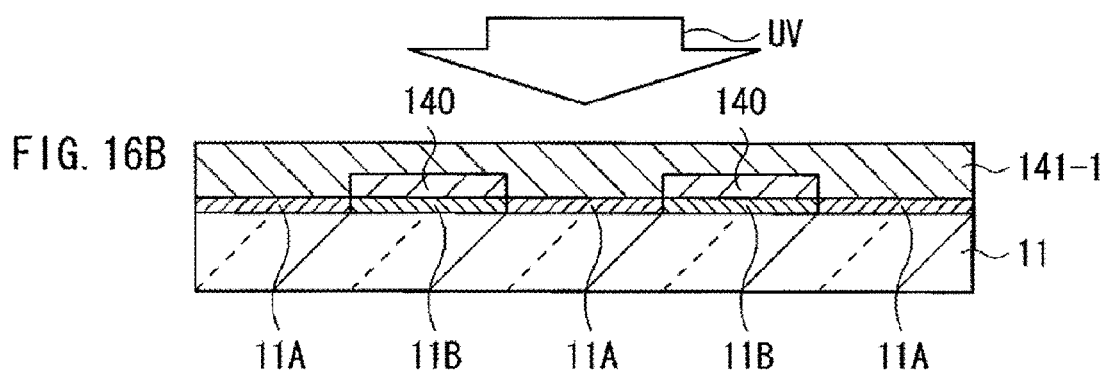

Next, as illustrated in FIG. 16A, a liquid crystal layer 141-1 including a liquid crystalline monomer is formed by coating on the whole surface of the substrate 11 on which the first liquid crystal layers 140 are formed, and then a process of heating the liquid crystal layer 141-1 to a temperature equal to or higher than the phase transition temperature of the liquid crystal layer 141-1 is performed as the above-described alignment process. After that, as illustrated in FIG. 16B, when the ultraviolet ray UV is applied to the whole surface of the substrata 11, the liquid crystal layer 141-1 is polymerized to form the second liquid crystal layer 141. Thus, the retardation film illustrated in FIG. 14 is completed.

In the modification, in the retardation regions 14a and 14b formed in contact with the surface of the substrate 11, optical axes thereof are formed in the directions d1 and d2 by the groove regions 11A and 11B, respectively. Therefore, the same effects as those in the above-described embodiment are obtainable. On the other hand, the materials of the retardation regions 14a and 14b are different from each other, so the retardation values of the retardation regions 14a and 14b are different from each other. The retardation regions may be made of liquid crystal materials different from each other. Thereby, the retardation value of each retardation region is arbitrarily adjustable.

Modification 3

Figure 17:
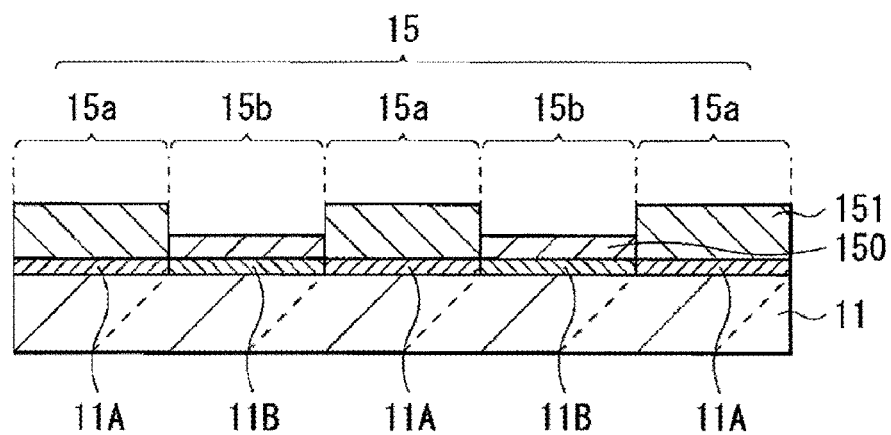
FIG. 17 is a sectional view illustrating a brief configuration of a retardation film according to Modification 3.

FIG. 17 illustrates a sectional configuration of a retardation film according to Modification 3. In the modification, the retardation film has the same configuration as that of the retardation film 10 according to the above-described embodiment except for the configuration of a retardation layer 15.

The retardation layer 15 is made of the same material as that of the retardation layer 12 in the above-described embodiment. However, in the modification, retardation regions 15a and 15b includes liquid crystal layers 151 and 150 made of different materials with different thicknesses, respectively. Such a retardation film is manufacturable by, for example, the following steps. First, as illustrated in FIG. 18A, as in the case of Modification 2, the liquid crystal layers 150 are formed only in regions (retardation regions 15b) opposed to the groove regions 11B, and then a liquid crystal layer 151-1 including a liquid crystalline monomer is formed by coating on the whole surface of the substrate 11. After that, a heating process is performed as the above-described alignment process. Next, as illustrated in FIG. 18B, the ultraviolet ray UV is applied only to regions (retardation regions 15a) opposed to the groove regions 11A by using the photomask 110 to polymerize a part of the liquid crystal layer 151-1. Finally, the surface of the substrate 11 is cleaned, thereby the liquid crystal layers 151 are formed only in the retardation regions 15a to complete the retardation film illustrated in FIG. 17.

As in the case of the modification, in the retardation layer 15, the retardation regions 15a and 15b may be made of different materials with different thicknesses. Even in such a configuration, the same effects as those in the above-described embodiment are obtainable, and the retardation value of each retardation region is arbitrarily adjustable.

Modification 4

FIG. 19 illustrates a sectional configuration of a retardation film according to Modification 4. In the modification, the retardation film has the same configuration as that of the retardation film 10 according to the above-described embodiment except for the configuration of a retardation layer 16.

The retardation layer 16 is made of the same material as that of the retardation layer 12 in the above-described embodiment. However, in the modification, liquid crystal layers are formed only in selective regions on the substrate 11, for example, retardation regions 16b. Such a retardation film is manufacturable by forming a liquid crystal layer including a liquid crystalline monomer by coating on the whole surface of the substrate 11, and performing a heating process as the above-described alignment process, and then applying the ultraviolet ray UV only to regions (retardation regions 16b) opposed to the groove regions 11B.

As in the case of the modification, in the retardation layer 16, the liquid crystal layers may be partially formed only in the retardation regions 16b. Even in such a configuration, effects substantially equivalent to those in the above-described embodiment are obtainable.

Modification 5

FIG. 20A illustrates a sectional configuration of a retardation film 20 according to Modification 5. FIG. 20B illustrates a substrate 17 viewed from a surface side. In the retardation film 20, a pattern of a groove region 17A is formed on a surface of the substrate 17, and a retardation layer 18 is formed in contact with the surface of the substrate 17. However, in the modification, the groove region 17A is formed on the whole surface of the substrate 17. The groove region 17A includes a plurality of grooves 170a extending along one direction d1.

As described above, the patterns of groove regions are not necessarily formed in stripes on the surface of the substrate 17. As described above, the retardation film described in the above-described embodiment is suitable, for example, as a component of a 3D display, but the retardation film 20 in the modification is suitably used not only as a component of the above-described 3D display but also as, for example, a viewing angle compensation film (for example, an A plate which will be described later) of a typical display for two-dimensional display.

Modification 6

Figure 21:
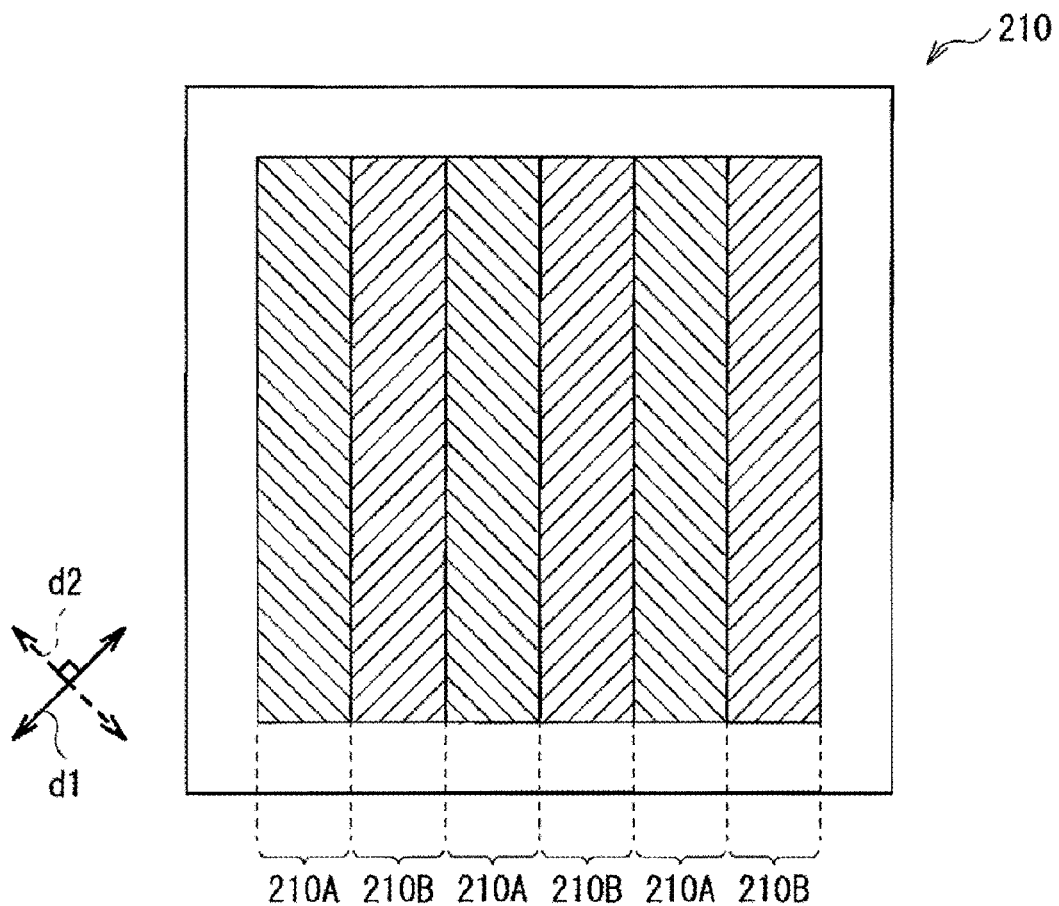
FIG. 21 is a schematic view illustrating a planar configuration of a mold used in a method of manufacturing a retardation film according to Modification 6.

FIG. 21 schematically illustrates a planar configuration of a mold 210 used when the pattern of each groove region is transferred to a substrate in a method of manufacturing a retardation film according to Modification 6. For example, pattern regions 210A and 210B are alternately arranged on a surface of the mold 210. In the pattern regions 210A and 210B, projections and depressions which form reverse patterns of the groove regions 11A and 11B of the retardation film 10 are formed, and the extending directions d1 and d2 of projections (depressions) are orthogonal to each other. In the modification, the pattern regions 210A and 210B of such a mold 210 are formed by a combination of separate molds.

Figure 22A:
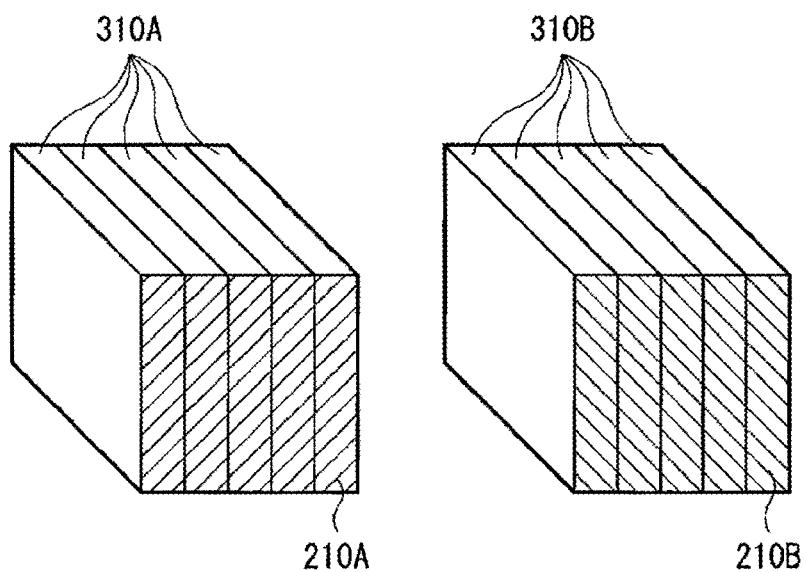
FIGS. 22A and 22B are illustrations describing an example of a method of manufacturing the mold illustrated in FIG. 21.
Figure 22B:
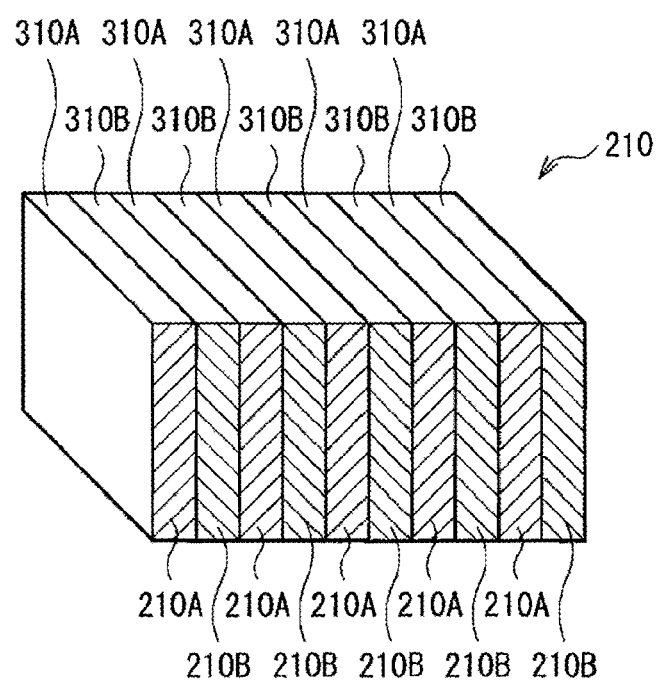

As a method of forming such a mold 210, for example, as illustrated in FIG. 22A, a plurality of thin metal plates 310A with a thickness equal to the width of the pattern region 210A and a plurality of thin metal plates 310B with a thickness equal to the width of the pattern region 210B are prepared. The pattern region 210A is formed at one end of each thin metal plate 310A, and the pattern region 210B is formed at one end of each thin metal plate 310B. Next, as illustrated in FIG. 22B, the thin metal plates 310A and the thin metal plates 310B are alternately laminated so that the pattern regions 210A and 210B are arranged in a common plane. Thus, the mold 210 according to the modification is formed.

Figure 23A:
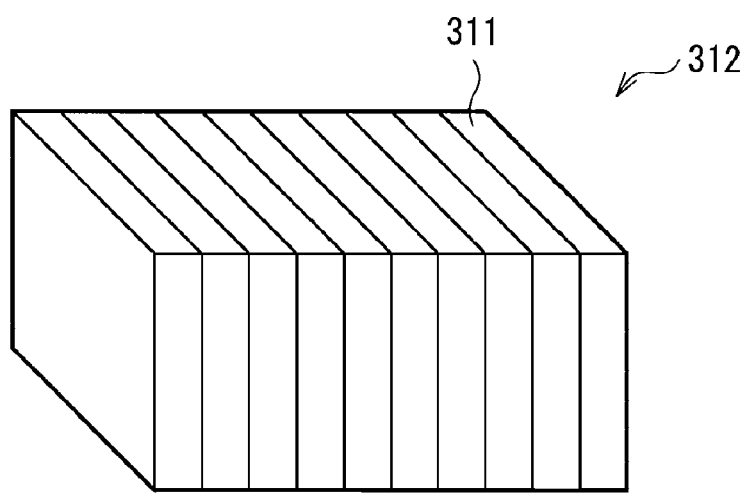
FIGS. 23A, 23B and 23C are illustrations describing another example of the method of manufacturing the mold illustrated in FIG. 21.
Figure 23B:
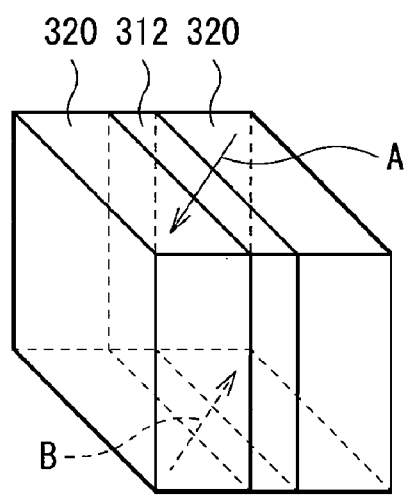
Figure 23C:
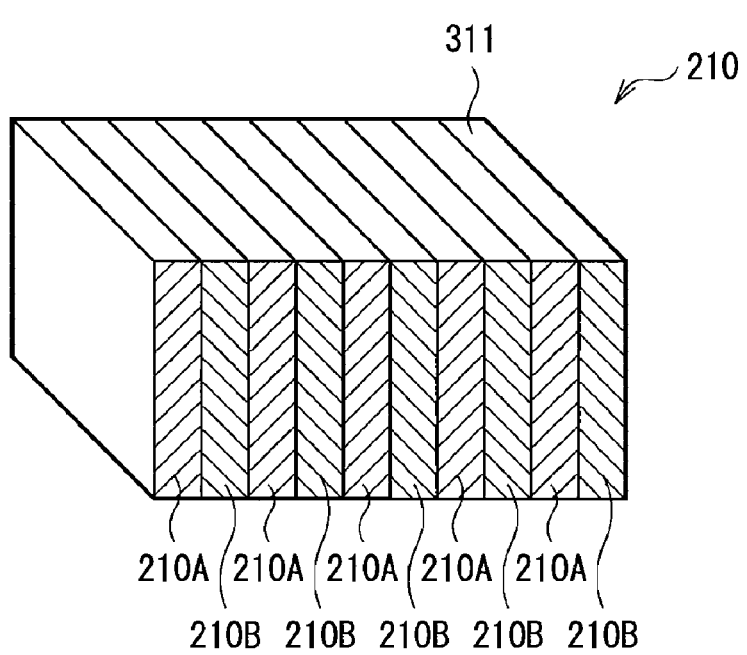

The thin metal plates 310A and 310B are formed by, for example, the following steps. First, as illustrated in FIG. 23A, a laminate 312 formed by laminating a plurality of thin metal plates 311 with a thickness equal to the width of the pattern region 210A is prepared. At this time, as the thin metal plates 311, for example, SUS thin plates with a thickness of 0.3 mm are used, and the number of thin metal plates 311 included in the laminate 312 is 10. Next, as illustrated in FIG. 23B, the laminate 312 is sandwiched between steel plates 320 to fix the laminate 312, and then as illustrated by an arrow A in FIG. 23B, a grinding wheel is moved so that streaks form +45° with one side surface of the laminate 312 to form grinding traces. Moreover, as illustrated in an arrow B in FIG. 23B, the grinding wheel is moved so that streaks form −45° with the other side surface of the laminate 312 to form grinding traces. At this time, as the grinding wheel, a grinding wheel with alumina-based abrasives with a grain size of approximately #1000 to #3000 is used. After grinding, even-numbered thin metal plates 311 in the plurality of thin metal plates 311 included in the laminate 312 remain as they are, and odd-numbered thin metal plates 311 are rotated. More specifically, as illustrated in FIG. 23C, the odd-numbered thin metal plates 311 are rotated so that surfaces (the pattern regions 210A) on which grinding traces are formed so that the streaks form −45° and surfaces (the pattern regions 210B) on which grinding traces are formed so that streaks form 45° are arranged in a common plane. When the retardation film 10 was manufactured with the mold 210 formed in the above-described manner, it was confirmed that the liquid crystal molecules 120 were aligned in the direction of the streaks formed by grinding.

Modification 7

In a method of manufacturing a retardation film according to Modification 7, the pattern regions 210A and 210B of the mold 210 illustrated in FIG. 21 are formed by grinding traces formed by grinding using fixed abrasives or loose abrasives.

Figure 24:
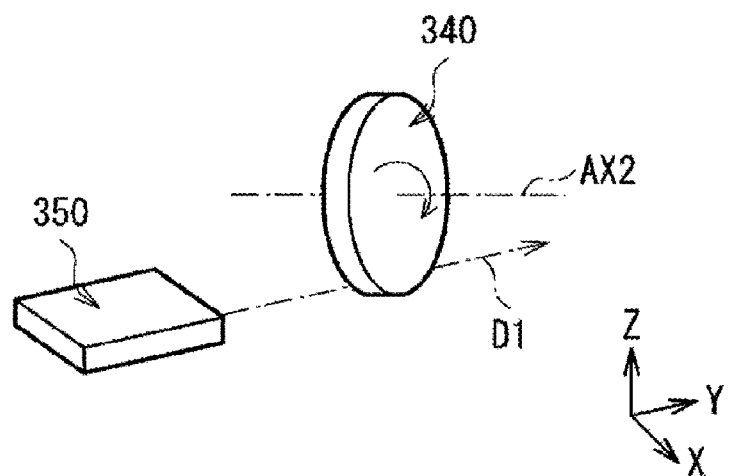
FIG. 24 is an illustration describing a method of manufacturing a mold according to Modification 7.
Figure 25A:
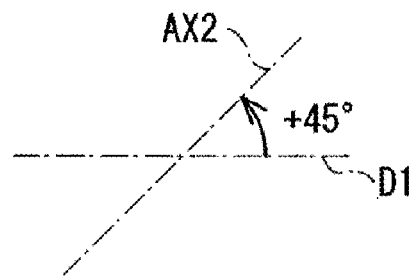
FIGS. 25A and 25B are illustrations of a relationship between a flat plate in FIG. 24 and the rotation axis of a grinding wheel in FIG. 24.
Figure 25B:
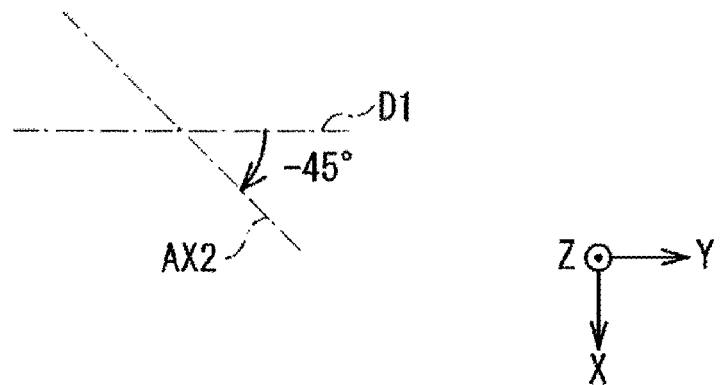

For example, as illustrated in FIG. 24, a non-processed flat plate 350 is slid in one direction D1, and a disk-shaped grinding wheel 340 rotates around an axis AX2 parallel to the normal to the grinding wheel 340. At this time, as illustrated in FIG. 25A, the grinding wheel 340 is inclined so that the central axis AX2 crosses the direction D1 at +45°, and an abrasive surface formed on a circumferential surface of the grinding wheel 340 is pressed against a top surface (a non-polished region of the top surface) of the flat plate 350 to form grinding traces. Moreover, as illustrated in FIG. 25B, the grinding wheel 340 is inclined so that the central axis AX2 crosses the direction D1 at −45°, and the abrasive surface formed on the circumferential surface of the grinding wheel 340 is pressed against the top surface (the non-polished region of the top surface) of the flat plate 350 to form grinding traces. At this time, as the grinding wheel, a grinding wheel with alumina-based abrasives with a grain size of approximately #1000 to #3000 is used. When the retardation film 10 was manufactured with the mold 210 (a plate subjected to grinding) formed in such a manner, it was confirmed that the liquid crystal molecules 120 were aligned in the direction of streaks formed by grinding.

Figure 26:
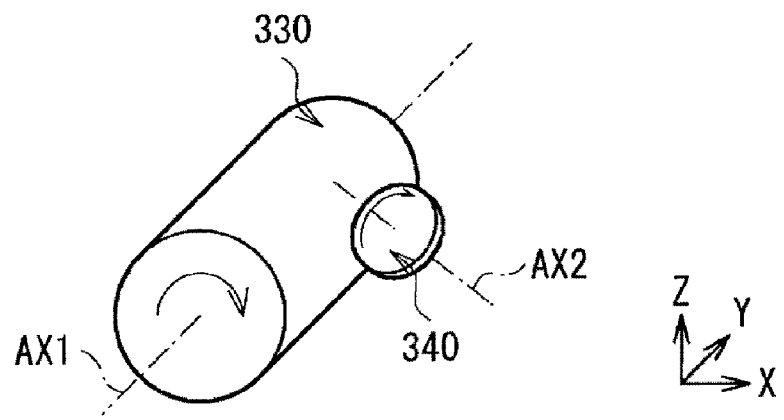
FIG. 26 is an illustration describing a method of manufacturing a mold according to Modification 8.
Figure 27A:
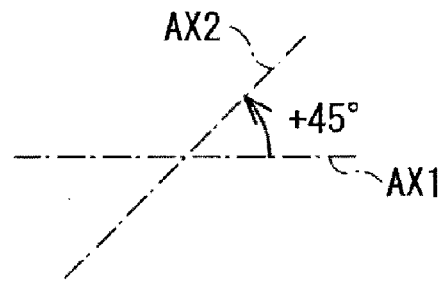
FIGS. 27A and 27B are illustrations of a relationship between the rotation axes of a roll and a grinding wheel in FIG. 26.
Figure 27B:
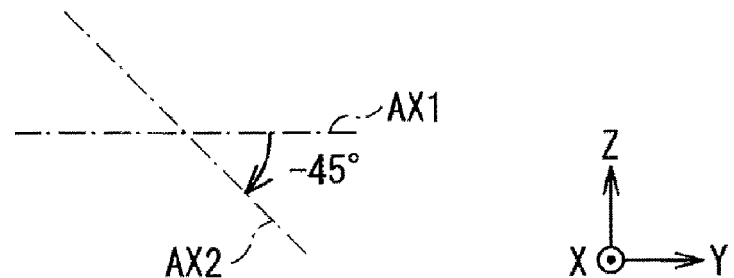

Moreover, when the pattern regions 210A and 210B are formed on a roll, for example, the following steps may be used. That is, as illustrated in FIG. 26, a non-processed roll 330 rotates around a central axis AX1 of the roll 330, and the disk-like grinding wheel 340 rotates around the axis AX2 parallel to the normal to the grinding wheel 340. At this time, as illustrated in FIG. 27A, the grinding wheel 340 is inclined so that the central axis AX2 crosses the central axis AX1 at +45°, and an abrasive surface formed on the circumferential surface of the grinding wheel 340 is pressed against a circumferential surface (a non-polished region of the circumferential surface) of the roll 330 to form grinding traces. Moreover, as illustrated in FIG. 27B, the grinding wheel 340 is inclined so that the central axis AX2 crosses the central axis AX1 at −45°, and the abrasive surface formed on the circumferential surface of the grinding wheel 340 is pressed against the circumferential surface (a non-polished region of the circumferential surface) of the roll 330 to form grinding traces. At this time, the width of the abrasive surface of the grinding wheel 340 may be a width corresponding to the widths of the pattern regions 210A and 210B. The retardation film 10 is manufacturable with the mold 210 (a roll subjected to grinding) formed in such a manner.

Modification 8

In a method of manufacturing a retardation film according to Modification 8, the pattern regions 210A and 210B of the mold 210 illustrated in FIG. 21 are formed by a cutting process with a cutting tool (not illustrated). A surface of a mold material is cut with the cutting tool to form submicron-order fine grooves. To form a pattern, grooves with different angles are formed in regions corresponding to the pattern regions 210A and 210B of the surface of the mold material, respectively. For example, grooves with a sectional shape of the letter V are formed at 250-nm pitches on, for example, Ni—P plating surface. When the retardation film 10 was manufactured with the mold 210 formed in such a manner, it was confirmed that the liquid crystal molecules 120 were aligned in the directions of the grooves.

Modification 9

In a method of manufacturing a retardation film according to Modification 9, the pattern regions 210A and 210B of the mold 210 illustrated in FIG. 21 are formed by pressure transfer using a mold on which grooves corresponding to projections and depressions of the pattern regions 210A and 210B are formed.

Figure 28A:
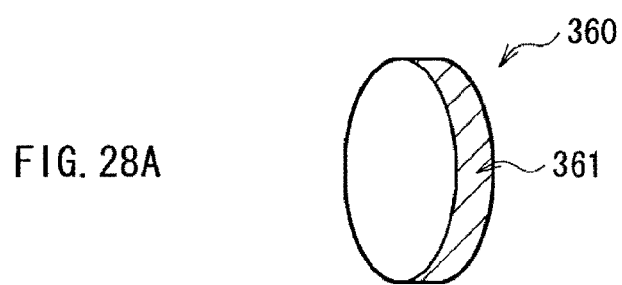
FIGS. 28A and 28B are illustrations of a brief configuration of a grinding wheel used when manufacturing a mold according to Modification 9.
Figure 29:
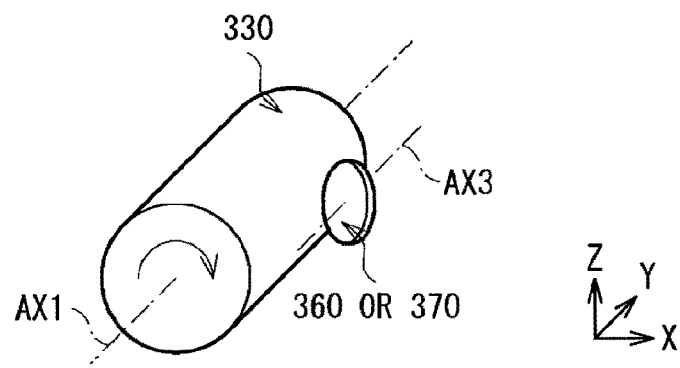
FIG. 29 is an illustration describing a method of manufacturing the mold according to Modification 9.

For example, as illustrated in FIG. 28A, a disk-like mold 360 on which a plurality of grooves 361 extending in a direction crossing the extending direction of a circumferential surface of the mold 360 at +45° is prepared. Next, as illustrated in FIG. 29, a non-processed roll 330 rotates around the central axis AX1 of the roll 330, and the disk-like mold 360 rotates around an axis AX3 parallel to the normal to the mold 360. At this time, the mold 360 is rotated so that the axis AX3 is parallel to the central axis AX1, and the mold 360 and the roll 330 have the same circumferential velocity. Then, the mold 360 is pressed against a circumferential surface (a non-polished region of the circumferential surface) of the roll 330, thereby the grooves 361 of the mold 360 is transferred to the roll 330 by pressure.

Figure 28B:
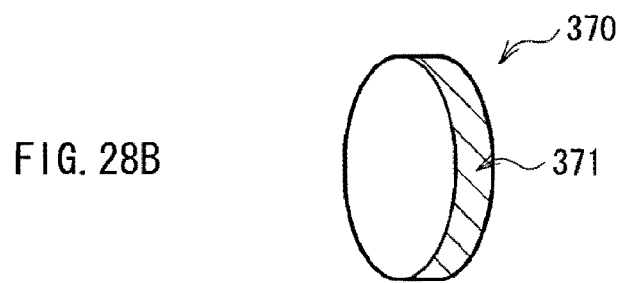

Moreover, as illustrated in FIG. 28B, a disk-like mold 370 on which a plurality of grooves 371 extending in a direction crossing the extending direction of a circumferential surface of the mold 370 at −45° are formed is prepared. Next, as illustrated in FIG. 29, a non-processed roll 330 rotates around the central axis AX1 of the roll 330, and the disk-like mold 370 rotates around the axis AX3 parallel to the normal to the mold 370. At this time, the mold 370 is rotated so that the axis AX3 is parallel to the central axis AX1, and the mold 370 and the roll 330 have the same circumferential velocity. Then, the mold 370 is pressed against the circumferential surface (the non-polished region of the circumferential surface) of the roll 330, thereby the grooves 371 of the mold 370 are transferred to the roll 330 by pressure.

The retardation film 10 is manufacturable with the roll 330 with the pattern regions 210A and 210B formed in such a manner.

Modification 10

In a method of manufacturing a retardation film according to Modification 10, the pattern regions 210A and 210B of the mold 210 illustrated in FIG. 21 are formed by drawing patterns on, for example, a metal such as SUS, Ni, Cu, Al or Fe, or the like through the use of an ultrashort pulse laser with a pulse width of 1 picosecond (10-12 seconds) or less, that is, a so-called femtosecond laser.

At this time, the pattern regions 210A and 210B with desired projections and depressions are formed by appropriately setting a laser wavelength, a recurrence frequency, a pulse width, a beam spot shape, polarization, laser intensity applied to a sample, a laser scanning rate or the like. Moreover, the polarization of a laser beam is set to linear polarization, and the polarization direction angle of the laser beam is set to a direction orthogonal to the extending directions d1 and d2 of projections (depressions).

The laser wavelength for laser processing is, for example 800 nm. However, the laser wavelength used for laser processing may be 400 nm, 266 nm or the like. The recurrence frequency is preferably large in consideration of a processing time, but even if the recurrence frequency is 1000 Hz or 2000 Hz, processing is allowed. The pulse width is preferably short, and is preferably approximately 200 femtoseconds (10-15 seconds) to 1 picoseconds (10-12 seconds). The beam spot of a laser beam applied to the mold preferably has a rectangular shape. The shaping of the beam spot may be performed with, for example, an aperture or a cylindrical lens or the like (refer to FIGS. 33 and 34).

Figure 30:
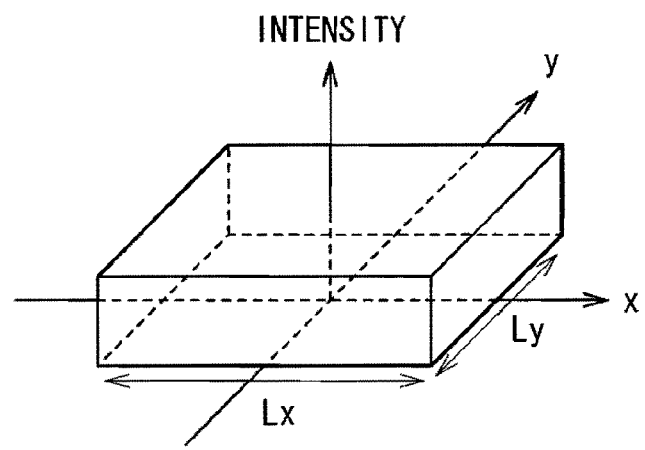
FIG. 30 is an illustration of a beam spot intensity distribution of an ultrashort pulse laser used when manufacturing a mold according to Modification 10.
Figure 31:
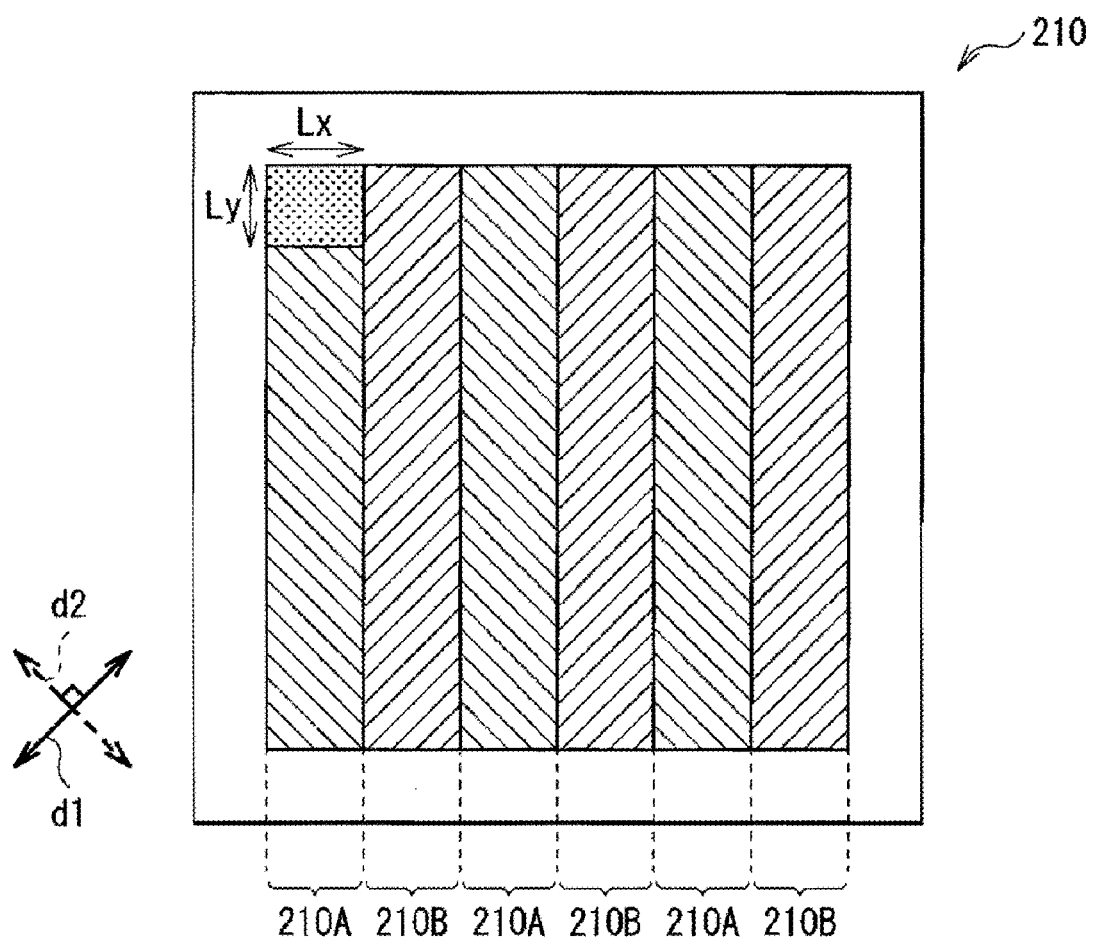
FIG. 31 is an illustration of an example of a procedure of scanning beam spots in FIG. 30.
Figure 32:
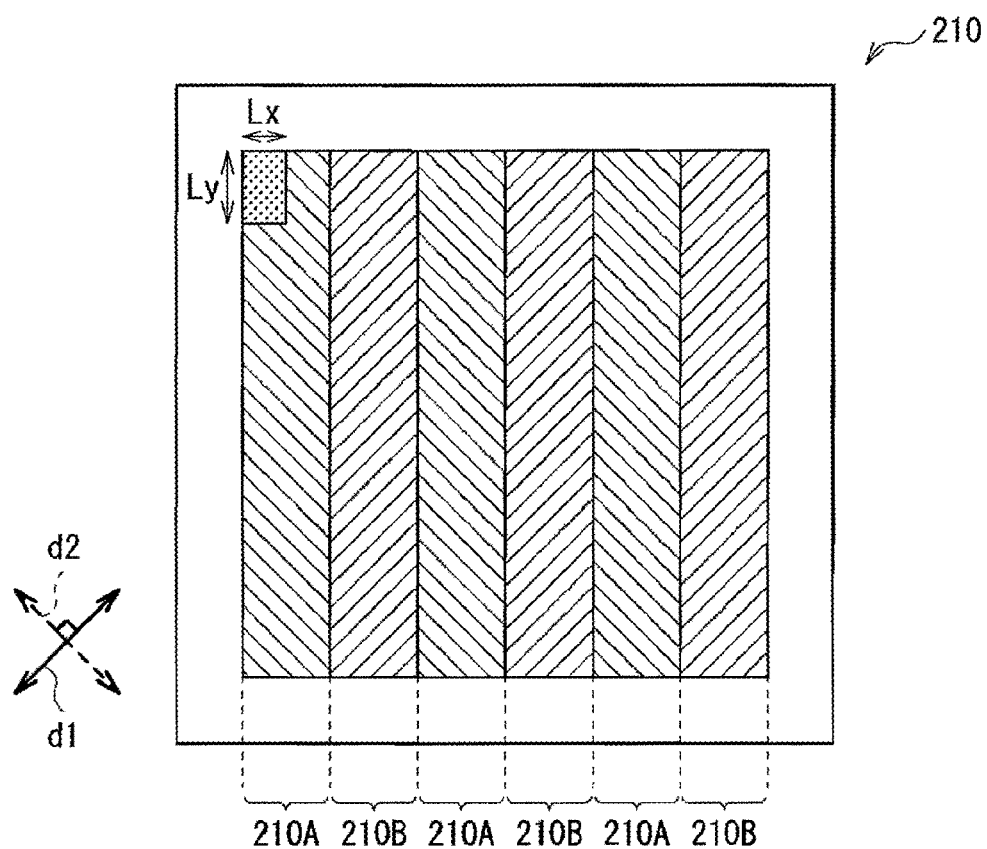
FIG. 32 is an illustration of another example of the procedure of scanning beam spots in FIG. 30.

Moreover, for example, the intensity distribution of the beam spot is preferably as uniform as possible as illustrated in FIG. 30, because an in-plane distribution such as the depths of projections or depressions formed on the mold is desired to be as uniform as possible. As illustrated in FIG. 30, in the case where the beam spot size is a size of Lx by Ly, and the laser scanning direction is a y direction, Lx is determined by the width of a pattern region to be processed. For example, as illustrated in FIG. 31, the size Lx may be approximately equal to the size of the pattern region 210A, or as illustrated in FIG. 32, the size Lx may be approximately a half of the size of the pattern region 210A, thereby the pattern region 210A may be formed by scanning twice. In addition to this, the size Lx may be 1/N (N is a natural number) of the pattern region 210A, thereby the pattern region 210A may be formed by scanning N times. Ly may be appropriately determined by a stage rate, laser intensity, the recurrence frequency or the like, and, for example, Ly is approximately 30 to 500 μm.

Figure 33:
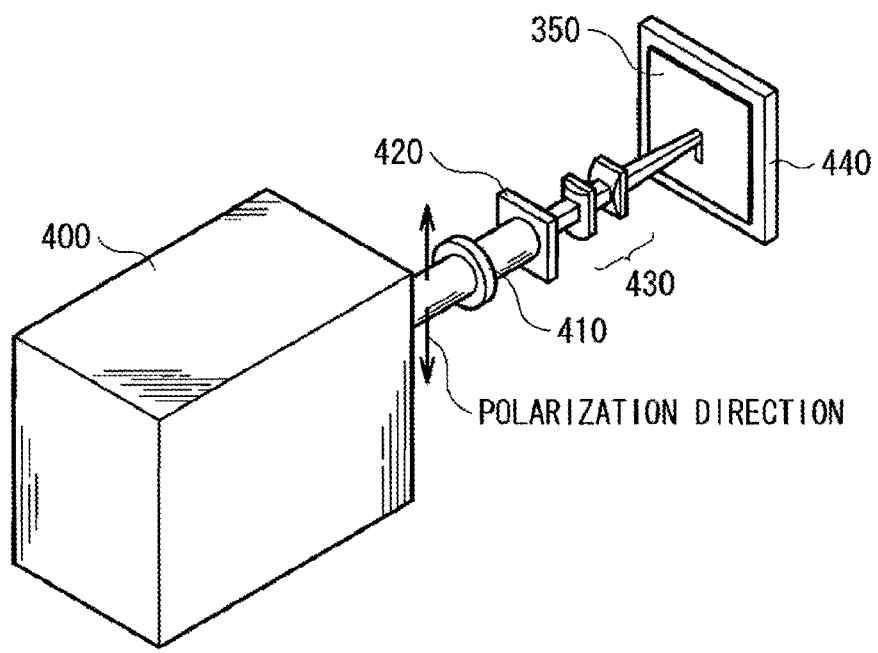
FIG. 33 is an illustration of an example of an apparatus used when manufacturing the mold according to Modification 10.
Figure 34:
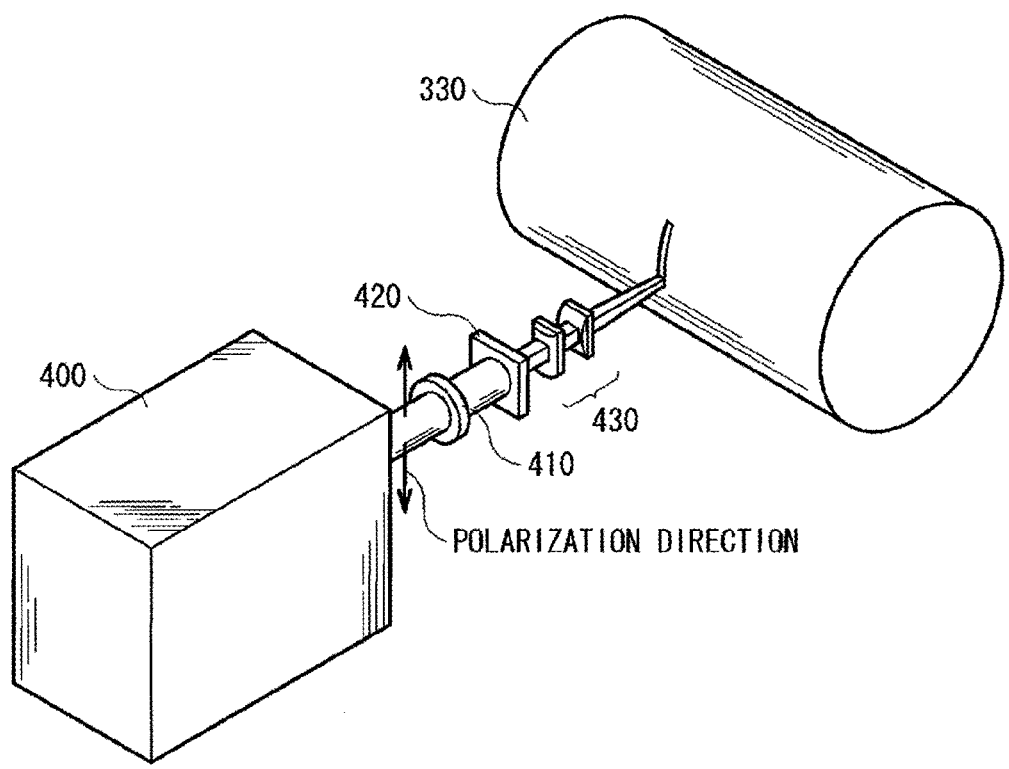
FIG. 34 is an illustration of another example of an apparatus used when manufacturing the mold according to Modification 10.

A technique of forming the mold 210 will be described in detail below. FIGS. 33 and 34 illustrate examples of an optical arrangement used in laser processing. FIG. 33 illustrates an example of the optical arrangement in the case where a flat-plate mold is formed, and FIG. 34 illustrates an example of the optical arrangement in the case where a roll-shaped mold is formed.

A laser main body 400 is IFRIT (a product name) manufactured by Cyber laser Inc. The laser wavelength is 800 nm, the recurrence frequency is 1000 Hz, and the pulse width is 220 fs. The laser main body 400 emits a laser beam linearly polarized in a vertical direction. Therefore, in the laser main body 400, the polarization direction is rotated by a wave plate 410 (a λ/2 wave plate) to obtain linear polarization in a desired direction. Moreover, in the apparatus, a part of the laser beam is taken out through the use of an aperture 420 having a rectangular opening, because the intensity distribution of the laser beam is a Gaussian distribution, so a laser beam with a uniform in-plane intensity distribution is obtained by using only an area around the center of the distribution. Moreover, in the apparatus, the laser beam is narrowed down by two cylindrical lenses 430 orthogonal to each other to have a desired beam size.

Figure 35:
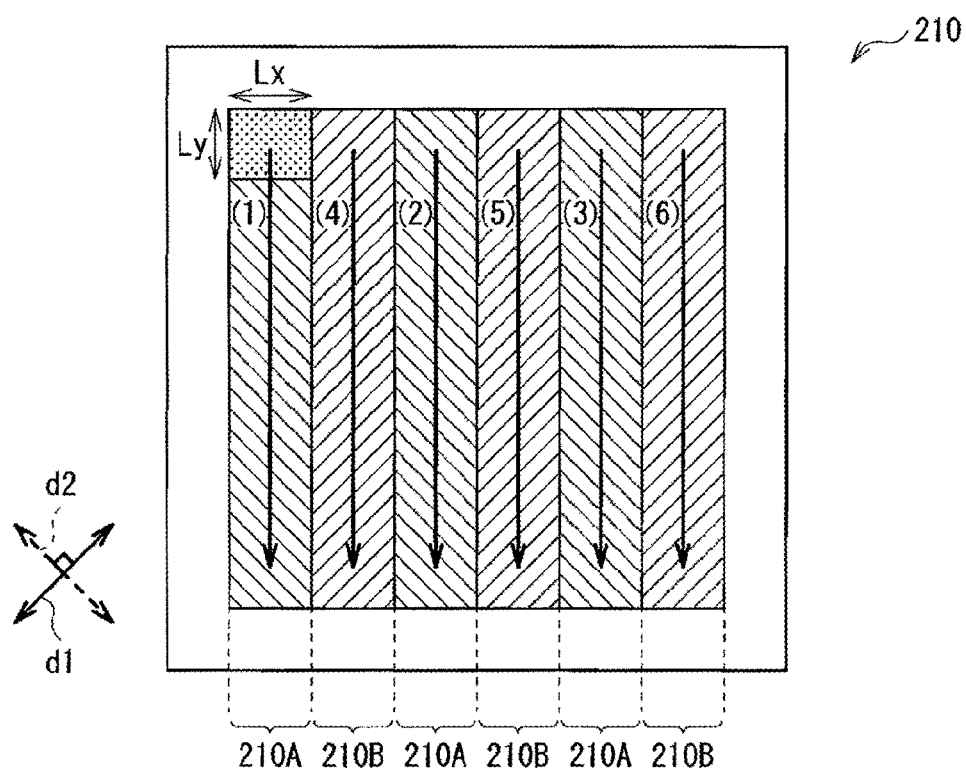
FIG. 35 is an illustration of an example of a procedure of scanning beam spots in the apparatuses in FIGS. 33 and 34.

When the flat plate 350 is processed, a linear stage 440 is moved at a constant rate. For example, as illustrated in FIG. 35, first, only the pattern regions 210A are scanned in order, and then the pattern regions 210B are scanned in order. Numeral references within parentheses indicate scanning order. In the case where such a scanning method is used, it is not necessary to change the angle of the wave plate 410 during scanning the pattern regions 210A and during scanning the pattern regions 210B. Therefore, it is only necessary to change the angle of the wave plate 410 when processing on the pattern regions 210A is completed, and then the processing on the pattern regions 210B starts.

Figure 36:
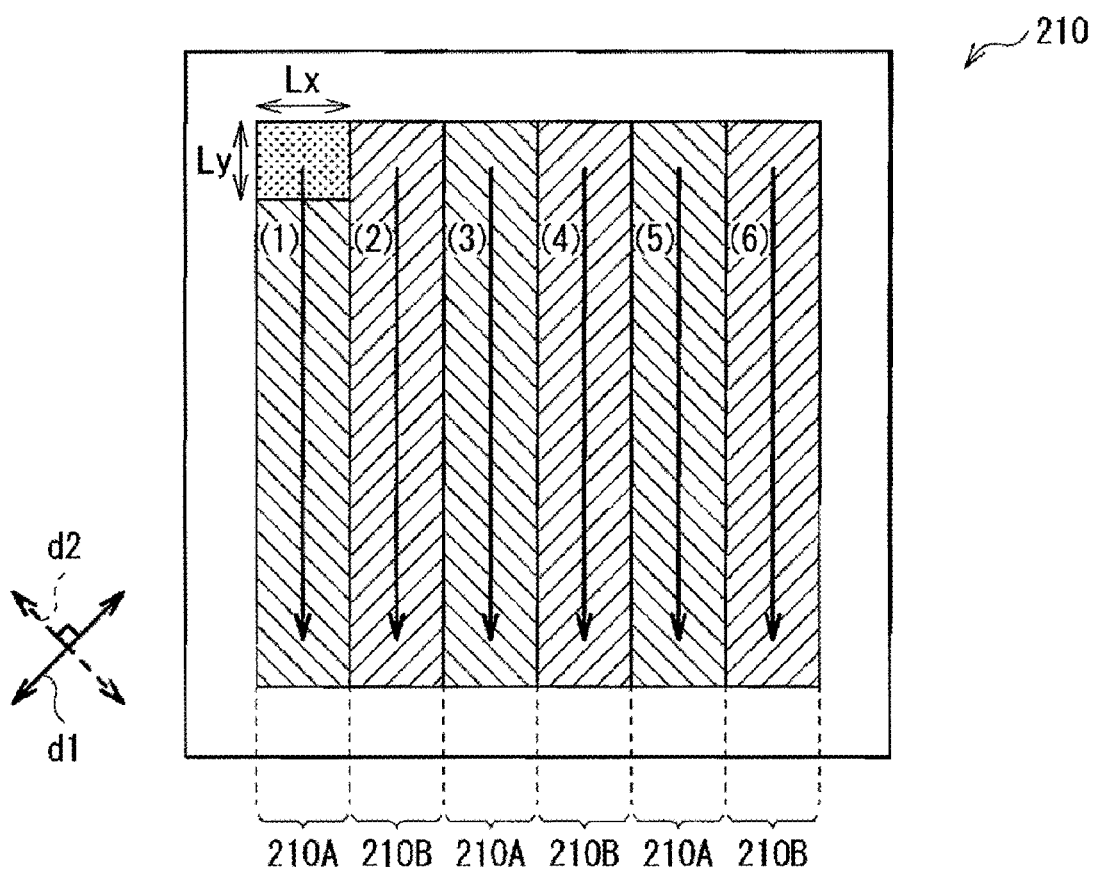
FIG. 36 is an illustration of another example of the procedure of scanning beam spots in apparatuses in FIGS. 33 and 34.

Moreover, for example, as illustrated in FIG. 36, the pattern regions 210A and the pattern regions 210B may be alternately scanned. In the case where such a scanning method is used, it is necessary to change the angle of the wave plate 410 for changing the polarization direction when switching from processing on the pattern region 210A to processing on the pattern region 210B and when switching from processing on the pattern region 210B to processing on the pattern region 210A.

When the roll 330 is processed, instead of moving the linear stage 440, it is only necessary to rotate the roll 330. The scanning order with a laser beam when performing processing on the roll 330 is the same as the scanning order with a laser beam when performing processing on the flat plate 350.

Next, conditions of a laser beam actually used for processing on a mold will be described below.

(1) In the Case where the Widths of the Pattern Regions 210A and 210B were 530 μm As the material of the mold, SUS304 was used, and the beam sizes Lx and Ly were 530 μm and 30 μm, respectively, and power was 156 mW, and the stage rate was 3 mm/s. When the pattern regions 210A were scanned, the polarization direction of the laser was the direction d1, and when the pattern regions 210B were scanned, the polarization direction of the laser was the direction d2. The direction d1 was a direction at −45° with respect to the extending directions of the pattern regions 210A and 210B, and the direction d2 was a direction at +45° with respect to the extending directions of the pattern regions 210A and 210B.

Thereby, a mold in which the pattern regions 210A having a width of 530 μm and the extending direction of depressions (projections) in a +45° direction and the pattern regions 210B having a width of 530 μm and the extending directions of depressions (projections) in a −45° direction were alternately arranged was formed. When SUS420J2 and NiP were processed under the same conditions, the mold was formed in a like manner. In addition, as NiP, NiP-plating on SUS was used.

(2) In the Case where the Widths of the Pattern Regions 210A and 210B were 270 μm SUS304 was used as the material of the mold, and the beam sizes Lx and Ly were 270 μm and 220 μm, respectively, and power was 200 mW, and the stage rate is 6 mm/s. When the pattern regions 210A were scanned, the polarization direction of the laser was the direction d1, and when the pattern regions 210B were scanned, the polarization direction of the laser was the direction d2. The direction d1 was a direction at −45° with respect to the extending directions of the pattern regions 210A and 210B, and the direction d2 was a direction at +45° with respect to the extending directions of the pattern regions 210A and 210B.

Thereby, a mold in which the pattern regions 210A having a width of 270 μm and the extending direction of depressions (projections) in a +45° direction and the pattern regions 210B having a width of 270 μm and the extending directions of depressions (projections) in a −45° direction were alternately arranged was formed.

The projections and depressions of the molds formed in the above-described techniques had a periodic structure pitch of approximately 700 nm and a depth of approximately 50 to 250 nm.

The steps except for a step of performing transfer with the mold 210 formed by using the femtosecond laser are the same as those in the above-described embodiment. Now, functions and effects of the modification will be described below in comparison with the case where typical lithography is used.

In the above-described embodiment, as a method of forming patterns of a mold, cutting with a cutting tool or lithography is described. As the lithography, lithography using an electron beam, a two-beam interference method or the like is typically used. Among them, in the lithography using the electron beam, a surface of the mold is coated with a resist, and then the electron beam is applied to the resist to draw a pattern, thereby a desired pattern is formed through a developing step, an etching step and the like. Moreover, in the lithography using the two-beam interference method, two laser beams are interfered, and the two laser beams are applied to form an interference pattern, then a pattern is formed by lithography using the interference pattern.

However, in the lithography using the electron beam, to draw a pattern having a fine periodic structure in an area 5 mm square, even in the case where a high-performance apparatus is used, it takes as long as 12 hours. On the other hand, in the two-beam interference method, a time necessary for one drawing step is approximately a few tens of seconds, but the area of the periodic structure which is drawn in one drawing step is determined by the beam diameter of the laser beam, so the area is as small as approximately a few mm square. Therefore, to form a periodic antireflection structure having an area a few cm square, it is necessary to draw patterns a few mm square by performing the drawing step several times so that the patterns are pieced together while changing the position where the laser beam is applied. Therefore, a mismatch at a juncture of the patterns easily occurs. Moreover, in the two-beam interference method, the period of grids formed by interference patterns is easily affected by the incident angles of two light beams, so it is necessary to prevent the deflection of the incident angles. Therefore, it is necessary to strictly adjust an optical system to set the optical path of each laser beam precisely, thereby the configuration of the apparatus is complicated.

On the other hand, in the modification, the pattern regions 210A and 210B of the mold 210 are drawn with the femtosecond laser by controlling the beam spot shape of the femtosecond laser, thereby the pattern regions 210A and 210B are collectively formed by applying the laser beam once. Moreover, in the case where the femtosecond laser is used, projections (depressions) are formed so as to extend along a direction orthogonal to the polarization direction, so the groove directions of the retardation film are easily set by polarization control. Therefore, it is advantageous for simplification of a manufacturing process. Moreover, the modification is adaptable for a demand for an increase in the area of the mold.

Figure 37A:
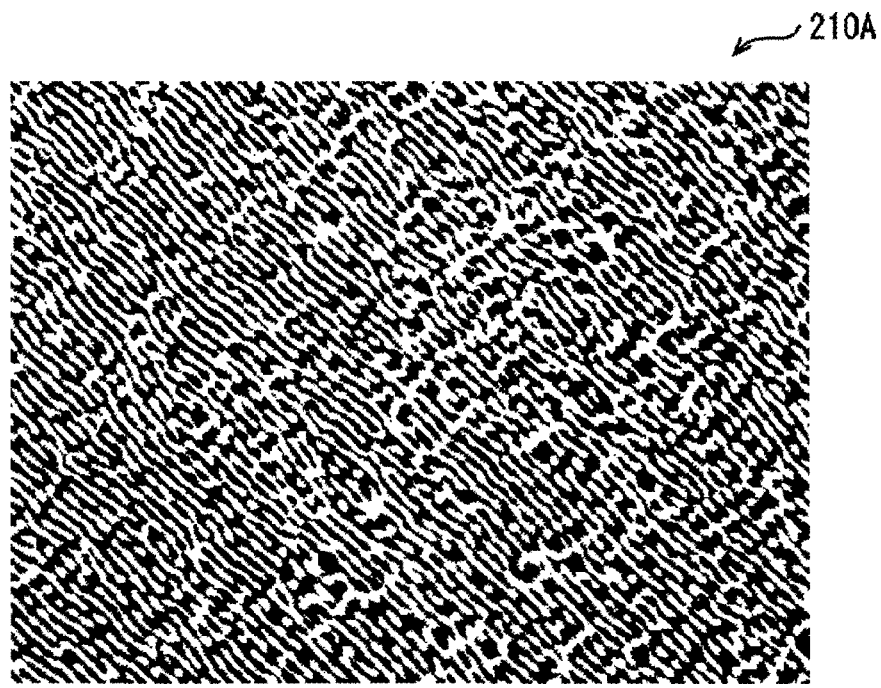
FIGS. 37A and 37B are illustrations of an uneven surface in a pattern region formed by an ultrashort pulse laser.
Figure 37B:
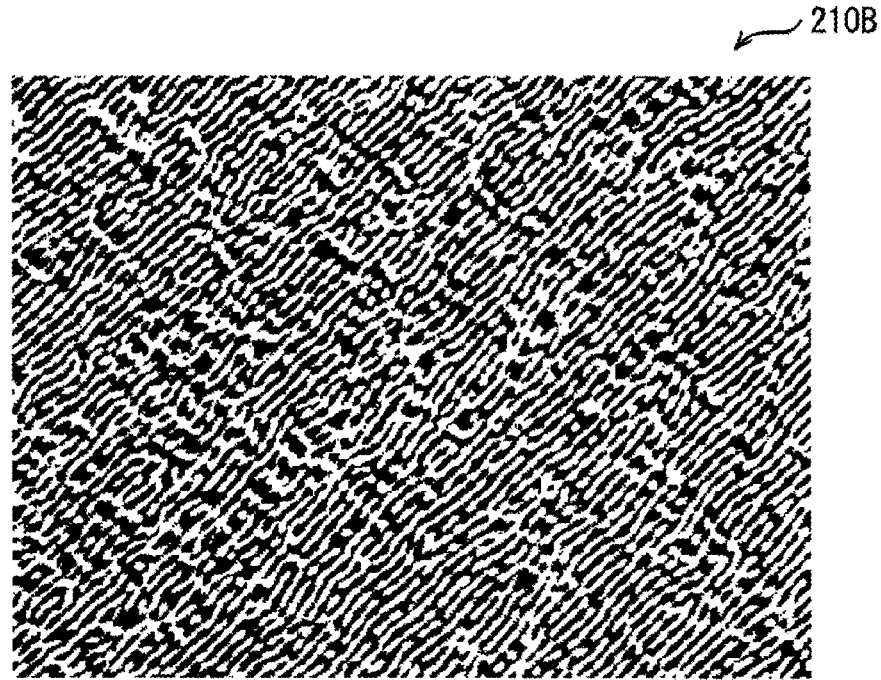
Figure 38A:
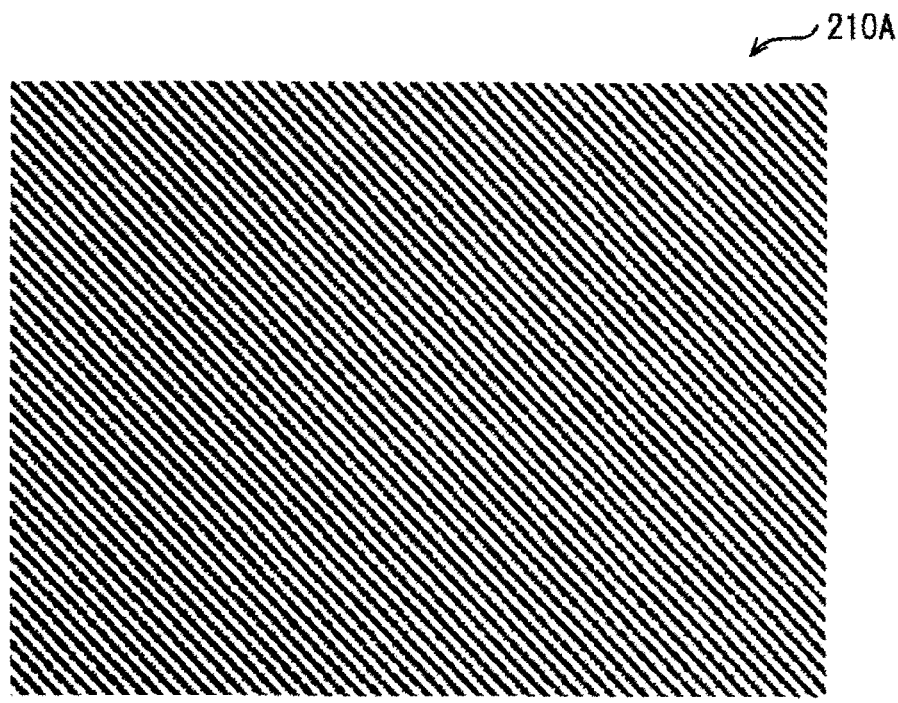
Figure 38B:
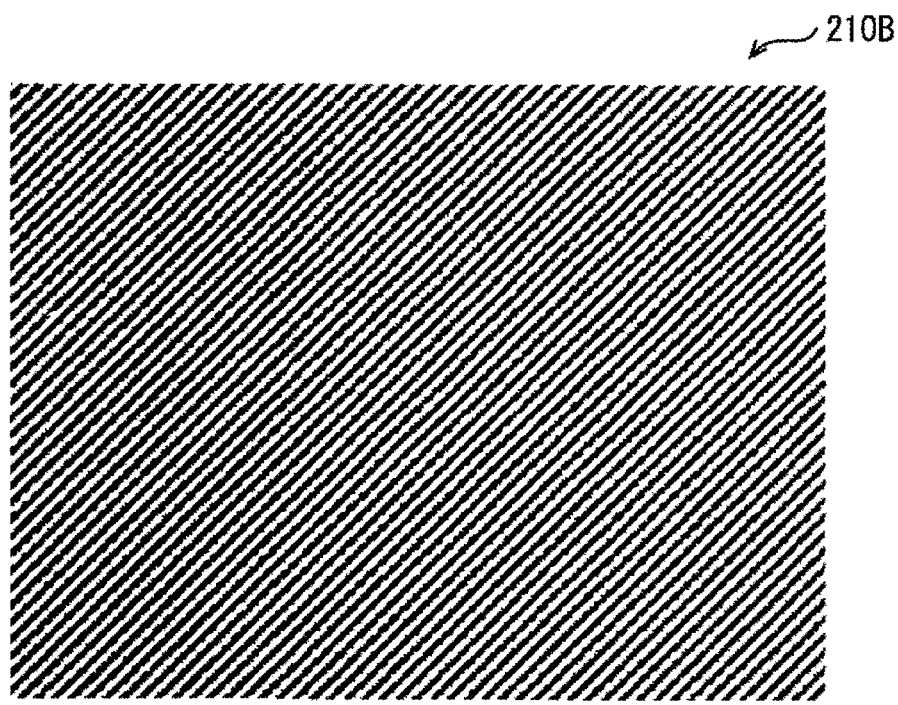

As illustrated in FIGS. 37A and 37B, the pattern regions 210A and 210B formed by the femtosecond laser in the modification have a periodic structure to some extent, but the period of the periodic structure or directions of projections and depressions in the periodic structure have fluctuations. In other words, the pattern regions 210A and 210B in the modification have a fluctuated periodic structure. On the other hand, the pattern regions 210A and 210B formed by the other technique such as the electron beam lithography do not have fluctuations as illustrated in FIGS. 38A and 38B.

In the case where the mold on which the pattern regions 210A and 210B have fluctuations in the modification is used to perform transfer to a substrate, an uneven shape having fluctuations is transferred to a surface of the substrate. When a liquid crystal layer is formed on the surface of the substrate, for example, as illustrated in FIGS. 39A and 39B, the liquid crystal layer is formed on the uneven shape (grooves 111a) having fluctuations. The case where a mold in which an uneven shape (the grooves 111a) does not have fluctuations is used is illustrated in FIGS. 40A and 40B.

Figure 41B:
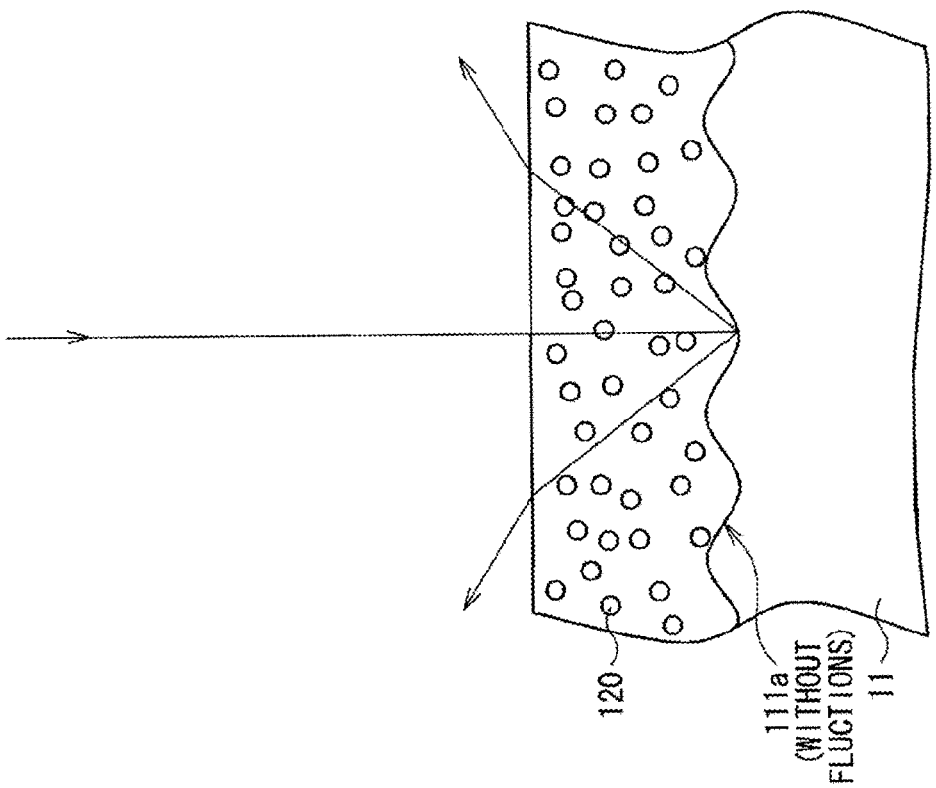
FIGS. 41A and 41B are illustrations of diffraction by the uneven surfaces in FIGS. 37A, 37B, 38A and 38B.
Figure 41A:
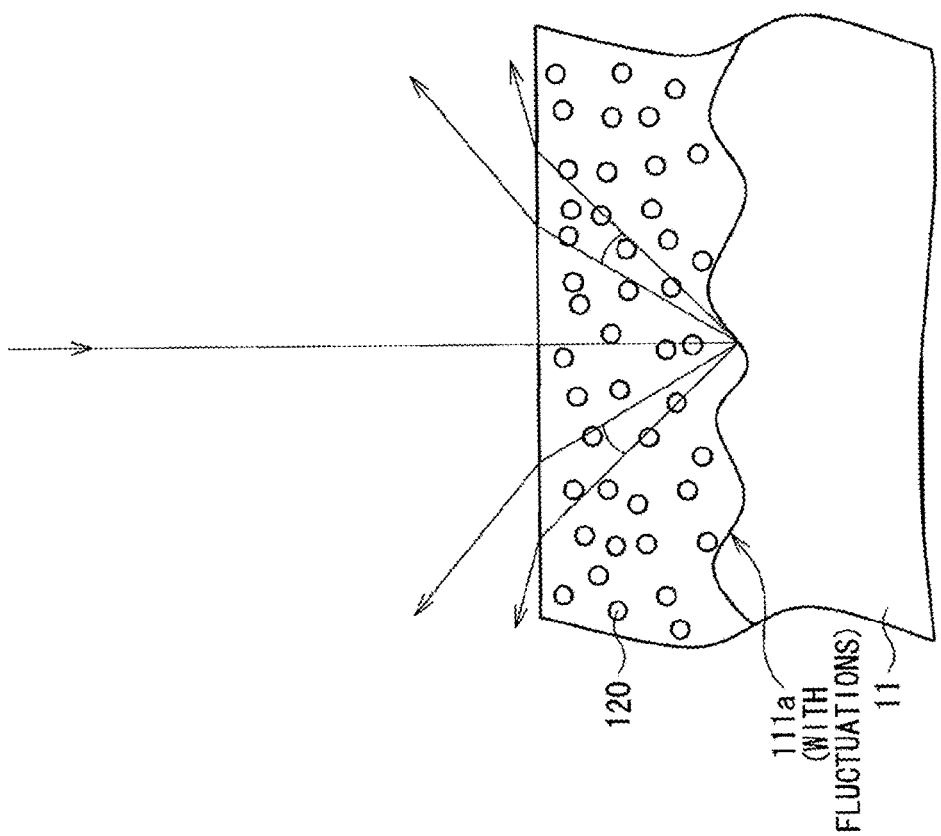

In the case where projections and depressions have a periodic structure (including the case where projections and depressions have fluctuations to some extent), when the refractive indexes of the liquid crystal molecules 120 and the substrate 11 are different from each other, a part of incident light is diffracted. A comparison between diffraction in the case where the uneven shape (grooves 111a) has fluctuations and diffraction in the case where the uneven shape does not have fluctuations is made as below. As illustrated in FIG. 41B, in the case where the uneven shape (the grooves 111a) does not have fluctuations, incident light is diffracted only in one specific direction by a periodic structure not having fluctuations. Diffraction is dependent on wavelength, so the diffraction angle is changed by the wavelength of incident light, so diffracted light appears rainbow-colored. On the other hand, in the modification, as illustrated in FIG. 41A, the uneven shape (the grooves 111a) has fluctuations, so the diffracted light appears blurred in a certain angle range by the fluctuated periodic structure. Therefore, the diffracted light of the incident light does not appear clearly.

In the case where the retardation film is used for a display, when outside light such as light from a fluorescent lamp enters, a difference in the influence of the diffracted light is evident. More specifically, in the case where the uneven shape (the grooves 111a) does not have fluctuations, when outside light such as light from the fluorescent lamp enters into the display, a screen of the display looks rainbow-colored. On the other hand, in the case where the uneven shape (the grooves 111a) has fluctuations, even if outside light such as light from the fluorescent lamp enters into the display, the diffracted light is blurred, thereby the screen of the display is not rainbow-colored. Therefore, in the uneven shapes of the pattern regions 210A and 210B, the period or the directions of projections and depressions preferably have fluctuations.

Figure 42A:
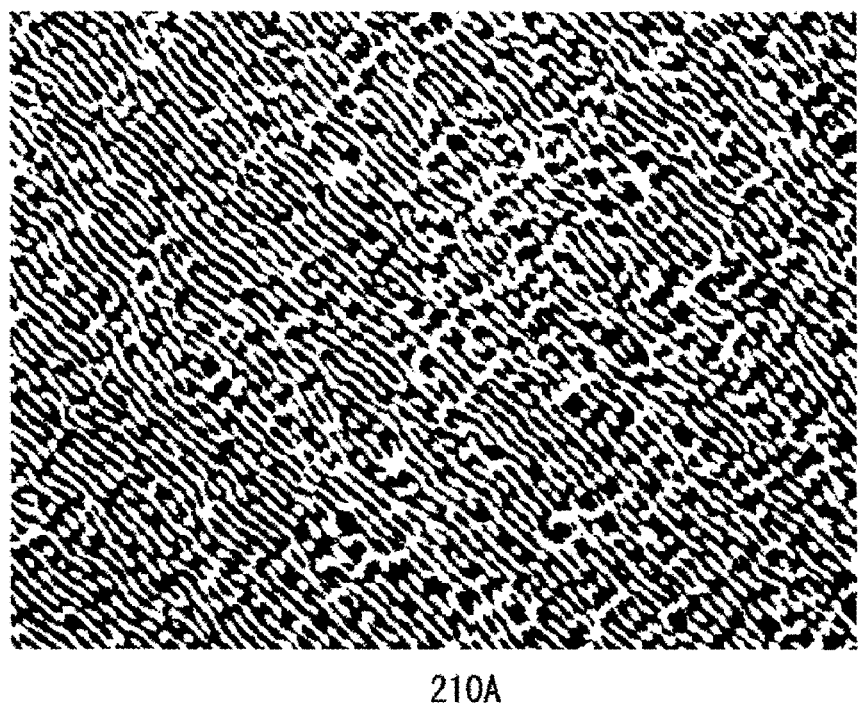
FIGS. 42A and 42B are illustration of a DFT analysis result of diffracted light on the uneven surface in FIGS. 37A and 37B.
Figure 42B:
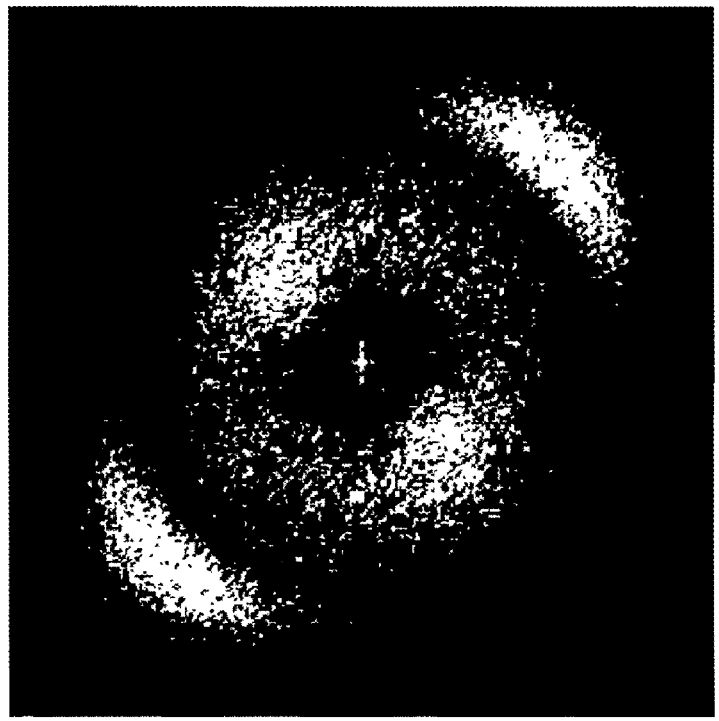
Figure 43A:
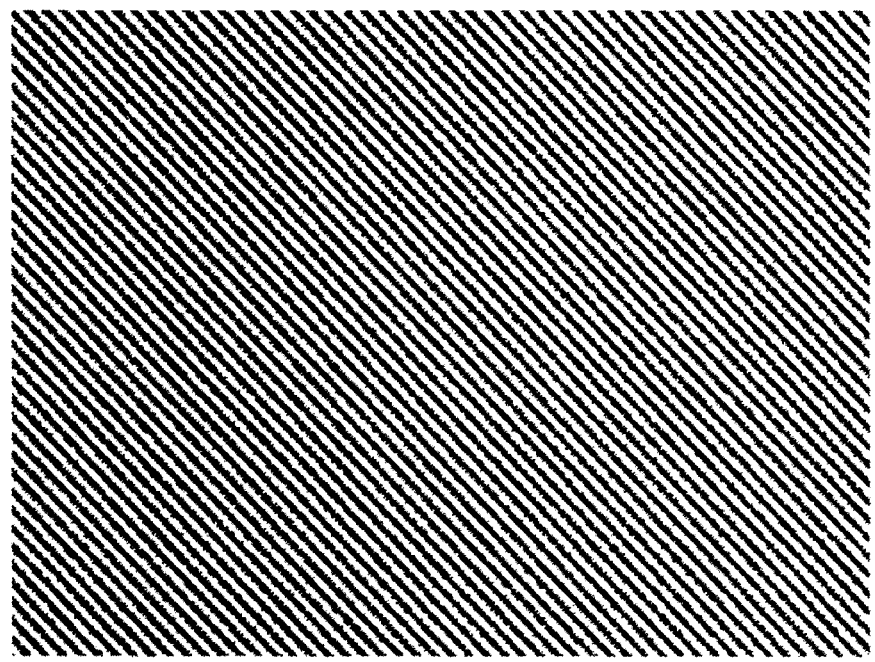
FIGS. 43A and 43B are illustrations of a DFT analysis result of diffracted light on the uneven surface in FIGS. 38A and 38B.
Figure 43B:

Next, to what extent fluctuations are preferable is considered. Herein, DFT (discrete Fourier transform) analysis is performed on photograph data of the pattern region 210A to quantify the photograph data depending on how wide the fluctuations are in a spatial frequency region. FIGS. 42A and 42B illustrate a DFT analysis result in the case where the uneven shape (the grooves 111a) has fluctuations. FIGS. 43A and 43B illustrate a DFT analysis result in the case where the uneven shape (the grooves 111a) does not have fluctuations. To quantify a DFT image, fitting is performed using the following Gauss function around a spatial frequency at which the power spectrum density (PSD) of the DFT image is at the maximum.

$$PSD = A\exp\left[-\left(\frac{f-f_0}{f_w}\right)^2 - \left(\frac{\theta-\theta_0}{\theta_w}\right)^2\right] \quad \text{Mathematical Formula 1}$$

In this case, "f" is a spatial frequency, and "$\theta$" is an angle. Moreover, "$f_0$" is a spatial frequency at which the PSD is at the maximum, and "$\theta_0$" is an angle at which the PSD is at the maximum. Further, "$f_w$" and "$\theta_w$" are amounts indicating a spread around a peak. When the spread of pitches of projections and depressions and the spread of angles of projections and depressions are determined based on the Gauss function, in the case where fluctuations are present, the spread of the pitches is approximately 2 to 10%, and the spread of the angles is approximately 3 to 8%, but on the other hand, in the case where fluctuations are not present, the spread of the pitches is as small as approximately 0 to 2%, and the spread of the angles is as small as approximately 0 to 1%.

Next, Application Example 1 of the retardation films according to the above-described embodiment and Modifications 1 to 4, and Application Examples 2 and 3 of the retardation film 20 according to Modification 5 will be described below. In Application Example 1, descriptions will be given referring to the configuration of the retardation film 10 illustrated in FIG. 1 as an example.

Application Example 1

Figure 44:
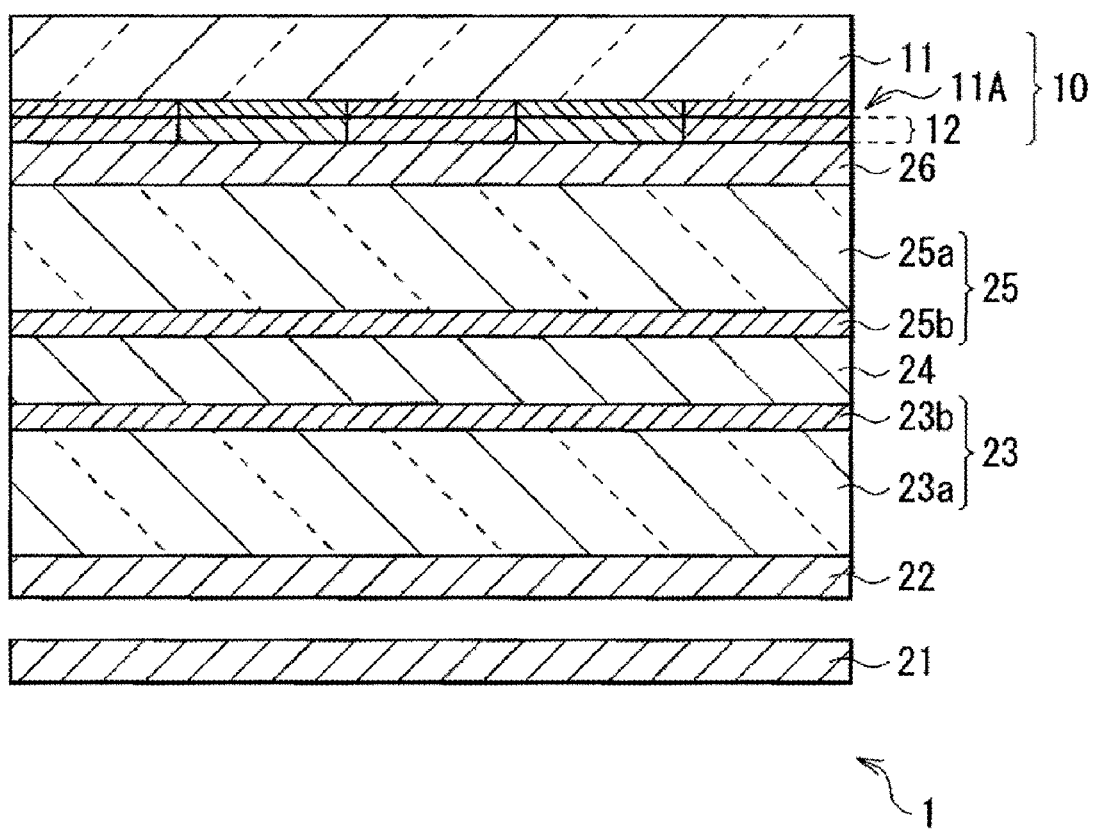
FIG. 44 is a sectional view of a brief configuration of a display according to Application Example 1.
Figure 45:
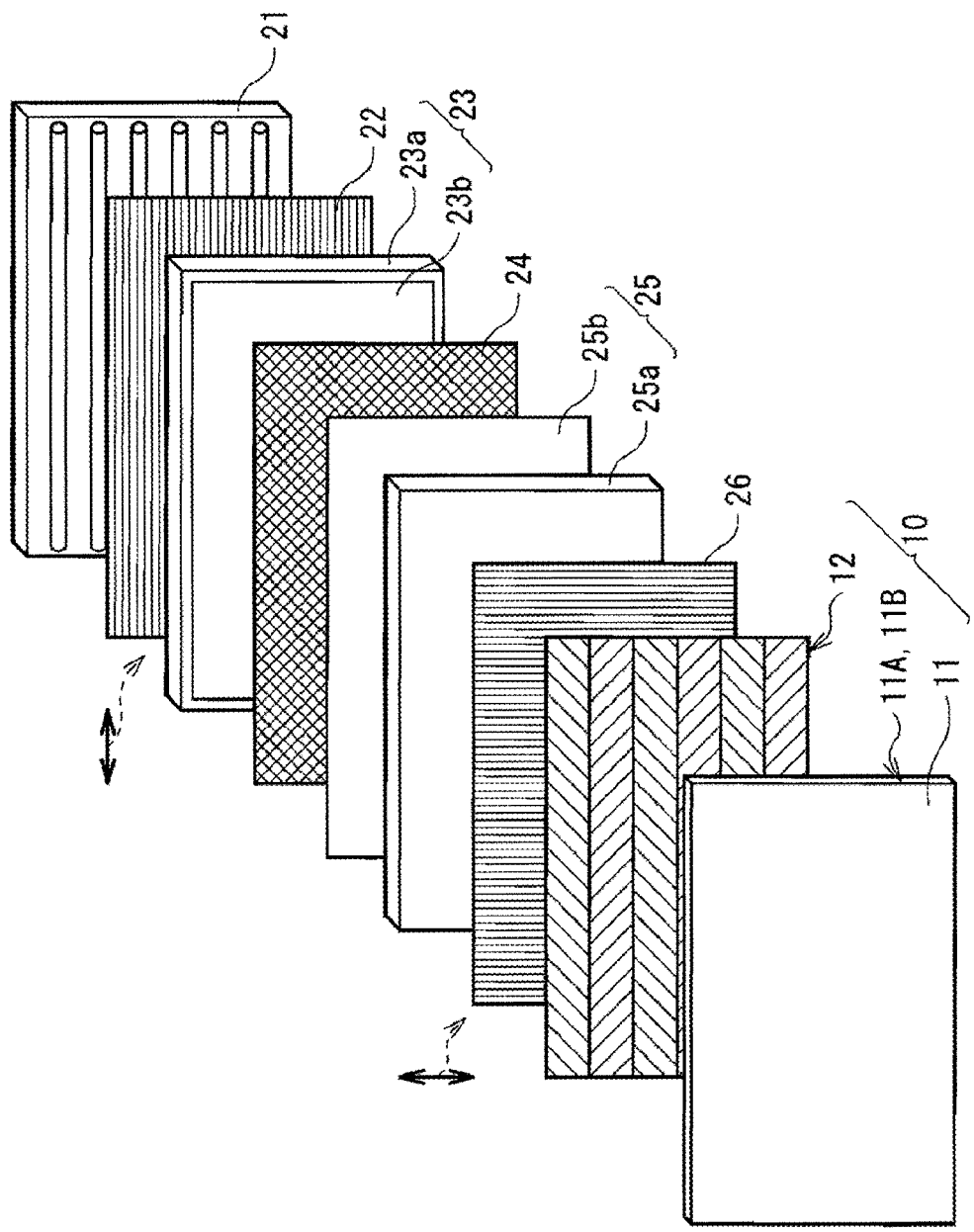
FIG. 45 is a schematic view of a laminate configuration of the display illustrated in FIG. 44.

FIG. 44 illustrates a sectional configuration of a display 1 according to Application Example 1. FIG. 45 is a schematic view of a laminate configuration of the display 1. The display 1 is a 3D display which displays two-dimensional images based on, for example, a right-eye image signal and a left-eye image signal, and achieves stereoscopic viewing by observing these two-dimensional images with polarized glasses.

The display 1 includes, for example, a plurality of pixels of three primary colors red (R), green (G), and blue (B) arranged in a matrix form, and includes a polarizer 22, a drive substrate 23, a liquid crystal layer 24, an opposed substrate 25 and a polarizer 26 in order from a side close to a backlight 21. The above-described retardation film 10 is bonded to a light emission side of the polarizer 26 so that, for example, the retardation layer 12 is opposed to the polarizer 26. In such a configuration, the optical axis directions of the retardation regions 12a and 12b in the retardation layer 12 are arranged so as to form an angle of 45° with respect to the transmission axis of the polarizer 26. Moreover, the groove regions 11A and 11B of the retardation film 10 correspond to even-order lines and odd-order lines of a display pixel region, respectively, and the stripe widths of the groove regions 11A and 11B are equal to a pixel pitch.

As the backlight 21, for example, an edge-light type backlight using a light guide plate or a direct type backlight is used, and the backlight 21 includes, for example, a CCFL (Cold Cathode Fluorescent Lamp), an LED (Light Emitting Diode) or the like.

The drive substrate 23 is formed by forming pixel drive devices such as TFTs (Thin Film Transistors) on a surface of a transparent substrate 23a such as, for example, glass. The opposed substrate 25 is formed by forming a color filter layer 25b corresponding to the above-described three primary colors on a surface of a transparent substrate 25a such as, for example, glass.

The liquid crystal layer 24 is made of, for example, a liquid crystal material such as a nematic liquid crystal, a smectic liquid crystal or a cholesteric liquid crystal, and the liquid crystal layer 24 is made of, for example, a VA (Vertical Alignment) mode liquid crystal. An alignment film (not illustrated) for controlling the alignment of liquid crystal molecules of the liquid crystal layer 24, for example, a polyimide alignment film or the like is arranged each between the liquid crystal layer 24 and the drive substrate 23 and between the liquid crystal layer 24 and the opposed substrate 25.

The polarizers 22 and 26 allow polarized light vibrating in a specific direction to pass therethrough, and the polarizers 22 and 26 absorb or reflect polarized light vibrating in a direction orthogonal to the specific direction. The polarizers 22 and 26 are arranged so that the transmission axes of the polarizers 22 and 26 are orthogonal to each other. In this case, the polarizer 22 selectively allows a polarization component in a horizontal direction to pass therethrough, and the polarizer 26 selectively allows a polarization component in a vertical direction to pass therethrough.

In such a display 1, when light emitted from the backlight 21 enters the polarizer 22, only the polarization component in the horizontal direction passes through the polarizer 22, and then the polarization component in the horizontal direction passes through the drive substrate 23 to enter the liquid crystal layer 24. The incident light is modulated in the liquid crystal layer 24 based on an image signal, and then passes through the liquid crystal layer 24. By the color filter 25b of the opposed substrate 25, red light, green light and blue light are taken out from the light having passed through the liquid crystal layer 24 in each of the pixels of the three primary colors, and then only the polarization component in the vertical direction passes through the polarizer 26. Then, the polarization component having passed through the polarizer 26 is converted into a predetermined polarization state in each of the retardation regions 12a and 12b by the retardation layer 12 of the retardation film 10, and then the polarization component is emitted from the substrate 11. Light emitted from the retardation film 10 in such a manner is recognized as a three-dimensional stereoscopic image by a viewer wearing polarized glasses. At this time, as described above, since the alignment film is not formed in the retardation film 10, the occurrence of light loss by the retardation film 10 is prevented, and light use efficiency is improved. Therefore, brighter display than ever before is achieved.

Figure 46:
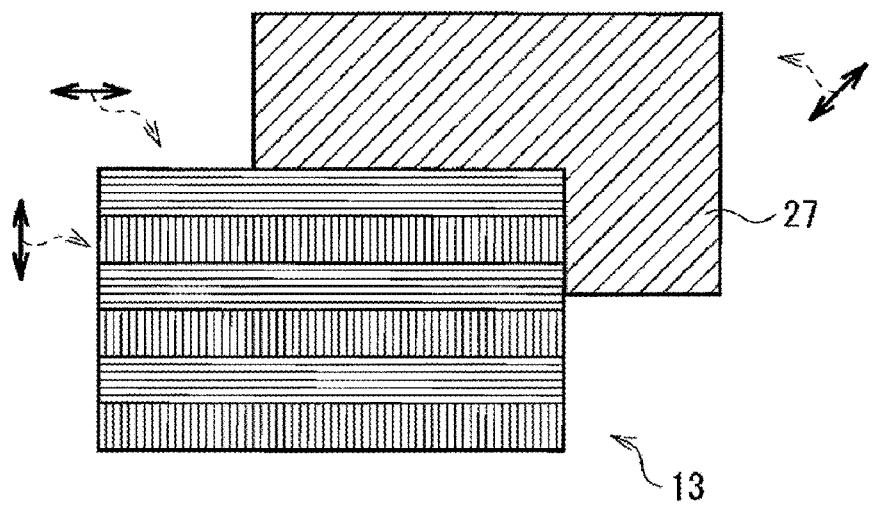
FIG. 46 is a schematic view of a retardation film and a polarizer according to another example of Application Example 1.

In addition, in the case where the retardation film according to Modification 1 is applied to the above-described display 1, for example, as illustrated in FIG. 46, a polarizer 27 which is set so that its transmittance axis forms an angle of 45° with respect to the horizontal direction is used. Thereby, the transmission axis direction of the polarizer 27 and the optical axis direction of each retardation region of the retardation film are arranged so as to form an angle of 45° with respect to each other.

Moreover, the retardation film 10 is bonded to a front surface of the display 1, so the retardation film 10 is arranged in an outermost surface of the display 1. Therefore, to improve contrast at a bright place, an antireflection layer (not illustrated) or an anti-glare layer (not illustrated) is preferably arranged on a back surface of the substrate 11. Further, an area around a boundary between retardation patterns may be coated with a black pattern. Such a configuration allows the occurrence of crosstalk between the retardation patterns to be prevented.

Application Example 2

Figure 47:
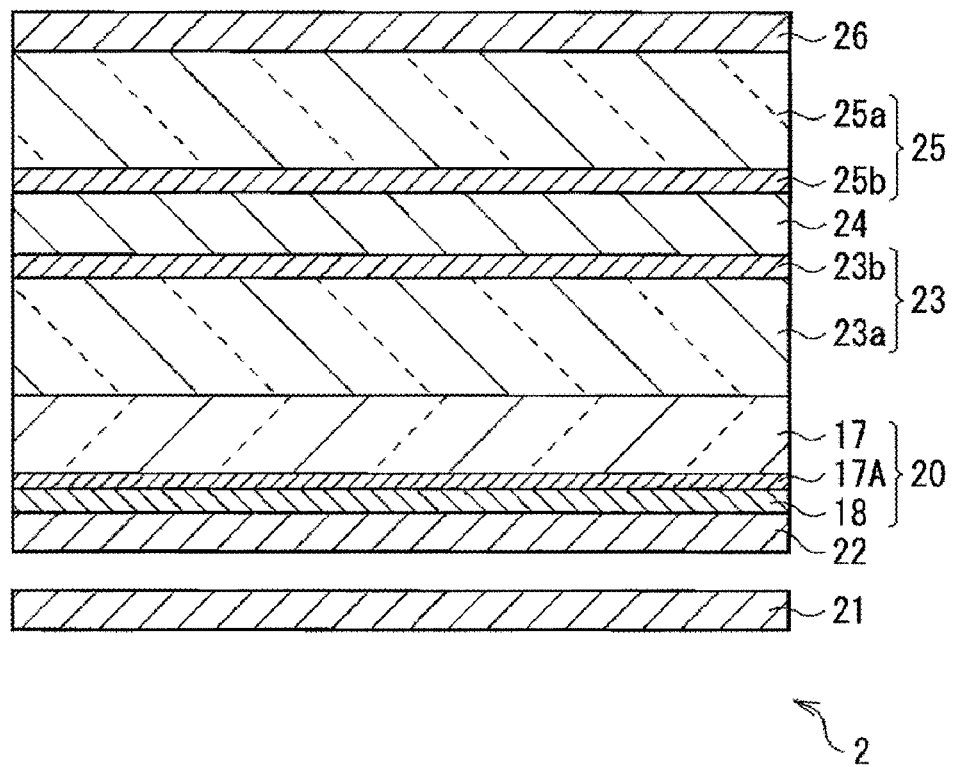
FIG. 47 is a sectional view of a brief configuration of a display according to Application Example 2.
Figure 48:
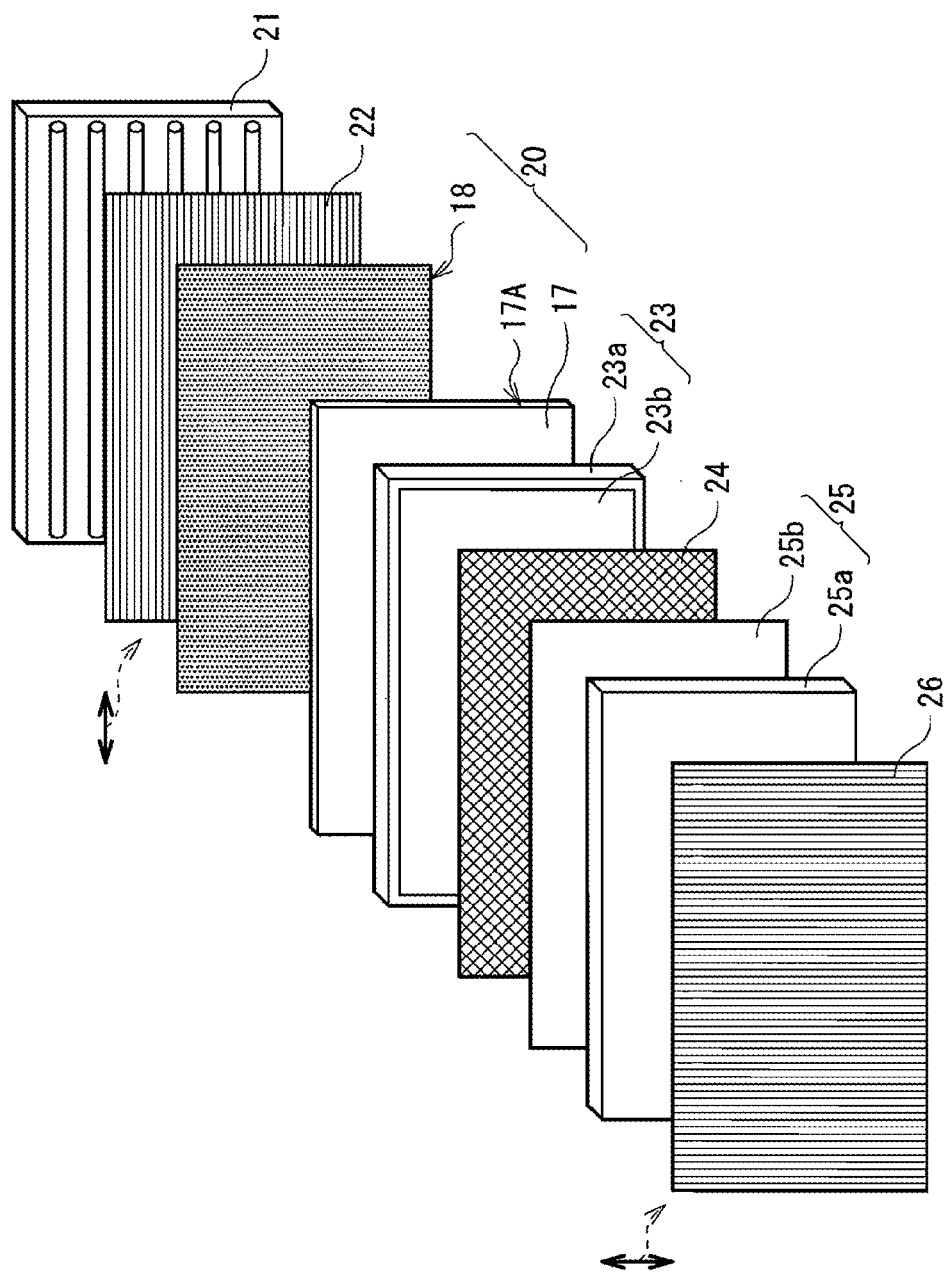
FIG. 48 is a schematic view of a laminate configuration of the display illustrated in FIG. 47.

FIG. 47 illustrates a sectional configuration of a display 2 according to Application Example 2. FIG. 48 is a schematic view of a laminate configuration of the display 2. The display 2 is a display for two-dimensional display such as a liquid crystal television or a personal computer, and the display 2 uses the retardation film 20 as a viewing angle compensation film. The display 2 includes the polarizer 22, the drive substrate 23, the liquid crystal layer 24, the opposed substrate 25 and the polarizer 26 in order from a side close to the backlight 21, and in the display 2, the retardation film 20 according to Modification 5 is arranged on a light emission side of the polarizer 22. As described above, the retardation film 20 is a retardation film (an A plate) in which polymerizable liquid crystal molecules in the retardation layer 18 are uniformly aligned in the extending direction of grooves. In this case, the extending direction of the grooves of the retardation film 20, that is, the optical axis direction and the transmission axis direction of the polarizer 22 are arranged so as to form an angle of 0° with respect to each other.

In this case, as the viewing angle compensation film used in the above-described display, in addition to the above-described A plate, a C plate or the like may be used. Moreover, a retardation film providing biaxiality to a retardation layer by applying, for example, a polarized ultraviolet ray may be used. However, in the case where a VA mode liquid crystal is used in the liquid crystal layer 24, one or both of the A plate and the C plate are preferably used.

In the retardation film as the above-described C plate, the retardation layer has, for example, a chiral nematic phase (a cholesteric phase), and the optical axis direction of the retardation layer corresponds to the direction of the normal to the substrate surface. In the C plate, liquid crystal molecules aligned along the extending direction of grooves form a helical structure having a helical axis in the direction of the normal to the substrate surface by inputting a chiral dopant or the like. Thus, a configuration in which the alignment of liquid crystal molecules is changed in a thickness direction of the retardation layer may be used. In other words, the extending direction of grooves and the optical axis direction of the retardation film may be different from each other, because optical anisotropy as the retardation film is determined depending on the alignment state of liquid crystal molecules in the thickness direction.

In such a display 2, when light emitted from the backlight 21 enters the polarizer 22, only a polarization component in a horizontal direction passes through the polarizer 22 to enter the retardation film 20. Light having passed through the retardation film 20 passes through the drive substrate 23, the light crystal layer 24, the opposed substrate 25 and the polarizer 26 in order to be emitted from the polarizer 26 as a polarization component in a vertical direction. Thereby, two-dimensional display is performed. In this case, as the retardation film 20 is arranged, a phase difference in a liquid crystal viewed from an oblique direction is compensated to allow a reduction in light leakage in the oblique direction or coloring in black display. In other words, the retardation film 20 is applicable as the viewing angle compensation film. Moreover, at this time, the alignment film is not formed in the retardation film 20, so the occurrence of light loss by the retardation film 20 is prevented, and the light use efficiency is improved. Therefore, brighter display than ever before is achieved.

In addition, the retardation film 20 as such a viewing angle compensation film may be arranged between the polarizer 22 and the drive substrate 23 in the display 1 for three-dimensional display according to Application Example 1. Moreover, a configuration in which the optical axis direction d1 of the retardation film 20 and the transmission axis direction of the polarizer 22 are arranged so as to form an angle of 0° with respect to each other is described as an example. However, the angle formed between these directions is not limited to 0°. For example, in the case where a circularly polarizing plate is used as the polarizer 22, the optical axis direction d1 of the retardation film 20 and the transmission axis direction of the polarizer 22 are arranged so as to form an angle of 45° with respect to each other.

Application Example 3

Figure 49:
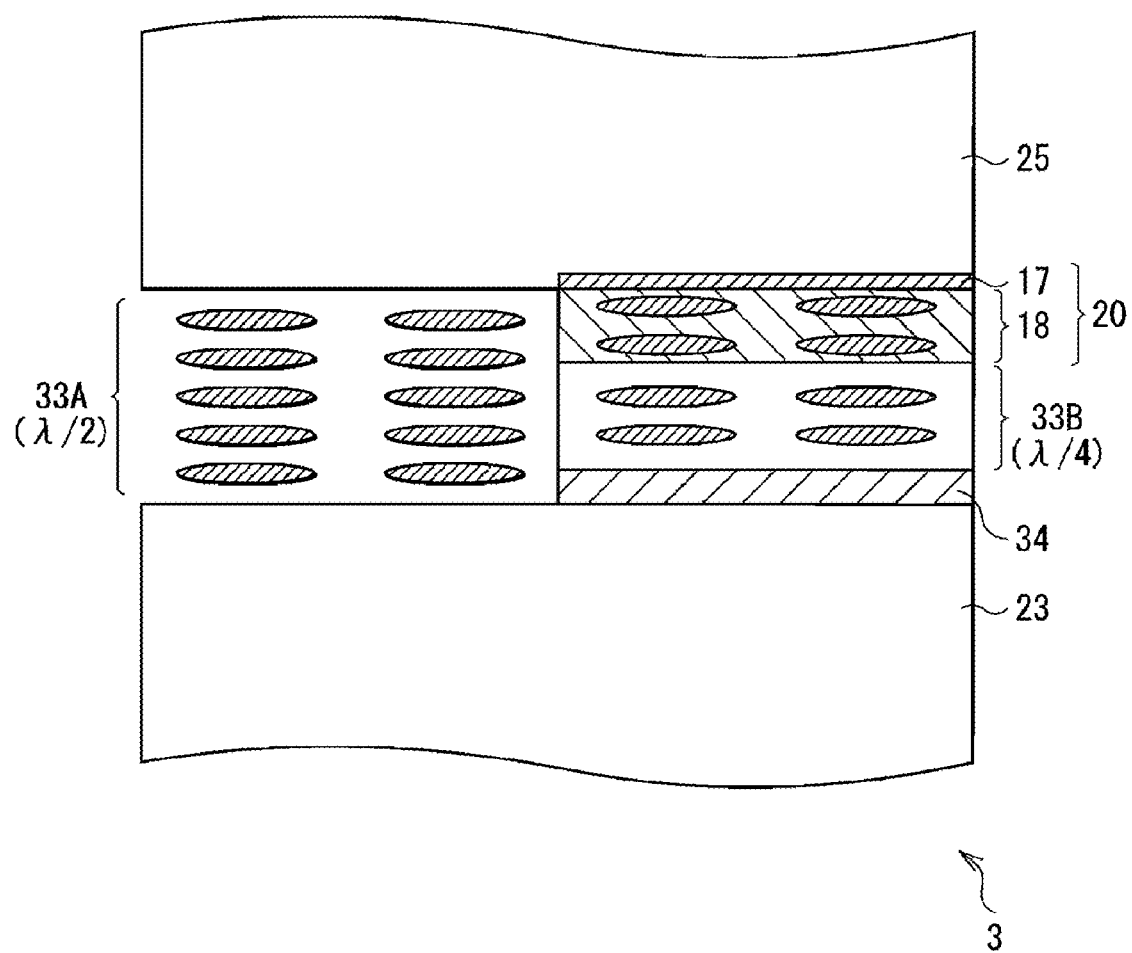
FIG. 49 is a sectional view of a brief configuration of a display according to Application Example 3.

FIG. 49 illustrates a sectional configuration of a display 3 according to Application Example 3. The display 3 is, for example, a semi-transmissive two-dimensional display. In the display 3, the retardation film 20 as the viewing angle compensation film is formed together with liquid crystal layers 33A and 33B for display modulation between the drive substrate 23 and the opposed substrate 25. More specifically, a reflective layer 34 is arranged in a selective region on the drive substrate 23, and the retardation film 20 is formed in a region opposed to the reflective layer 34 on the opposed substrate 25. The liquid crystal layer 33B is sealed between the drive substrate 23 and the retardation film 20. On the other hand, the liquid crystal layer 33A is sealed in the other region between the drive substrate 23 and the opposed substrate 25. The liquid crystal layers 33A and 33B modulate light by the application of a voltage, and have phase differences of $\lambda/2$ and $\lambda/4$, respectively. In addition, the backlight 21 and the polarizer 22 (both not illustrated in FIG. 49) are arranged below the drive substrate 23, and the polarizer 26 (not illustrated in FIG. 49) is arranged above the opposed substrate 25.

Example 1

Next, an example of the retardation film 10 according to the above-described embodiment will be described below. The retardation film 10 was actually formed under the following conditions. First, shapes corresponding to the groove regions 11A and 11B were formed with a stripe width of 1 mm by electron beam lithography using an electron beam resist. The pitch between grooves in each groove region was 200 nm. A Ni original plate was formed by an electroforming method with a resist pattern formed in such a manner. A demolding process is performed on the Ni original plate, and an amorphous cycloolefin polymer film was used as the substrate 11, and while the Ni original plate and the substrate 11 were heated to 160° C., the groove regions 11A and 11B were transferred to the surface of the substrate 11.

After that, a liquid crystalline monomer (UCL-017-030 manufactured by Dainippon Ink and Chemicals, Incorporated) was dissolved in a solvent (PGMEA) at a concentration of 30 wt % to form a solution, and a polymerization initiator was added to the solution, and then the surface of the substrate 11 was coated with the solution. Next, the temperature of the substrate 11 coated with the liquid crystalline monomer was increased to 80° C., and the temperature was kept for 3 minutes to change the liquid crystalline monomer into an isotropic phase state, and then the temperature of the substrate 11 was gradually decreased to room temperature at a rate of approximately 3° C./min. Finally, after the temperature of the substrate 11 was returned to room temperature, the liquid crystalline monomer was polymerized by irradiation with the ultraviolet ray UV.

As a result of observation with a polarizing microscope, the liquid crystal molecules 120 were aligned in the groove directions d1 and d2. A phase difference in the polymerized liquid crystal layer was 140 nm. Moreover, as a result of observing the formed retardation pattern with the polarizing microscope into which a λ/4 plate was inserted, when a sample was rotated, the sample had a shutter function.

Example 2

Figure 50:
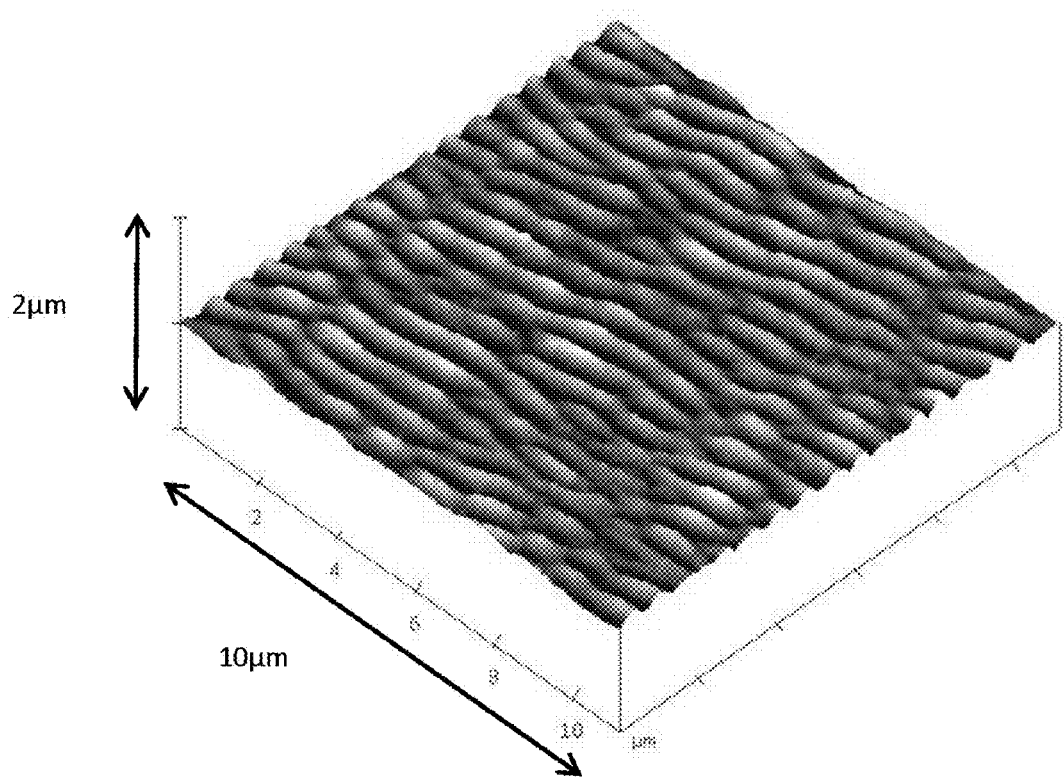
FIG. 50 is an enlarged view of a surface of a mold used for transfer in Example 2.

Moreover, as Example 2, the retardation film 60 was formed with the mold 210 formed by the femtosecond laser described in Modification 10. At that time, as the mold 210, mirror-finished SUS with a thickness of 1 mm was used, and as the base, ZeonorFilm (ZF14: manufactured by Zeon Corporation) was used. Moreover, when the groove patterns were transferred to the base, first, a demolding process was performed on the mold 210, and then a UV-curable acrylic resin liquid (TB3042: manufactured by ThreeBond Co., Ltd.) was developed, and sealed by the base made of ZeonorFilm, and the acrylic resin was cured by UV irradiation from the base side. After that, the base on which fine grooves were transferred was separated from the mode 210, and when the surfaces of the formed grooves were observed with an AFM (Atomic Force Microscope), it was confirmed that submicron-order grooves were formed. FIG. 50 illustrates an enlarged view of a part of an actually formed pattern region. Next, the base on which the grooves were formed was coated with a liquid crystalline monomer solution (RMS03-001C: manufactured by Merck Ltd.) by a spin coat method, and then the base was heated at 55° C. for 2 minutes, and the base was irradiated with the ultraviolet ray UV in an atmosphere of nitrogen to obtain the retardation film 60.

Example 3

Moreover, as Example 3, a retardation film 61 was formed with a base different from the base used in Example 2. As the base, a triacetylcellulose (TAC) film (FT-80SZ: manufactured by Panac Co., Ltd.) was used. The same materials and the same mold as those used in Example 2 were used except for the material of the base. Moreover, the same manufacturing method as that executed in Example 2 was used. In Example 3, the surfaces of the grooves formed on the base were observed with the AFM, and it was confirmed that submicron-order grooves were formed.

As a result of observing the obtained retardation films 60 and 61 with the polarizing microscope, the liquid crystal molecules in both of the retardation films 60 and 61 were aligned along the groove directions d1 and d2, and the phase differences in the retardation films 60 and 61 were 135 nm. Moreover, as a result of observing the formed retardation pattern with the polarizing microscope into which the λ/4 plate was inserted, when samples were rotated, the samples had a shutter function.

Example 4

Figure 51:
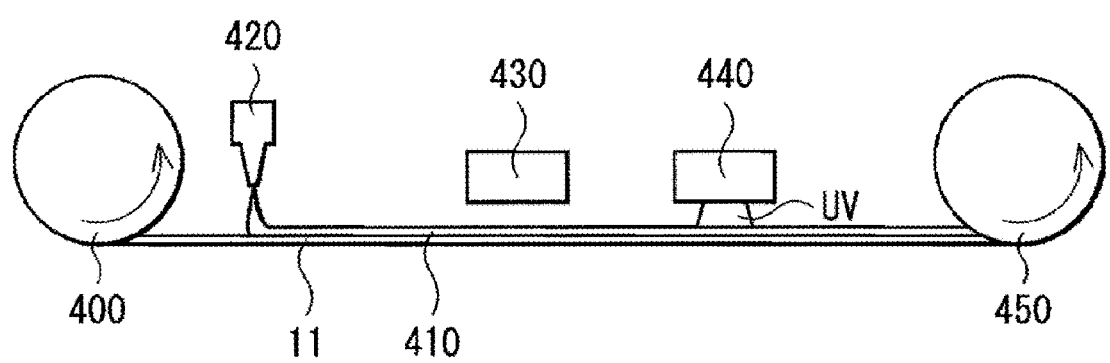
FIG. 51 is an illustration of a brief configuration of an apparatus for manufacturing a retardation film according to Example 4.

As Example 4, a retardation film 62 was formed by a roll process in FIGS. 7 and 51 using the mold roll 112 formed by the femtosecond laser described in Modification 11. At that time, as the mold roll 112, a mirror-finished SUS roll with Φ 100 mm and a width of 150 mm was used, and as the base, a roll made of ZeonorFilm (ZF14: manufactured by Zeon Corporation) with a width of 140 mm was used. When the groove patterns were transferred to the base, first, a demolding process was performed on the mold roll 112, and then the UV-curable acrylic resin liquid (TB3042: manufactured by ThreeBond Co., Ltd.) was developed. Next, while the UV-curable acrylic resin liquid was sealed by the base made of ZeonorFilm at a film forming rate of 0.6 m/min, UV irradiation was performed from the base surface with energy of 1500 mJ/cm2 (a wavelength of 365 nm). After that, the base to which fine grooves were transferred was separated from the mold roll 112, and taken up. When the surfaces of the grooves formed on the base were observed with the AFM, it was confirmed that submicron-order grooves were formed. Next, as illustrated in FIG. 51, the base on which the grooves were formed (the substrate 11) was sent from a winding roll 400. Next, by a roll-die coating system, a liquid crystalline monomer solution 410 (RMS03-001C: manufactured by Merck Ltd., 30 wt %) was discharged from a discharging device 420 to the base to coat the base with the liquid crystalline monomer solution 410 with a dry film thickness of approximately 0.8 μm. After that, in a state in which a film forming rate was kept at 1.0 m/min, the base passed through a dryer 430 to dry the liquid crystalline monomer solution 410 under conditions that a dry temperature was 100° C. and a dry zone was 1 m. Then, the liquid crystalline monomer solution 410 was UV-irradiated by a ultraviolet irradiation device 440 at an energy of 1500 mJ/cm2 (a wavelength of 365 nm) in an atmosphere of nitrogen, and then the base was taken up by a take-up roll 450. The retardation film 62 was obtained in such a manner.

Example 5

Moreover, as Example 5, a retardation film 63 was formed with a base different from the base used in Example 4. As the Thus, a configuration in which the retardation film 20 as the viewing angle compensation film is arranged inside a liquid crystal cell, that is, an in-cell configuration may be used.

base, a triacetylcellulose (TAC) film (FT-80SZ: manufactured by Panac Co., Ltd.) was used. The same materials and the same mold as those used in Example 2 were used except for the material of the base. Moreover, the same manufacturing method as that executed in Example 4 was used. In Example 5, the surfaces of the grooves formed on the base were observed with the AFM, and it was confirmed that submicron-order grooves were formed.

As a result of observing the obtained retardation films 62 and 63 with the polarizing microscope, the liquid crystal molecules in both of the retardation films 62 and 63 were aligned along the groove directions d1 and d2, and the phase differences in the retardation films 62 and 63 were 132 nm. Moreover, as a result of observing the formed retardation pattern with the polarizing microscope into which the λ/4 plate was inserted, when samples were rotated, the samples had a shutter function. Further, in Examples 4 and 5, the retardation films were formed by a roll process, so compared to the case of Examples 2 and 3, the retardation films were efficiently formed. Moreover, unlike a photo-alignment film in Japanese Patent No. 3881706 or a polyimide alignment film, ZeonorFilm and the TAC film used as the base and the acrylic resin used as a resin layer on the base in Examples 2 to 5 were materials in which light absorption or coloring hardly occurred, so a decline in light use efficiency was small.

Although the present application is described referring to the example and the modifications, the invention is not limited thereto, and may be variously modified. For example, in the above-described embodiment and the like, the case where the grooves each have a sectional shape of the letter V is described as an example, but the sectional shapes of the grooves are not limited to the shape of the letter V, and may be any other shape, for example, a circular shape or a polygonal shape. Moreover, it is not necessary for the grooves to have the same shape, and the depths, sizes or the like of the grooves may be changed in each region on a substrate.

Further, in the above-described embodiment and the like, a configuration in which a plurality of grooves are closely arranged without spaces is described as an example, but the invention is not limited thereto, and predetermined spaces may be arranged between the grooves. Moreover, a configuration in which grooves are arranged on the whole surface of the substrate is described as an example, but grooves may be arranged in a local region on the substrate according to necessary phase difference characteristics.

Alternatively, patterning may be performed by developing a resin dissolved in a solvent or the like on a mold, and then evaporating the solvent. Moreover, a substrate made of a plastic material may be formed by melt extrusion with a mold having a reverse pattern of a groove region. Further, patterning may be performed by coating the substrate with any other material for pattern formation, and then pressing a glass substrate against the material for pattern formation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of manufacturing a retardation film comprising the steps of:
    forming a metal mold in which a stripe-shaped pattern having a plurality of projections and depressions extending in a direction orthogonal to a polarization direction of a laser beam and crossing a scanning direction is drawn by irradiating a linear polarization laser beam to a surface of a base made of a metal material with the use of a femtosecond laser;
    forming a plurality of grooves extending in a specific direction on a surface of a substrate with the use of the metal mold;
    coating the surface on which the plurality of grooves are formed of the substrate with a liquid crystal material having polymerizability so that the liquid crystal material is arranged in contact with the surface of the substrate; and
    polymerizing the liquid crystal material, wherein a pattern formed by the plurality of grooves has a periodic structure, and the periodic structure has a spread of approximately 2 to 10% in pitches of projections and depressions, and a spread of approximately 3 to 8% in angles of projections and depressions.

2. The method of manufacturing a retardation film according to claim 1
    wherein
    the metal mold is made of SUS or NiP.

3. The method of manufacturing a retardation film according to claim 1
    wherein
    the metal mold is made of SUS or NiP.

4. The method of manufacturing a retardation film according to claim 1, wherein
    the formation of the plurality of grooves using the metal mold is performed by thermal transfer or transfer using a 2P molding method.

5. The method of manufacturing a retardation film according to claim 1, wherein
    the formation of the plurality of grooves using the metal mold is performed by thermal transfer or transfer using a 2P molding method.

6. The method of manufacturing a retardation film according to claim 2, wherein
    the formation of the plurality of grooves using the metal mold is performed by thermal transfer or transfer using a 2P molding method.

7. The method of manufacturing a retardation film according to claim 1, wherein
    the metal mold includes a plurality of first grooves extending in a first direction and a plurality of second grooves extending in a second direction orthogonal to the first direction, and
    first groove regions including the plurality of first grooves and second groove regions including the plurality of second grooves each have a stripe shape, and are alternately arranged.

8. The method of manufacturing a retardation film according to claim 1, wherein
    the metal mold includes a plurality of first grooves extending in a first direction and a plurality of second grooves extending in a second direction orthogonal to the first direction, and
    first groove regions including the plurality of first grooves and second groove regions including the plurality of second grooves each have a stripe shape, and are alternately arranged.

9. The method of manufacturing a retardation film according to claim 2, wherein
    the metal mold includes a plurality of first grooves extending in a first direction and a plurality of second grooves extending in a second direction orthogonal to the first direction, and first groove regions including the plurality of first grooves and second groove regions including the plurality of second grooves each have a stripe shape, and are alternately arranged.

10. The method of manufacturing a retardation film according to claim 3, wherein
the metal mold includes a plurality of first grooves extending in a first direction and a plurality of second grooves extending in a second direction orthogonal to the first direction, and
first groove regions including the plurality of first grooves and second groove regions including the plurality of second grooves each have a stripe shape, and are alternately arranged.

11. The method of manufacturing a retardation film according to claim 1, wherein
the substrate is made of a plastic material.

12. The method of manufacturing a retardation film according to claim 1, wherein
the substrate is made of a plastic material.

13. The method of manufacturing a retardation film according to claim 2, wherein
the substrate is made of a plastic material.

14. The method of manufacturing a retardation film according to claim 3, wherein
the substrate is made of a plastic material.

15. The method of manufacturing a retardation film according to claim 4, wherein
the substrate is made of a plastic material.

16. The method of manufacturing a retardation film according to claim 1, wherein
the substrate is made of a base including a resin layer formed on a surface thereof.

17. The method of manufacturing a retardation film according to claim 1, wherein
the substrate is made of a base including a resin layer formed on a surface thereof.

18. The method of manufacturing a retardation film according to claim 2, wherein
the substrate is made of a base including a resin layer formed on a surface thereof.

19. The method of manufacturing a retardation film according to claim 3, wherein
the substrate is made of a base including a resin layer formed on a surface thereof.

20. The method of manufacturing a retardation film according to claim 4, wherein
the substrate is made of a base including a resin layer formed on a surface thereof.

21. The method of manufacturing a retardation film according to claim 5, wherein
the substrate is made of a base including a resin layer formed on a surface thereof.

22. The method of manufacturing a retardation film according to claim 1, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

23. The method of manufacturing a retardation film according to claim 1, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

24. The method of manufacturing a retardation film according to claim 2, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

25. The method of manufacturing a retardation film according to claim 3, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

26. The method of manufacturing a retardation film according to claim 4, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

27. The method of manufacturing a retardation film according to claim 5, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

28. The method of manufacturing a retardation film according to claim 6, wherein
the surface on which the plurality of grooves are formed of the substrate is coated with the liquid crystal material, and then a heating process is performed on the liquid crystal material at a temperature equal to or higher than a phase transition temperature between a liquid crystal phase and an isotropic phase of the liquid crystal material.

* * * * *